(12) United States Patent
Sugimoto et al.

(10) Patent No.: US 11,440,401 B2
(45) Date of Patent: Sep. 13, 2022

(54) HYDRAULIC TRANSAXLE

(71) Applicant: KANZAKI KOKYUKOKI MFG. CO., LTD., Amagasaki (JP)

(72) Inventors: Hiroshi Sugimoto, Amagasaki (JP); Mai Terada, Amagasaki (JP); Koji Kiyooka, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 17/113,584

(22) Filed: Dec. 7, 2020

(65) Prior Publication Data

US 2021/0086609 A1    Mar. 25, 2021

Related U.S. Application Data

(63) Continuation-in-part of application No. 16/394,939, filed on Apr. 25, 2019, now Pat. No. 10,865,872, which is a continuation-in-part of application No. 15/487,058, filed on Apr. 13, 2017, now Pat. No. 10,895,249, which is a continuation-in-part of application No. 14/550,499, filed on Nov. 21, 2014, now abandoned, which is a continuation-in-part of application No. 14/179,334, filed on Feb. 12, 2014, now Pat. No. 9,453,519.

(60) Provisional application No. 61/843,165, filed on Jul. 5, 2013.

(51) Int. Cl.
  *B60K 17/10*    (2006.01)

(52) U.S. Cl.
  CPC .................. *B60K 17/105* (2013.01)

(58) Field of Classification Search
  CPC ...................... B60K 17/105; F16H 57/021
  See application file for complete search history.

(56) References Cited

U.S. PATENT DOCUMENTS

| | | | |
|---|---|---|---|
| 4,875,536 A | 10/1989 | Saur et al. | |
| 4,914,907 A | 4/1990 | Okada | |
| 5,259,194 A * | 11/1993 | Okada .................... | B60K 17/14 475/83 |
| 5,517,972 A | 5/1996 | Stockner | |
| 6,125,630 A | 10/2000 | Abend et al. | |
| 6,385,971 B1 | 5/2002 | Abend et al. | |
| 6,968,686 B2 | 11/2005 | Okada et al. | |
| 7,073,330 B1 | 7/2006 | Hauser | |
| 2015/0007555 A1 | 1/2015 | Saldiema et al. | |
| 2015/0075155 A1 | 3/2015 | Murashima et al. | |

* cited by examiner

*Primary Examiner* — Michael Leslie
*Assistant Examiner* — Daniel S Collins
(74) *Attorney, Agent, or Firm* — Sterne, Kessler, Goldstein & Fox P.L.L.C.

(57) ABSTRACT

A transaxle casing has a fluid sump having a gear top cover, an HST, a reduction gear train and at least one axle disposed in the transaxle casing. The gear top cover accommodates a part of a rotation portion of the reduction gear train. An air supply and exhaust hole is disposed on an upper surface of the gear top cover facing an air sump and is arranged at a position different from a point above a bevel gear. A breather is attached at the air supply and exhaust hole, and a first inner wall extending downward from the upper surface of the upper casing member, is positioned between the part of the bevel gear and the air supply and exhaust hole.

15 Claims, 51 Drawing Sheets

HYDRAULIC TRANSAXLE

CROSS REFERENCE TO RELATED APPLICATIONS

This application is a continuation-in-part of U.S. application Ser. No. 16/394,939 filed Apr. 25, 2019, which is a continuation-in-part of U.S. application Ser. No. 15/487,058, filed Apr. 13, 2017, which is a continuation-in-part of U.S. application Ser. No. 14/550,499, filed Nov. 21, 2014, which is a continuation-in-part of U.S. application Ser. No. 14/179,334, filed Feb. 12, 2014, which claims the benefit of U.S. Provisional Application No. 61/843,165, filed Jul. 5, 2013. The contents of each of these applications are expressly incorporated herein by reference thereto in their entireties.

FIELD

The present disclosure generally relates to a hydraulic transaxle, including an axial piston hydraulic pump having a variable displacement and a transaxle casing incorporating the hydraulic pump.

BACKGROUND

As disclosed by U.S. Pat. No. 6,125,630 B, there is a well-known conventional hydraulic transaxle serving as one of right and left transaxles carrying respective right and left individual axles for driving a zero-turn vehicle, e.g., a lawn mower. The transaxle includes an axial piston hydraulic pump having a variable displacement, and a transaxle casing incorporating the hydraulic pump. The hydraulic pump includes a trunnion-type movable swash plate for controlling its displacement. The swash plate is formed integrally with a pair of feet having a cylinder block therebetween. The swash plate further includes a pair of trunnion shafts coaxial to each other. The trunnion shafts are inserted into holes formed in opposite wall portions of the transaxle casing having the hydraulic pump therebetween so as to be pivotally supported by the transaxle casing. One of the pivotally supported trunnion shafts project outward from the transaxle casing so as to be provided thereon with a control arm. Therefore, the swash plate is rotatable centered on an axis of the trunnion shafts.

However, the swash plate is complex in shape and expensive because it is formed integrally with the trunnion shafts projecting from the respective feet. Further, when the swash plate is installed or removed into and from the transaxle casing, the swash plate formed integrally with the trunnion shafts must be moved in the axial direction of the trunnion shafts. Therefore, the transaxle casing has a large opening to allow the movement of the swash plate in the axial direction of the trunnion shafts into and from an inside space of the transaxle casing. After the swash plate is installed in the inside space of the transaxle casing by journaling one trunnion shaft by a side wall of the transaxle casing, a cover is detachably attached to cover the opening and to journal the other trunnion shaft. Such a cover must be provided separately from basic housing members of the transaxle casing for incorporating a hydrostatic transmission (hereinafter, referred to as "HST") including the hydraulic pump, an axle and gears interposed between the HST and the axle, thereby increasing component parts in number and costs, and increasing labors for installing and removing the swash plate into and from the transaxle casing.

SUMMARY

A hydraulic transaxle according to the present application includes a transaxle casing forming a fluid sump having an upper casing member that is detachably joined in a vertical direction, a hydrostatic transmission disposed in the transaxle casing, a reduction mechanism disposed in the transaxle casing and at least one axle disposed in the transaxle casing. The upper casing member accommodates a part of a rotation portion of the reduction mechanism. An air sump is formed inside the upper casing member. The hydraulic transaxle according to the present application includes a hole opened on an upper surface of the upper casing member facing the air sump, arranged at a position deviated from above the rotation portion, a breather that allows air to flow freely inside and outside the upper casing member and blocks a flow of fluid, attached at the hole, and a first inner wall extending downward from the upper surface of the upper casing member, positioned between the part of the rotation portion and the hole.

In this way, by arranging the hole at a position deviated from above the rotation portion, and positioning the first inner wall positioned between a part of the rotation portion and the hole, fluid droplets scattered from the rotation portion can be blocked by the first inner wall, and fluid can be prevented from leaking from the hole to outside through the breather.

In some embodiments, the first inner wall has a portion arranged at a position facing a gear surface of the rotation portion of the reduction mechanism, to surround the rotation portion.

According to such a configuration, fluid droplets scattered from the gear surface of the rotation portion can be blocked by the first inner wall with a high probability, and fluid can be reliably prevented from leaking from the hole to outside through the breather.

In some embodiments, the hydraulic transaxle according to the present application further includes a lower casing member joined detachably to the upper casing member. Each of the upper casing member and the lower casing member is formed a first and second bearing holding half portion for rotatable support of one end side and another side of a shaft that supports the rotation portion of the reduction mechanism.

According to such a configuration, the first inner wall also serves as a rib member that improves strength of the upper casing member.

In some embodiments, the first inner wall is connected to the first bearing holding half portion of the upper casing member and extends along a side surface of the rotation portion of the reduction mechanism.

According to such a configuration, the first inner wall also serves as a rib member that improves strength of the upper casing member.

In some embodiments, the hydraulic transaxle according to the present application further includes a second inner wall extending downward from the upper surface of the upper casing member parallel to the first inner wall. The second inner wall is connected to the second bearing holding half portion of the upper casing member.

According to such a configuration, the second inner wall also serves as a rib member that improves strength of the upper casing member.

In some embodiments, the hydraulic transaxle according to the present application further includes a third inner wall extending downward from the upper surface of the upper casing member, positioned between the first inner wall and second inner wall.

According to such a configuration, fluid droplets scattered from the small gear can be blocked by the third inner wall and the upper inner surface, and fluid can be reliably prevented from leaking from the air supply and exhaust hole to outside through the breather.

These and other features and advantages will appear more fully from the following detailed description with reference to the attached drawings.

DETAILED DESCRIPTION

Figure 1:
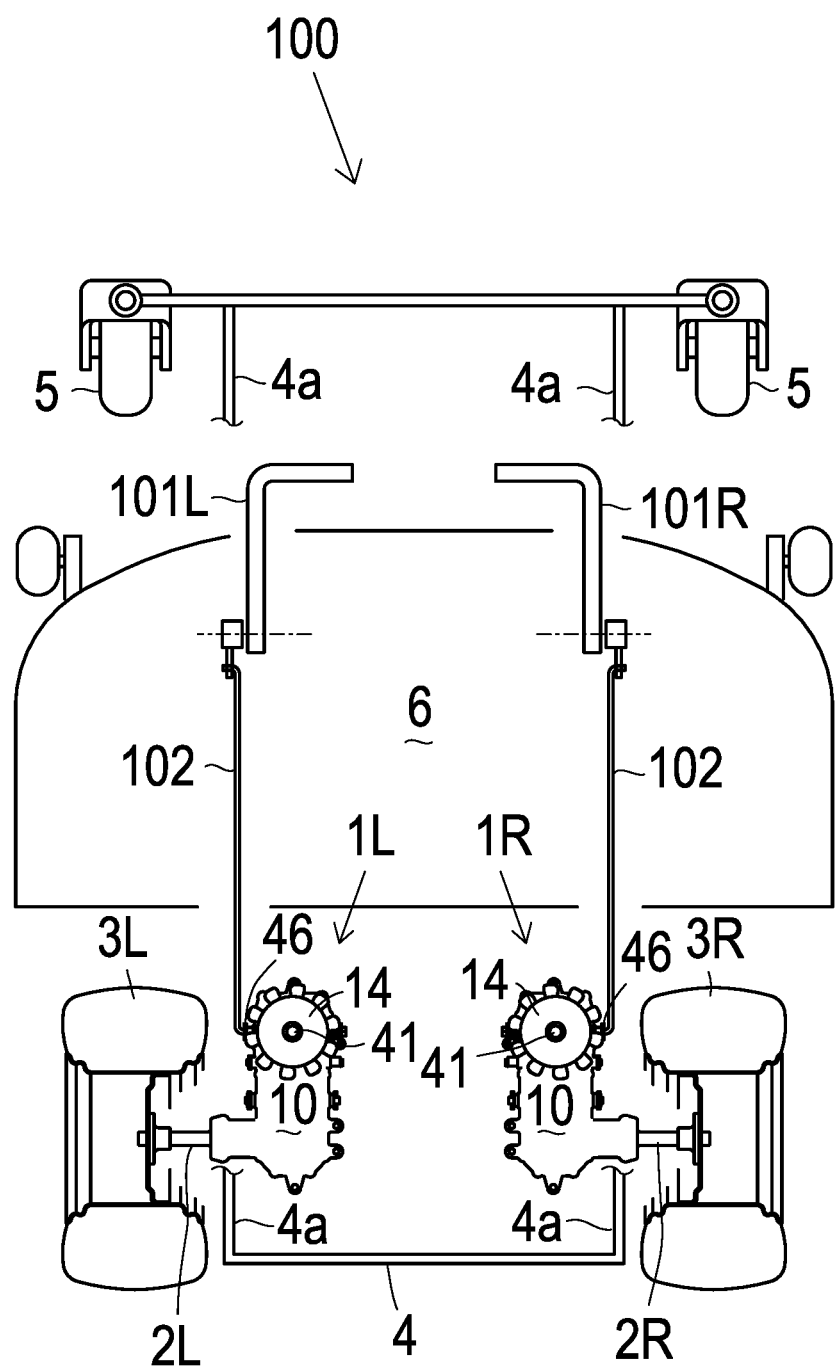
FIG. 1 is a schematic plan view of a lawn mower 100 serving as a zero-turn vehicle equipped with right and left transaxles 1R and 1L and with right and left control levers 101R and 101L for controlling respective transaxles 1R and 1L.
Figure 2:
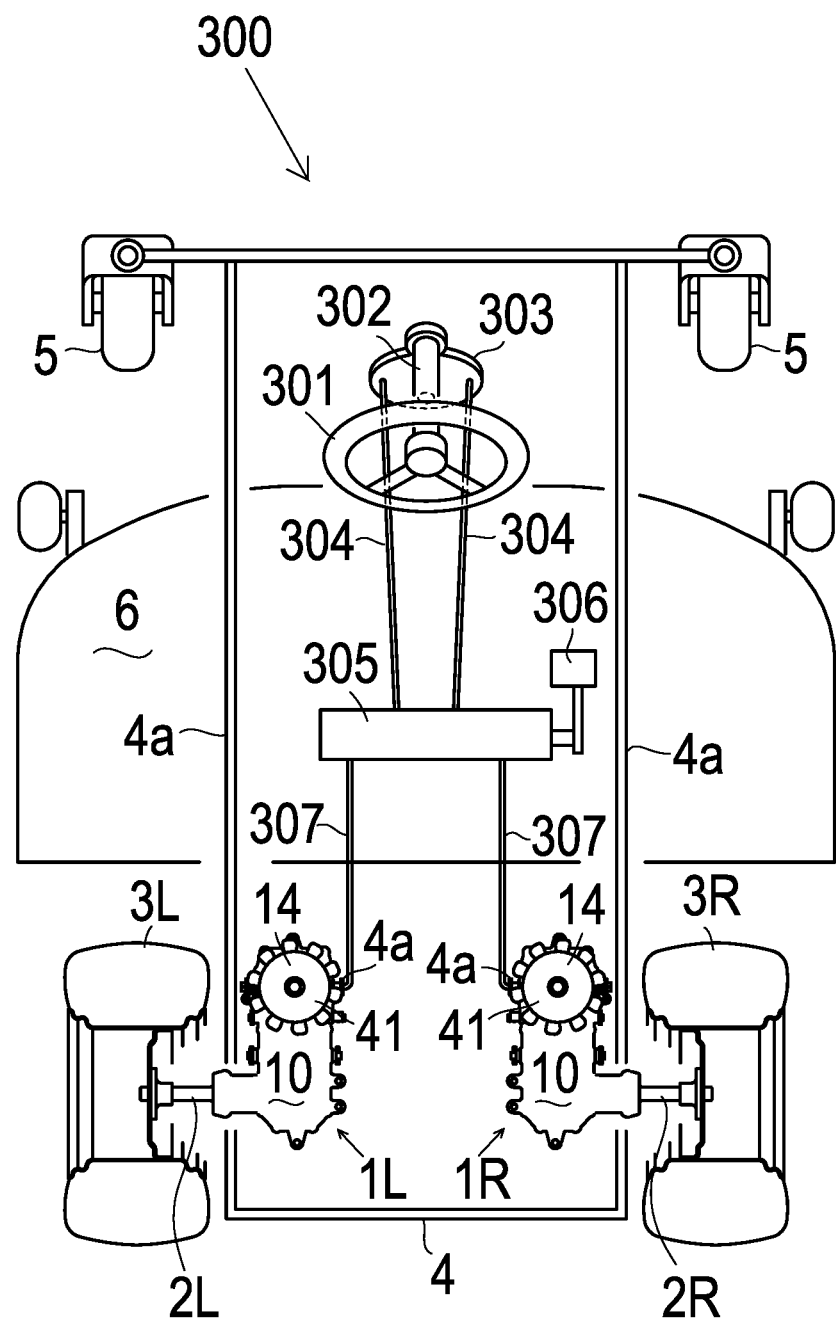
FIG. 2 is a schematic plan view of a lawn mower 300 serving as a zero-turn vehicle equipped with right and left transaxles 1R and 1L and with a steering wheel 301 and a speed control pedal 306 for controlling right and left transaxles 1R and 1L.

Referring to FIGS. 1 and 2, each of lawn mowers (hereinafter simply referred to as "vehicles") 100 and 300 serving as typical zero-turn vehicles is equipped with right and left transaxle 1R and 1L carrying respective right and left axles 2R and 2L. Each of vehicles 100 and 300 includes a vehicle body frame 4 having right and left parallel sideboards 4a extended in the fore-and-aft horizontal direction thereof. Vehicle body frame 4 supports right and left transaxles 1R and 1L so that transaxle casings 10 of right and left transaxles 1R and 1L are disposed in the inside of vehicle body frame 4, i.e., between right and left sideboards 4a when viewed in plan. Right axle 2R is extended rightward from transaxle casing 10 of right transaxle 1R to the outside of right sideboard 4a of vehicle body frame 4 so as to be fixed at a distal end thereof to right drive wheel 3R. Left axle 2L is extended leftward from transaxle casing 10 of left transaxle 1L to the outside of left sideboard 4a of vehicle body frame 4 so as to be fixed at a distal end thereof to left drive wheel 3L.

Right and left drive wheels 3R and 3L serve as right wheels of each of vehicles 100 and 300 so as to be disposed on the right and left outsides of a rear portion of vehicle body frame 4. A front end portion of vehicle body frame 4 supports castors (or castor) 5 serving as front wheels (or a front wheel) of vehicle 100 or 300. A mower unit 6 is disposed below a fore-and-aft middle portion of vehicle body frame 4 between front wheels 5 and rear wheels 3R and 3L. Further, each of vehicles 100 and 300 is equipped with a prime mover (not shown) such as an engine whose output power is transmitted via a belt (not shown) or the like to input pulleys 14 of respective right and left transaxles 1R and 1L.

Referring to FIG. 1, vehicle 100 is provided with right and left control levers 101R and 101L. Link rods 102 are extended rearward from respective right and left control levers 101R and 101L to respective transaxle casings 10 of right and left transaxles 1R and 1L. Therefore, right and left link rods 102 extended from respective control levers 101R and 101L are disposed along respective right and left sideboards 4a of vehicle body frame 4. When viewed in plan, right and left link rods 102 are extended in the fore-and-aft direction along respective right and left sideboards 4a. As discussed later, transaxle casing 10 of each of right and left transaxles 1R and 1L can be selectively provided with HST control arm 46 on either the right or left proximal side surface thereof or the right or left distal side surface thereof. Therefore, in the present embodiment, transaxles 1R and 1L in vehicle 100 are provided with respective HST control arms 46 on the distal side surfaces of respective transaxle casings 10 thereof because right and left link rods 102 are rather close to the distal sides of vehicle 100. Further, a later-discussed neutral return spring 47 is provided on the right or left side surface of transaxle casing 10 of each of right and left transaxles 1R and 1L opposite HST control arm 46. Therefore, whether neutral returning spring 47 is provided on the proximal or distal side surface of transaxle casing 10 depends on whether HST control arm 46 is provided on the proximal or distal side surface of transaxle casing 10.

Right control lever 101R is operable to change the tilt angle and direction of a later-discussed movable swash plate 44 of an HST 20 of right transaxle 1R so as to change the rotary speed and direction of right rear wheel 3R. Left control lever 101L is operable to change the tilt angle and direction of movable swash plate 44 of HST 20 of left transaxle 1L so as to change the rotary speed and direction of left rear wheel 3L. When right and left control levers 101R and 101L are synchronously manipulated, movable swash plates 44 of HSTs 20 of right and left transaxles 1R and 1L are synchronously controlled to change the straight travel speed or direction of vehicle 100. When right and left control levers 101R and 101L are independently manipulated, movable swash plates 44 of HSTs 20 of right and left transaxles 1R and 1L are differentially controlled so as to control the turn direction, angle and speed of vehicle 100.

Alternatively, referring to FIG. 2, vehicle 300 is provided with a steering wheel 301 that is connected to a sector gear 303 via a stem 302. Right and left link rods 304 are extended from sector gear 303 to a zero-turn control unit 305, and right and left rods 307 are extended from zero-turn control unit 305 to respective transaxle casings 10 of right and left transaxles 1R and 1L. A speed control pedal 306 is operatively connected to zero-turn control unit 305. Due to the depression of speed control pedal 306, right and left link rods 307 are pulled or pushed synchronously in the same direction and to the same degree to rotate respective HST control arms 46, thereby controlling the travel speed of vehicle 300 in either the forward or backward direction. Due to the rotation of steering wheel 301, right and left link rods 307 are independently pushed or pulled so as to differentially rotate right and left HST control arms 46, thereby turning vehicle 300. Typical zero-turn control unit 305 is configured as disclosed by U.S. Pat. No. 4,875,536 A, for example.

In this regard, zero-turn control unit 305 is disposed at the lateral middle portion of vehicle 300 between right and left sideboards 4a of vehicle body frame 4 so that right and left link rods 307 extended from zero-turn control unit 305 are disposed inward from respective right and left sideboards 4a so as to be rather distantly inward from respective right and left sideboards 4a. Therefore, transaxles 1R and 1L in vehicle 300 are provided with respective HST control arms 46 on the proximal side surfaces of respective transaxle casings 10 thereof.

In each of vehicles 100 and 300, right and left transaxles 1R and 1L are arranged to have respective axles 2R and 2L being coaxial to each other. Incidentally, right and left transaxles 1R and 1L are arranged so that later-discussed HSTs 20 operatively connected to respective HST control arms 46 are disposed in respective front portions of transaxle casings 10 of transaxles 1R and 1L and so that axles 2R and 2L are supported by respective rear portions of transaxle casings 10 of transaxles 1R and 1L rearward from HSTs 20. Alternatively, either or both of transaxles 1R and 1L may be disposed to have HST 20 rearward from axle 2R or 2L.

Referring to FIGS. 3 to 20, a transaxle 1 carrying an axle 2 will be described on the assumption that it represents right transaxle 1R carrying right axle 2R and left transaxle 1L carrying left axle 2L such as those of zero-turn vehicle 100 or 300. Transaxle 1 includes a transaxle casing 10, an HST 20 disposed in a front portion of transaxle casing 10, an axle 2 (serving as either right axle 2R or left axle 2L of vehicle 100 or 300) journalled by a rear portion of transaxle casing 10, and a reduction gear train 70 disposed in the rear portion of transaxle casing 10 so as to drivingly connect HST 20 to axle 2.

Transaxle casing 10 includes a transaxle housing 11, a lower cover 12 made of a metal plate, and a top cover 13. Transaxle housing 11 serving as a main body of transaxle casing 10 is entirely formed by casting. A downwardly open chamber 10a is formed in transaxle housing 11 so as to extend from a front end of transaxle housing 11 to a rear end of transaxle housing 11. HST 20 is disposed in a front half portion of chamber 10a in transaxle housing 11, and reduction gear train 70 is disposed in a rear half portion of chamber 10a in transaxle housing 11.

Transaxle housing 11 is formed with bosses 11a, 11m and 11n having respective vertical through holes through which respective bolts are passed to fasten transaxle housing 11 to vehicle body frame 4 of vehicle 100 or 300. Front and rear bosses 11a are formed on front and rear ends of transaxle housing 11. A substantially laterally symmetric main body of transaxle housing 11 is formed by casting with a main mold (not shown), and an axle support portion 11i of transaxle housing 11 for journaling axle 2 is formed by casting with a sub mold (not shown) combined with the main mold so as to be joined to the main body of transaxle housing 11. Whether the sub mold is disposed rightward or leftward of the main mold can be selected so that axle support portion 11i can be selectively formed on either the right rear portion of the main body or the left rear portion of the main body.

Figure 3:
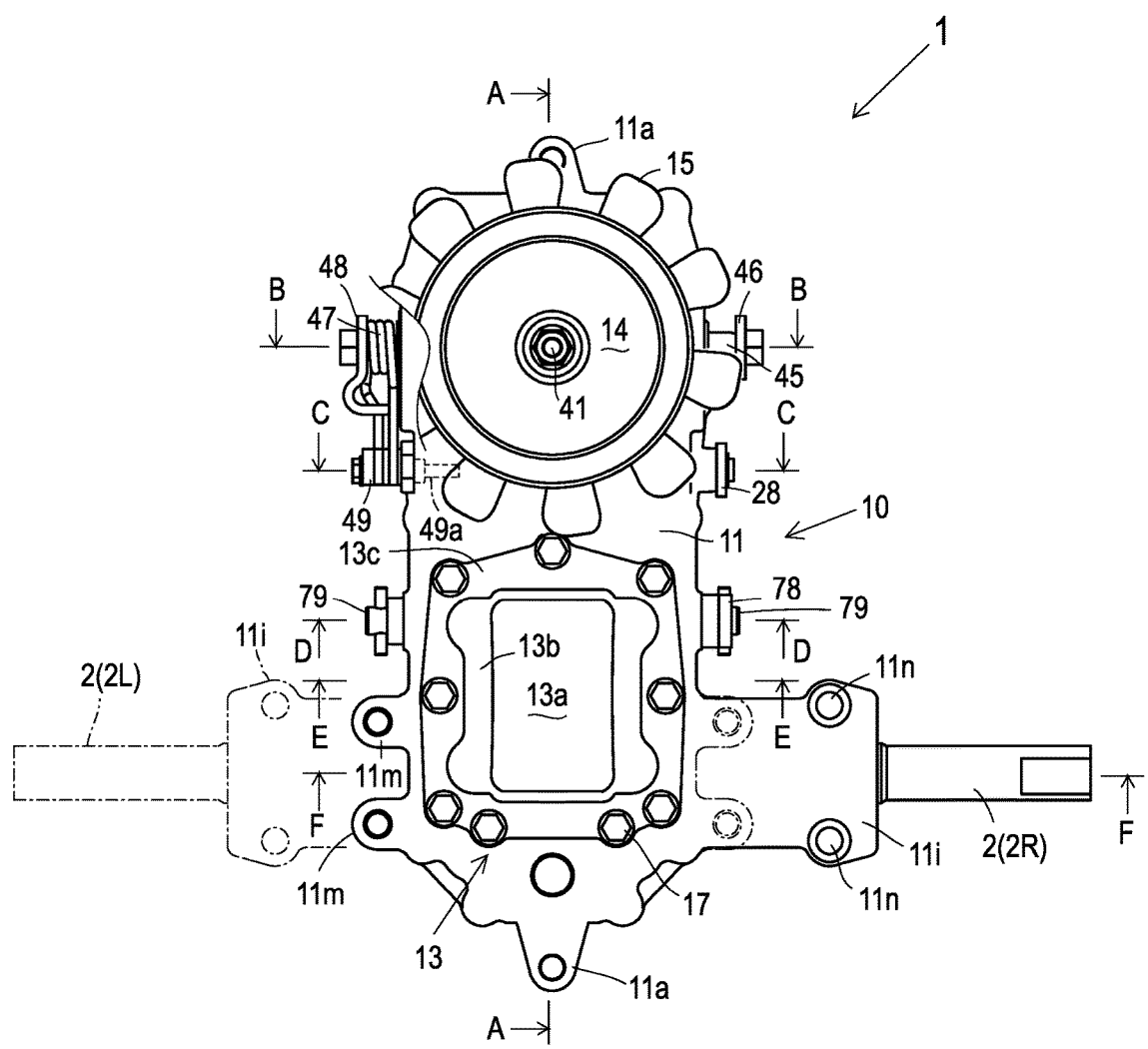
FIG. 3 is a plan view of a transaxle 1 representing each of right and left transaxles 1R and 1L of a zero-turn vehicle.
Figure 4:
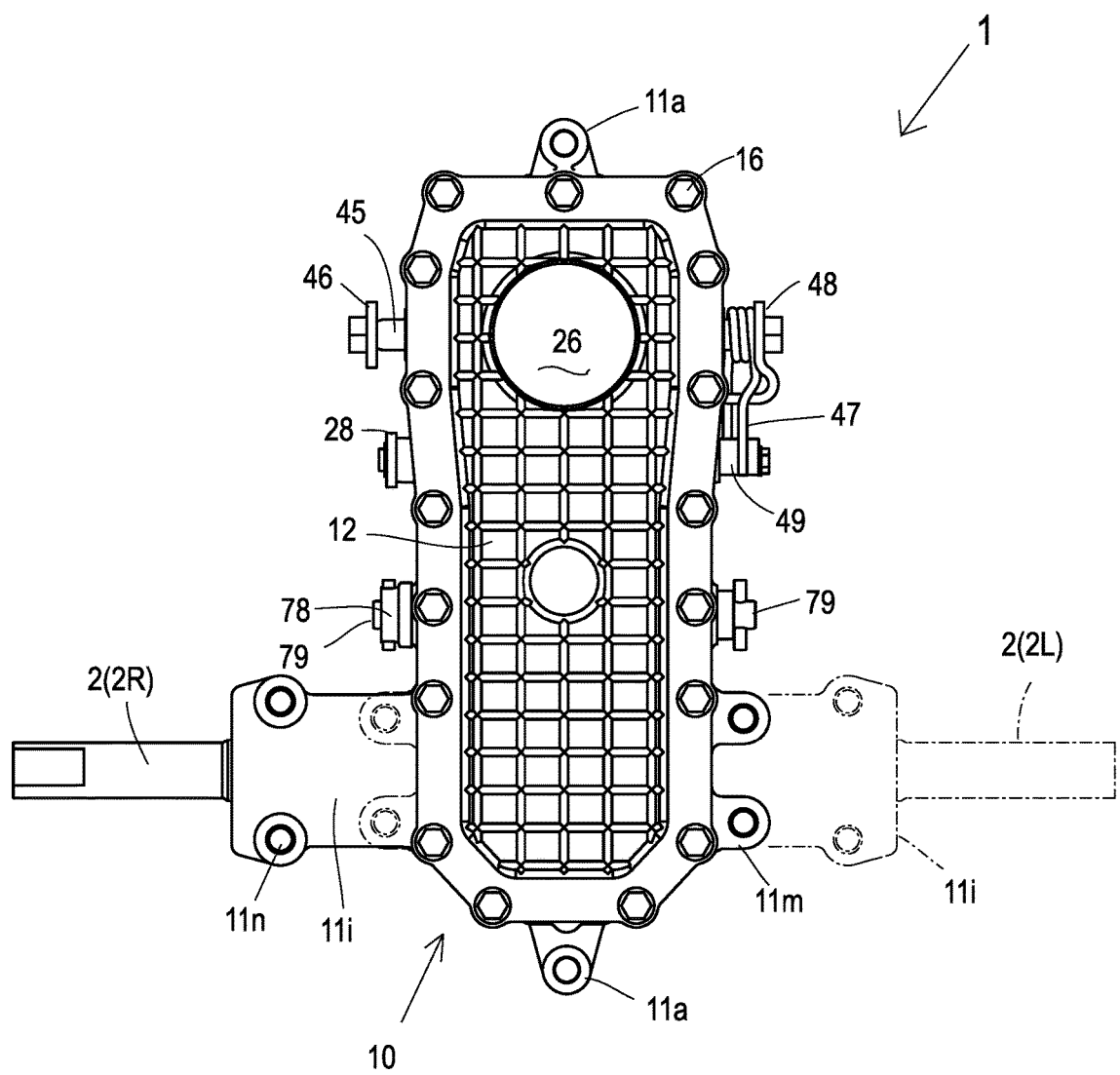
FIG. 4 is a bottom view of transaxle 1.
Figure 5:
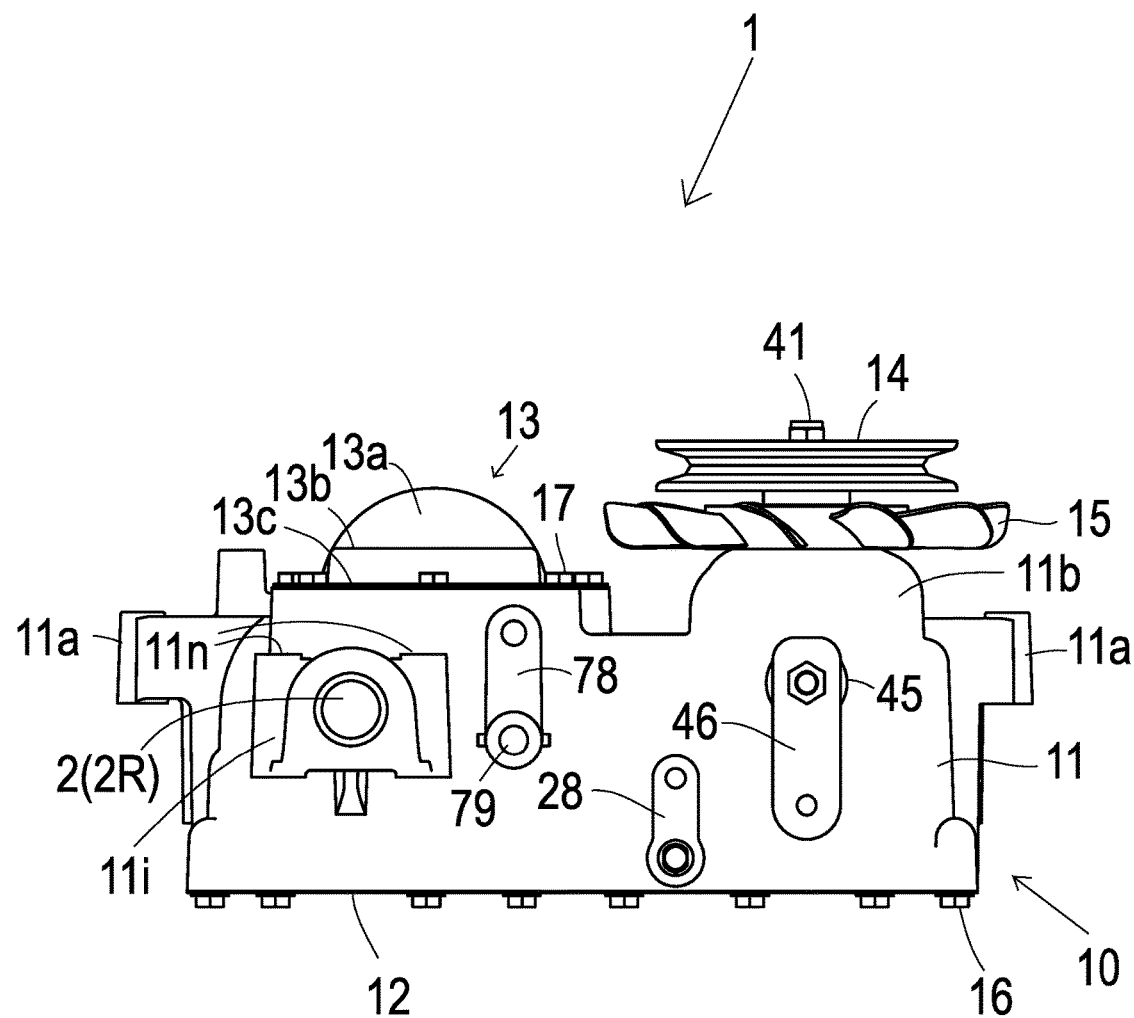
FIG. 5 is a side view of transaxle 1 when viewed from a side toward a distal end of an axle 2 projecting outward from a transaxle casing 10 of transaxle 1.

In this regard, transaxle 1 illustrated in FIGS. 3 to 13 serves as right transaxle 1R carrying right axle 2R so that axle support portion 11i extends rightward to support right axle 2R as drawn in solid lines in FIGS. 3 and 4 and others. Alternatively, transaxle housing 11 may have axle support portion 11i extended leftward to support left axle 2L as drawn in phantom lines in FIGS. 3 and 4 and others so as to constitute left transaxle 1L carrying left axle 2L. Whether axle support portion 11i extends rightward or leftward, front and rear bosses 11n are formed on axle support portion 11i, and front and rear bosses 11m are formed on a right or left side of transaxle housing 11 opposite axle support portion 11i in the lateral direction.

Lower cover 12 is fastened by bolts 16 to a bottom edge of transaxle housing 11 so as to cover the bottom opening of chamber 10a in transaxle housing 11 surrounded by the bottom edge of transaxle housing 11. A ceiling wall of transaxle housing 11 has a top opening 11g in a rear top portion thereof defining the rear half portion of chamber 10a incorporating reduction gear train 70. Top cover 13 is fastened by bolts 17 to the edge portion of transaxle housing 11 surrounding top opening 11g so as to cover an upper portion of reduction gear train 70 in transaxle housing 11.

HST 20 includes a center section 30, a hydraulic pump 40 and a hydraulic motor 50. Referring to FIGS. 15 to 20, center section 30 is entirely formed by casting so as to have a horizontal discoid pump port block 31, an upwardly slant discoid motor port block 32, a bypass valve block 33 and plural (in this embodiment, four) bolt bosses 34 and 35. Center section 30 will be described on the assumption that motor port block 32 is joined to pump port block 31 so as to extend rearwardly upward from a rear end of pump port block 31.

As shown in FIGS. 15, 16, 19 and 20, pump port block 31 is formed therein with right and left pump kidney ports 31b and 31c and a pump shaft hole 31d between pump kidney ports 31b and 31c. A horizontal pump mounting surface 31a is formed on a top end of pump port block 31. Pump kidney ports 31b and 31c and pump shaft hole 31d are extended vertically upward so as to be open at horizontal pump mounting surface 31a.

Figure 17:
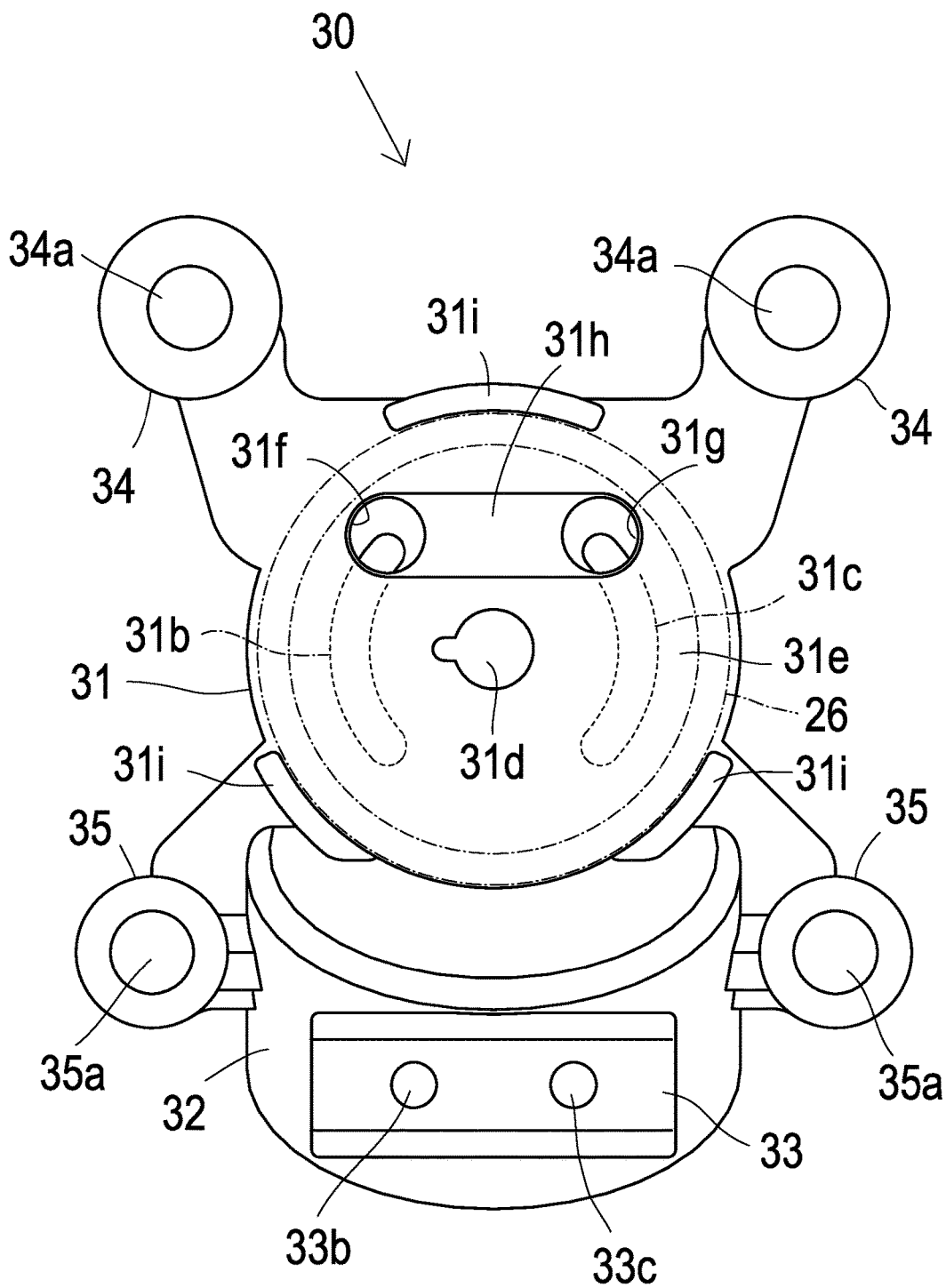
FIG. 17 is a bottom view of center section 30.
Figure 18:
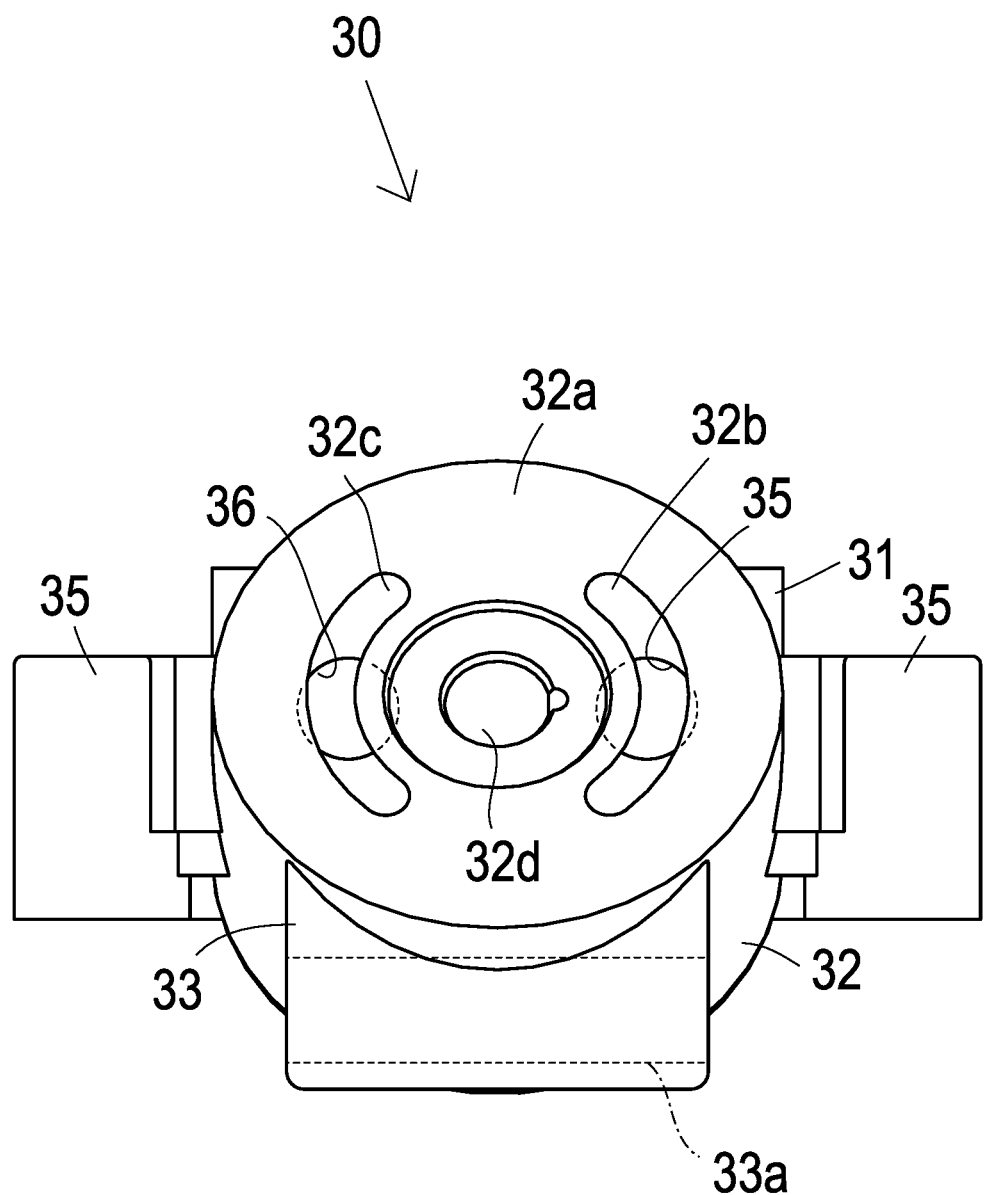
FIG. 18 is a rear view of center section 30.

As shown in FIG. 17 and others, a horizontal filter mounting surface 31e is formed on a bottom end of pump port block 31. A circumferential area of filter mounting surface 31e is provided to contact a top edge of a cylindrical filter 26 (see FIG. 6 and others). Plural (in this embodiment, three) filter retainers 31i project downward from filter mounting surface 31e and are formed and aligned along the circumferential area of filter mounting surface 31e so as to fit an upper portion of a peripheral side surface of filter 26 whose top edge contacts the circumferential area of filter mounting surface 31e. Pump shaft hole 31d is extended vertically downward so as to be open at a central portion of filter mounting surface 31e. A charge port gallery 31h is open at a front portion of filter mounting surface 31e between pump shaft hole 31d and the circumferential area of filter mounting surface 31e. Right and left charge ports 31f and 31g are open at respective bottom ends thereof to charge port gallery 31h.

In this regard, when HST 20 is disposed in transaxle casing 10, filter 26 contacting filter mounting surface 31e of center section 30 is submerged in a fluid sump in chamber 10a so that fluid is filtered by filter 26 when the fluid penetrates filter 26 from the fluid sump in chamber 10a to the inside space of filter 26. The fluid in the inside of filter 26 constantly enters charge port gallery 31h and charge ports 31f and 31g.

Figure 19:
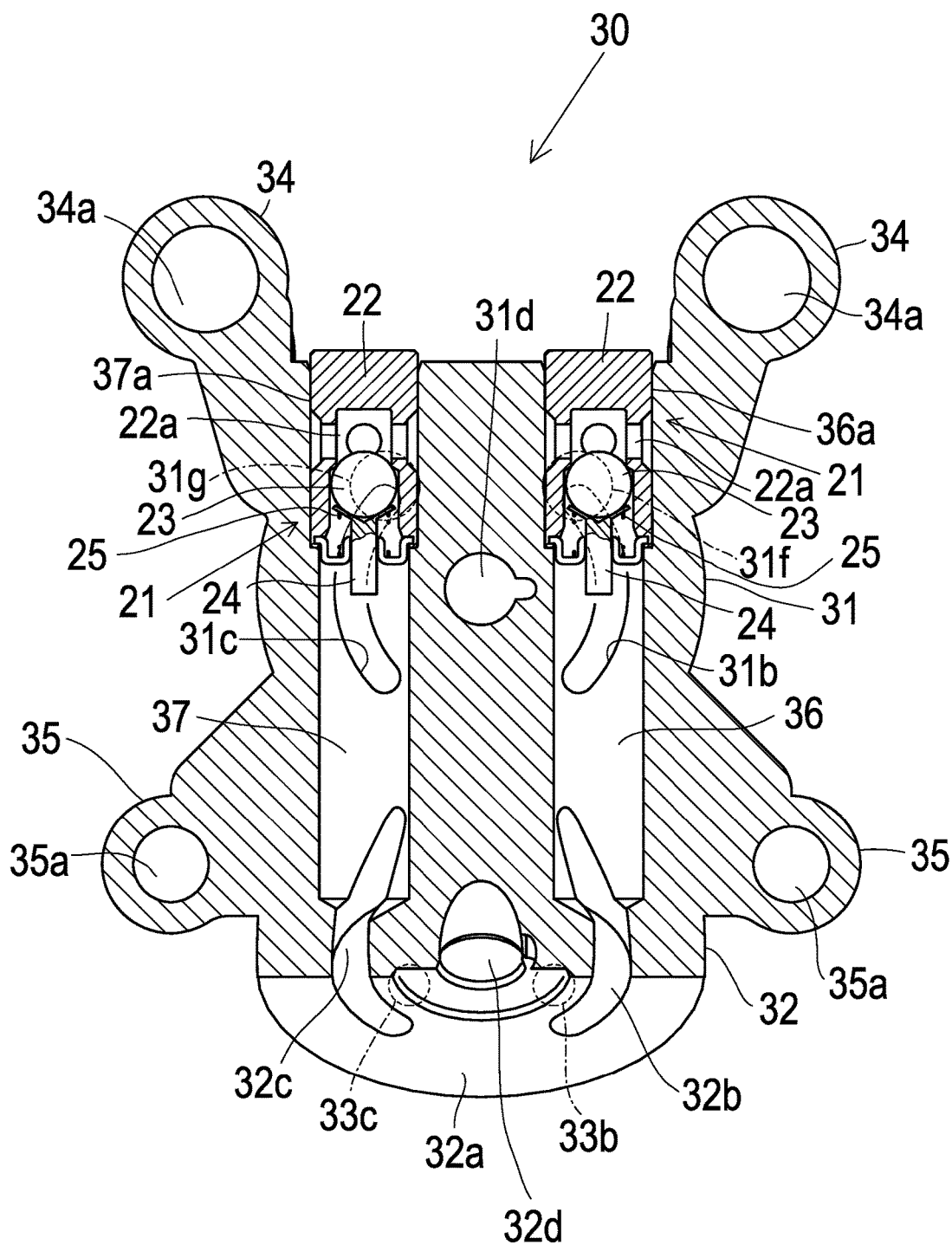
FIG. 19 is a sectional plan view of center section 30.
Figure 20:
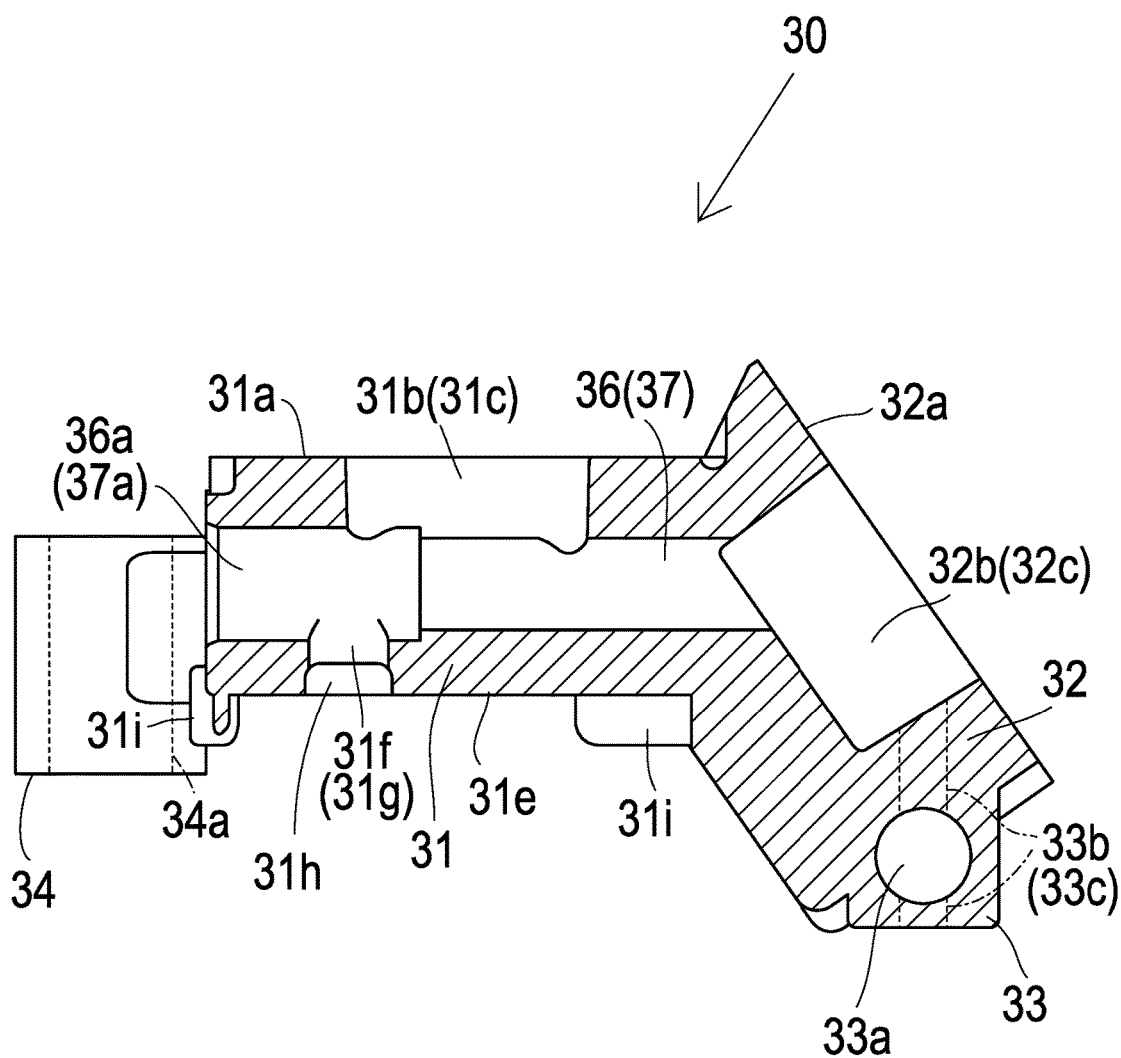
FIG. 20 is a sectional side view of center section 30.

As shown in FIGS. 19 and 20 and others, right and left main fluid passages 36 and 37 are formed in pump port block 31 so as to extend in the horizontal fore-and-aft direction. Front portions of main fluid passages 36 and 37 are diametrically expanded to serve as charge valve chambers 36a and 37a that are open outward at the front end of pump port block 31. Right kidney port 31b is joined at a bottom thereof to a top portion of right main fluid passage 36 and right charge port 31f is joined at a top thereof to a bottom portion of right charge valve chamber 36a. Similarly, left kidney port 31c is joined to left main fluid passage 37, and left charge port 31g is joined to left charge valve chamber 37a.

As shown in FIG. 19, right and left charge check valves 21 are disposed in respective right and left charge valve chambers 36a and 37a. Each charge check valve 21 includes a valve casing 22, a ball valve member 23, a pressure pin 24 and a spring 25. Valve casing 22 is fitted in each of charge valve chambers 36a and 37a so as to serve as a plug closing the outward opening of each of charge valve chambers 36a and 37a. Valve casing 22 is formed therein with a valve port 22a that is constantly open to each of charge ports 31f and 31g. Ball valve member 23 is biased by spring 25 so as to block valve port 22a from each of fluid passages 36 and 37. Charge check valve 21 is configured so that when either main fluid passage 36 or 37 is hydraulically depressed and the hydraulic pressure therein is lower than that in valve port 22a, the differential pressure of fluid between valve port 22a and hydraulically depressed main fluid passage 36 or 37 thrusts ball valve member 23 against spring 25 so as to open valve port 22a to hydraulically depressed main fluid passage 36 or 37, whereby fluid passed through a later-discussed filter 26 is supplied to main fluid passage 36 or 37.

Motor port block 32 is formed therein with right and left motor kidney ports 32b and 32c and a motor shaft hole 32d between motor kidney ports 32b and 32c. A slant upper end of motor port block 32 is formed as a rearwardly downward slant motor mounting surface 32a. Right and left motor kidney ports 32b and 32c and motor shaft hole 32d are extended rearwardly upward so as to be open at motor mounting surface 32a. Right and left main fluid passages 36 and 37 are extended rearward into motor port block 32 so as to be joined at rear ends thereof to respective right and left motor kidney ports 32b and 32c.

Bypass valve block 33 projects downward from motor port block 32 so as to extend in the lateral horizontal portion. A lateral horizontal bypass valve hole 33a is formed through bypass valve block 33. Right and left ends of bypass valve holes 33a are open outward at right and left vertical end surfaces of bypass valve block 33. Right and left vertical bypass ports 33b and 33c are extended downward from respective right and left motor kidney ports 32b and 32c so as to cross bypass valve hole 33a and are further extended downward from bypass valve hole 33a so as to be open outward at a horizontal bottom surface of bypass valve block 33.

Figure 9:
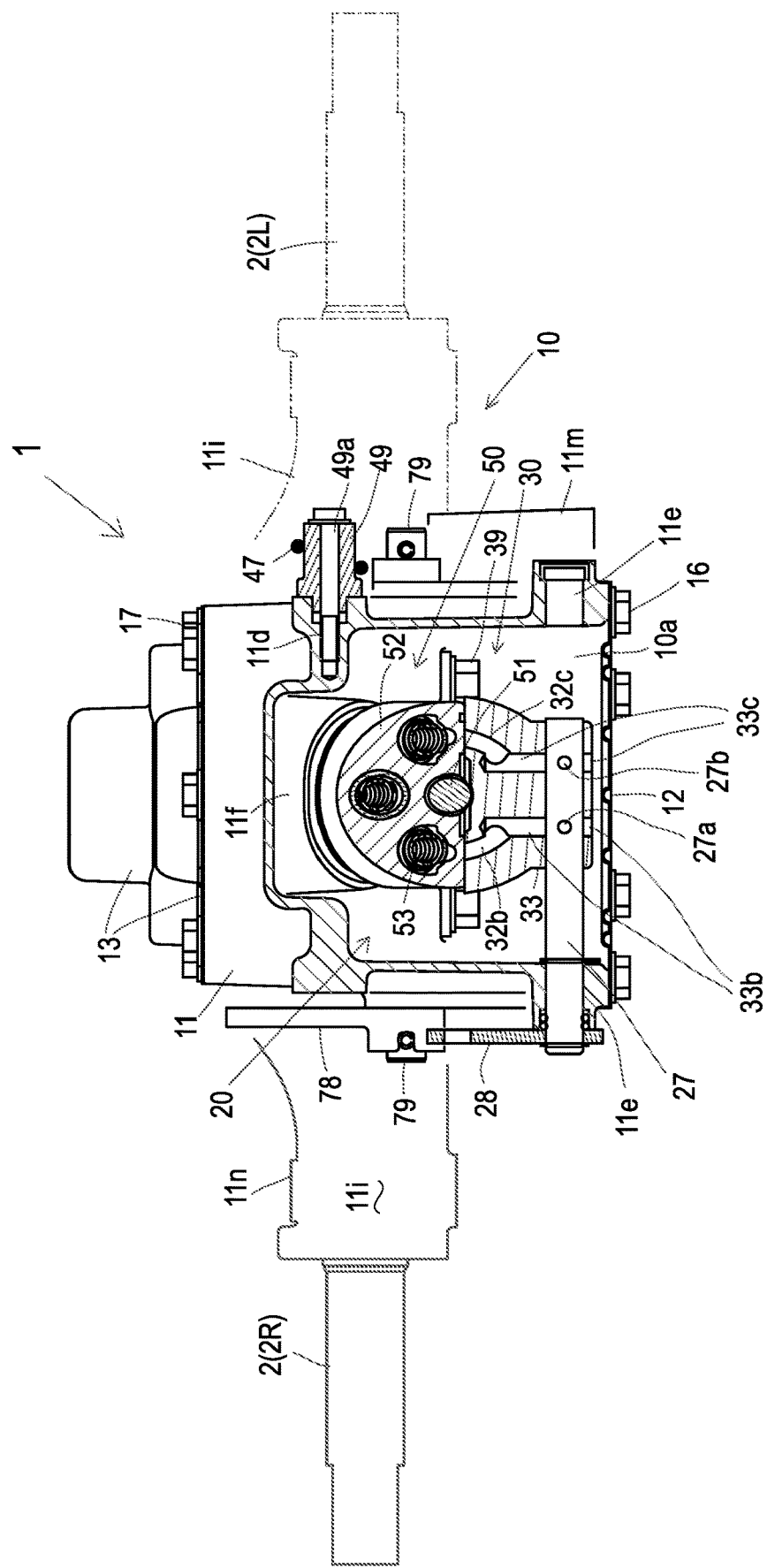
FIG. 9 is a cross sectional front view of transaxle 1 taken along C-C arrows of FIG. 3.

In this regard, as shown in FIG. 9, a rotary bypass valve 27 having right and left diametric valve passages 27a and 27b is fitted in bypass valve hole 33a. Bypass valve 27 is rotatably centered on its laterally horizontal axis so as to be shiftable between a valve closing position and a valve opening position. To release fluid from main fluid passages 36 and 37 to the fluid sump in chamber 10a, bypass valve 27 is disposed at the valve opening position so as to orient valve passages 27a and 27b vertically to fluidly connect the upper portions of bypass ports 33b and 33c above bypass valve hole 33a to the lower portions of bypass ports 33b and 33c below bypass valve hole 33a via respective bypass passages 27a and 27b, thereby releasing fluid from motor kidney ports 32b and 32c to the fluid sump in chamber 10a via the open bottom ends of bypass ports 33b and 33c. Bypass valve 27 is normally disposed at the valve closing position so that valve passages 27a and 27b deviate from respective bypass ports 33b and 33c, thereby blocking bypass ports 33b and 33c. Bypass valve 27 can be selectively inserted into bypass valve hole 33a from either the right or left vertical end surface of bypass valve block 33.

Figure 10:
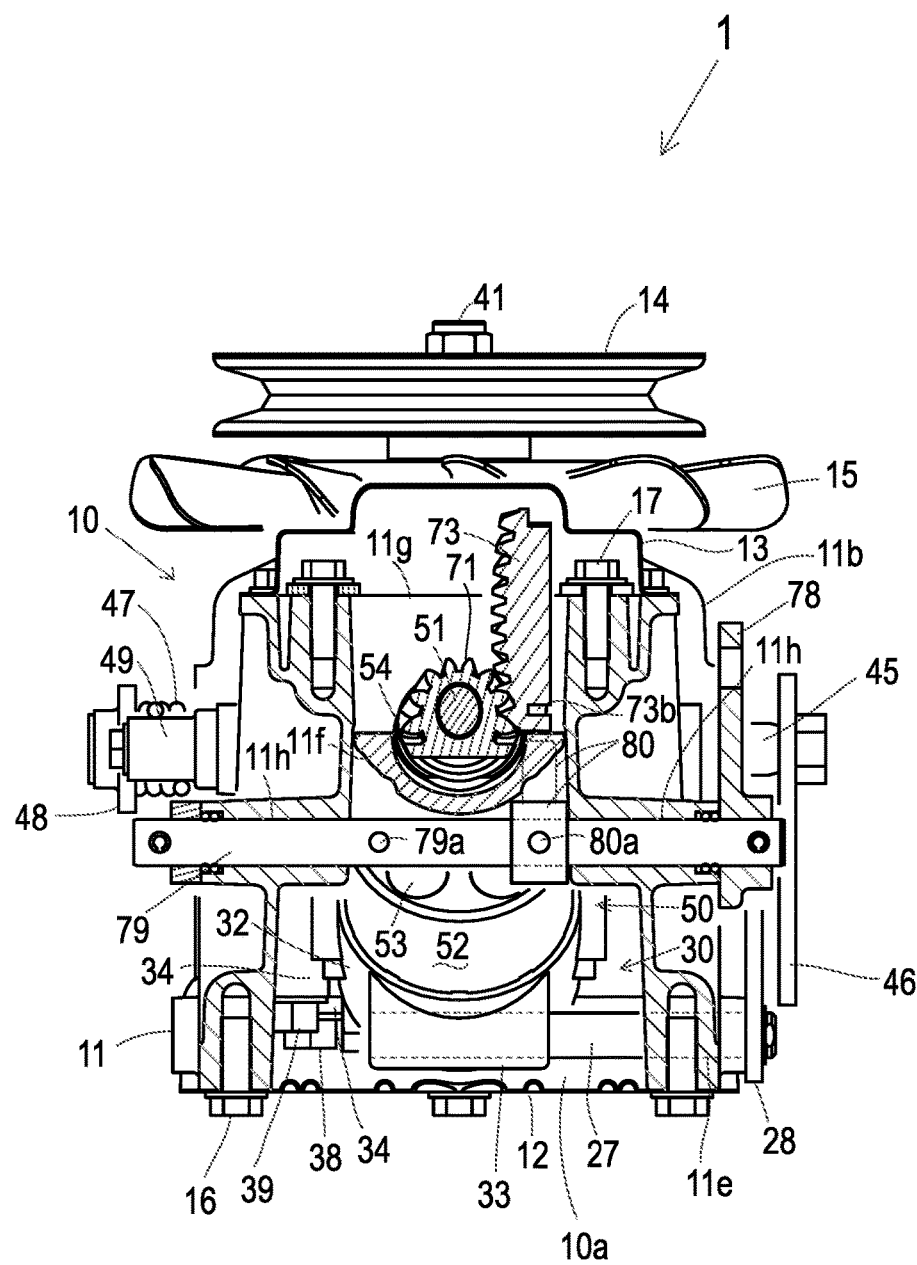
FIG. 10 is a cross sectional rear view of transaxle 1 taken along D-D arrows of FIG. 3.

Right and left front bosses 34 having respective vertical through holes 34a are expanded rightwardly and leftwardly forward from pump port block 31. Right and left rear bosses 35 having respective vertical through holes 35a are expanded rightward and leftward from motor port block 32. Referring to FIG. 10, bolts 38 are passed upward through respective vertical through holes 34a in right and left front bosses 34 and are screwed upward into transaxle housing 11, and bolts 39 are passed upward through respective vertical through holes 35a in right and left rear bosses 35 and are screwed upward into transaxle housing 11, thereby fastening center section 30 with four-pointed bosses 34 and 35 to transaxle housing 11.

Center section 30 configured as mentioned above is advantageous in its lateral symmetry. In this regard, for example, right and left main fluid passages 36 and 37, right and left charge ports 31f and 31g, right kidney ports 31b and 32b and left kidney ports 31c and 32c, right and left charge check valve chambers 36a and 37a and right and left bypass ports 33b and 33c are laterally symmetric so that hydraulic pump 40 and hydraulic motor 50 mounted on center section 30 are aligned in the fore-and-aft direction of transaxle 1 without lateral eccentricity or deviation, and charge check valves 121 are laterally symmetrically arranged. Such a lateral symmetry of center section 30 is advantageous to standardize transaxle 1 serving as either of right and left transaxles 1R and 1L.

Referring to FIGS. 6 to 9, hydraulic pump 40 includes a pump shaft 41, a pump cylinder block 42, plungers 43 and a movable swash plate 44. Pump shaft 41 is fittingly passed through pump shaft hole 31d of center section 30 rotatably relative to center section 30. Pump cylinder block 42 is formed with a center through hole serving as a pump shaft hole 42a and with cylinder bores 42b aligned radially around pump shaft hole 42a. Pump shaft 41 is fittingly passed through pump shaft hole 42a unrotatably relative to pump cylinder block 42. Pump cylinder block 42 is slidably rotatably fitted onto pump mounting surface 31a so as to fluidly connect cylinder bores 42b therein to pump kidney ports 31b and 31c. Plungers 43 are fitted into respective cylinder bores 42b reciprocally in the axial direction of pump shaft 41, thereby constituting axial piston type hydraulic pump 40. Movable swash plate 44 has a bearing 44a abutting against heads of plungers 43 projecting from pump cylinder block 42.

Figure 7:
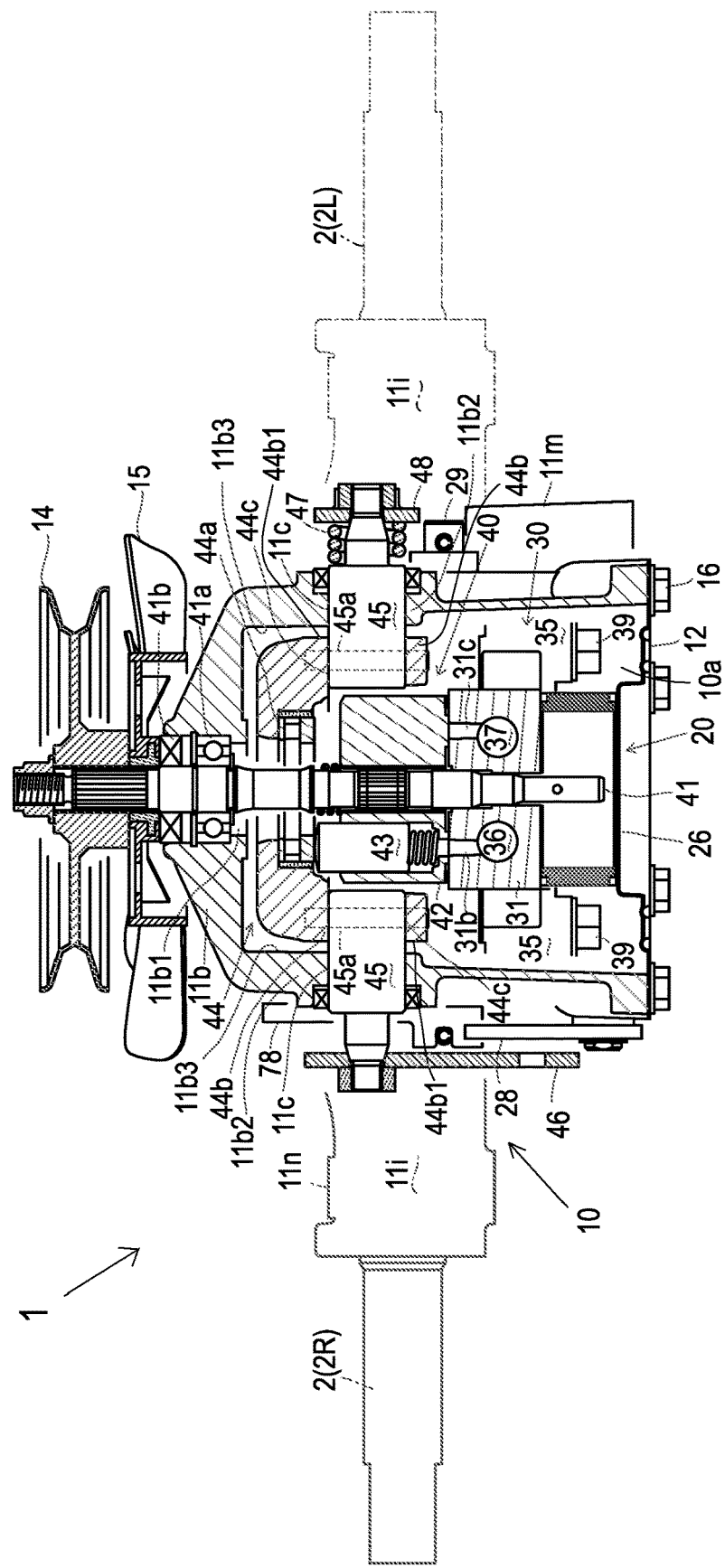
FIG. 7 is a cross sectional front view of transaxle 1 taken along B-B arrows of FIG. 3.
Figure 8:
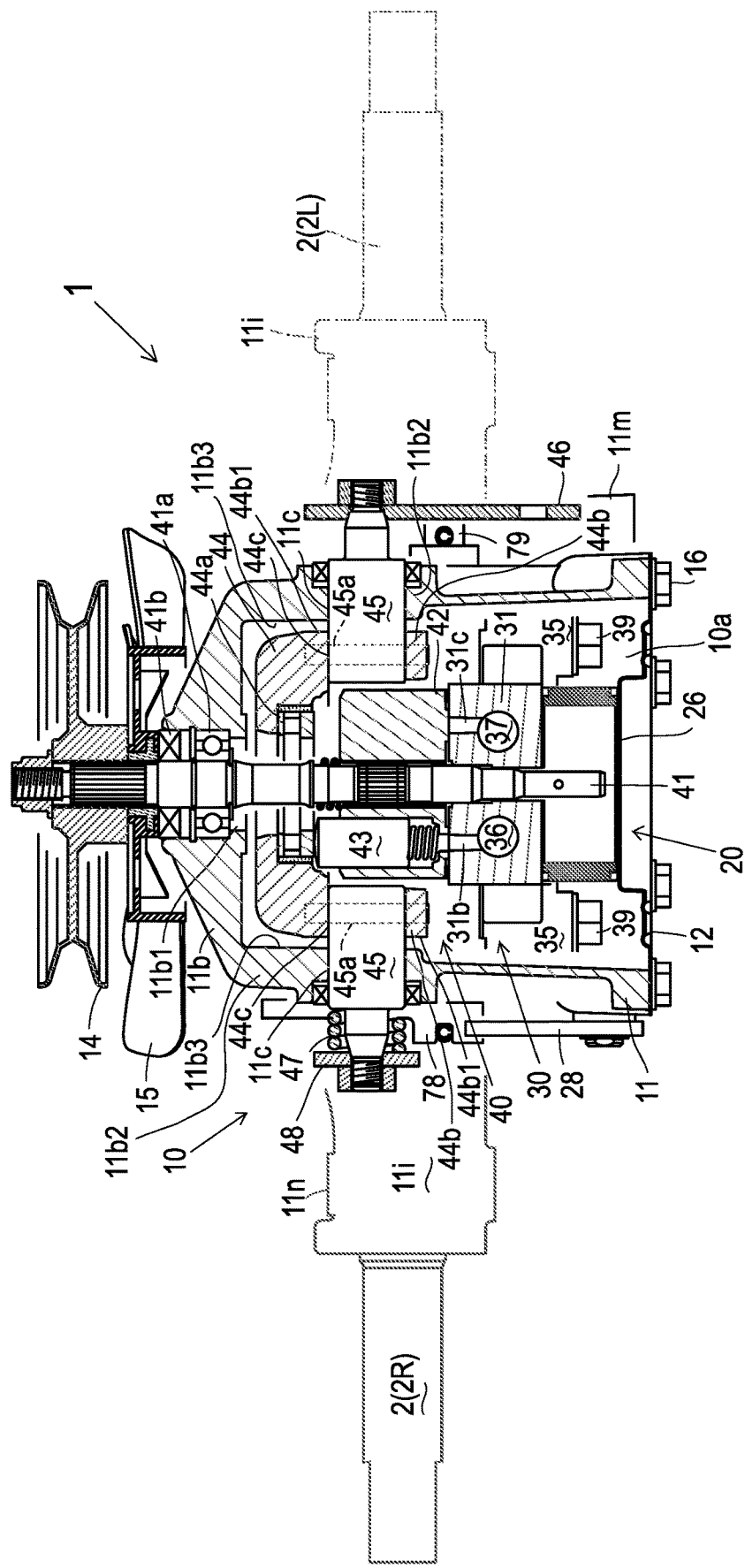
FIG. 8 is the same cross sectional front view of transaxle 1 as FIG. 7 except for an alternative arrangement of a hydrostatic stepless transmission (hereinafter referred to as HST) control arm 46 and a neutral return spring 47.

A front top portion of the ceiling wall of transaxle housing 11 is formed as a pump support portion 11b. Referring to FIGS. 7 and 8, transaxle housing 11 is formed through right and left side walls 11b2 of pump support portion 11b with right and left symmetric trunnion holes 11c. Movable swash plate 44 is formed with right and left symmetric feet 44b having respective right and left symmetric trunnion holes 44c. Right and left feet 44b are formed with respective right and left distal end surfaces 44b1 that are disposed adjacent to inside surfaces 11b3 of side walls 11b2 of pump support portion 11b of transaxle housing 11. While movable swash plate 44 is fitted to pump support portion 11b, right and left trunnions (trunnion shafts) 45 are fittingly passed through respective right and left trunnion holes 44c of movable swash plate 44 and respective right and left trunnion holes 11c of transaxle housing 11 so as to project at respective distal end portions thereof rightwardly and leftwardly outward from right and left side walls 11b2 of transaxle housing 11, respectively. Right and left fixture pins 45a fasten right and left feet 44b of movable swash plate 44 to fix right and left trunnion shafts 45, respectively, fitted in trunnion holes 44c.

In this way, hydraulic transaxle 1 comprises axial piston hydraulic pump 40 having the variable displacement, and transaxle casing 10 incorporating hydraulic pump 40. Hydraulic pump 40 includes movable swash plate 44 and the pair of trunnion shafts 45 coaxial to each other. The pair of trunnion shafts 45 are joined to swash plate 44 separably from swash plate 44. Swash plate 44 is rotatable centered on a common axis of trunnion shafts 45 to control the displacement of hydraulic pump 40. The common axis of trunnion shafts 45 defines an axial direction of trunnion shafts 45 perpendicular to a rotary axis of hydraulic pump 40, i.e., the vertical axis of pump shaft 41.

Transaxle casing 10 includes right and left side walls 11b2 opposite each other in the axial direction of trunnion shafts 45 with respect to hydraulic pump 40. Transaxle casing 10 includes right and left trunnion holes 11c serving as a pair of casing holes each of which penetrates each of side walls 11b2 between an inside of transaxle casing 10 and an outside of transaxle casing 10. Right and left trunnion shafts 45 are passed through respective trunnion holes 11c to be pivotally supported by respective side walls 11b2 of transaxle casing 10.

Swash plate 44 is formed with right and left feet 44b serving as a pair of side portions of swash plate 44 opposite each other in the axial direction of trunnion shafts 45. Right and left feet 44b face respective side walls 11b2 in the inside of transaxle casing 10. Swash plate 44 is formed with right and left trunnion holes 44c serving as a pair of swash plate holes in respective feet 44b serving as the respective side portions of swash plate 44. Right and left trunnion holes 44c are open to right and left trunnion holes 11c, respectively. Proximal end portions of right and left trunnion shafts 45 are inserted into respective trunnion holes 44c to be engaged to swash plate 44 unrotatably, relative to swash plate 44.

The distal end portion of one of trunnion shafts 45 projects from corresponding trunnion hole 11c to the outside of transaxle casing 10 so as to be operatively connected to the operation device for controlling the displacement of hydraulic pump 40, such as control lever 101R or 101L or speed control pedal 306, via HST control arm 46.

Therefore, the pair of trunnion shafts 45 can be easily installed into transaxle casing 10 and can be easily removed from transaxle casing 10 because the movement of direction of swash plate 44 to be installed or removed into and from transaxle casing 10 is the same as a movement direction of main component parts of hydraulic pump 40, such as pump cylinder block 42, to be installed or removed into and from transaxle casing 10. In this regard, due to the separation of trunnion shafts 45 from swash plate 44, swash plate 44 can easily be installed or removed into and from transaxle casing 10 independently of the insertion or withdrawing of trunnion shafts 45 into and from trunnion holes 11c of transaxle casing 10. Transaxle casing 10 does not need an opening for allowing movement of swash plate 44 in the axial direction of trunnion shafts 45. Therefore, transaxle casing 10 does not need a cover for covering the opening, thereby minimizing the number of housing members, such as main housing 11 and lower housing 12, for constituting transaxle casing 10.

Right and left feet 44b serving as the pair of side portions of swash plate 44 are formed with respective distal end surfaces 44b1 that are adjacent to inside surfaces 11b3 of respective side walls 11b2 of transaxle casing 10 so that a width of swash plate 44 between distal end surfaces 44b1 in the axial direction of trunnion shafts 45 is equal to or slightly less than a distance between inside surfaces 11b3 of side walls 11b2 of transaxle casing 10 in the axial direction of trunnion shafts 45. Therefore, swash plate 44 and transaxle casing 10 are minimized in the axial direction of trunnion shafts 45 so as to minimize transaxle 1.

Transaxle casing 10 includes transaxle housing 11 and lower housing 12 joined to each other at a horizontal joint plane parallel to the common axis of trunnion shafts 45. Transaxle housing 11 is formed integrally with the pair of side walls 11b2 having respective trunnion holes 11c. Therefore, due to the above-mentioned separation of trunnion shafts 45 from each other and swash plate 44, only transaxle housing 11 is formed with both side walls 11b2 having trunnion holes 11c, thereby reducing the number of parts and costs, in comparison with the conventional transaxle casing that has the opening for allowing the movement of the swash plate formed integrally with the trunnion shafts for installing or removing the swash plate into and from the inside space of the transaxle casing so as to need the cover for covering the opening and journaling one of the trunnion shafts.

Pump support portion 11b is formed with a vertical through hole 11b1. An upper portion of pump shaft 41 projecting upward from pump cylinder block 42 fitted on pump mounting surface 31a of center section 30 is freely passed through movable swash plate 44 fitted to pump support portion 11b and through vertical through hole 11b1 of pump support portion 11b so as to project upward from pump support portion 11b of transaxle housing 11. A bearing 41a and a fluid seal 41b are fitted in through hole 11b1 of pump support portion 11b so as to be interposed between pump shaft 41 and pump support portion 11b of transaxle housing 11. An input pulley 14 and a cooling fan 15 are fixed on the upper portion of pump shaft 41 projecting upward from pump support portion 11b of transaxle housing 11. Vehicle 100 or 300 is equipped with a prime mover (not shown) such as an engine whose output power is transmitted to input pulley 14 via a belt and so on.

Figure 6:
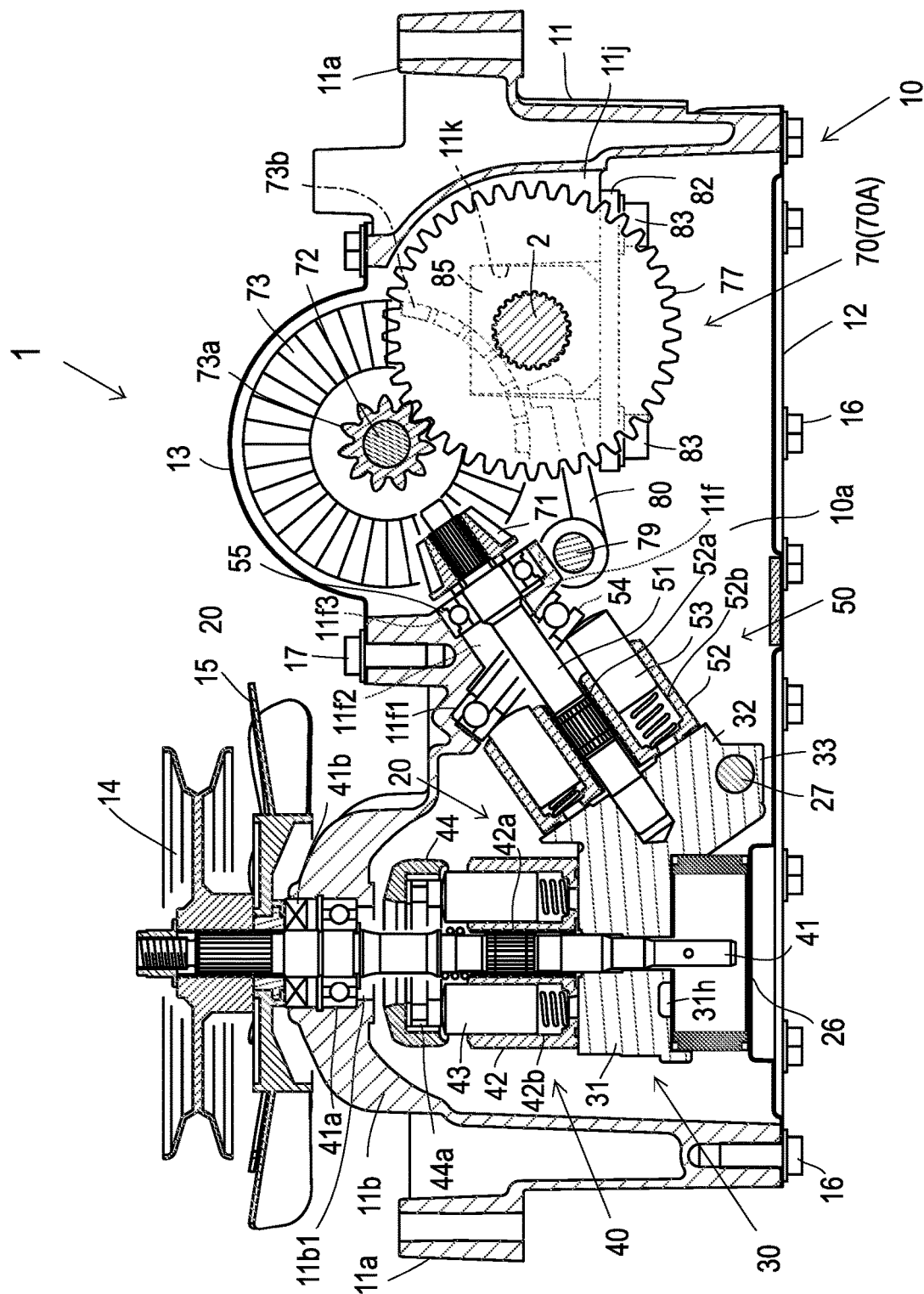
FIG. 6 is a cross sectional side view of transaxle 1 taken along A-A arrows of FIG. 3.

Referring to FIGS. 6 and 9, hydraulic motor 50 includes a motor shaft 51, a motor cylinder block 52, plungers 53 and a fixed swash plate 54. Motor shaft 51 is fitted into motor shaft hole 32d of center section 30 rotatably relative to center section 30. Motor cylinder block 52 is formed with a center through hole serving as a motor shaft hole 52a and with cylinder bores 52b aligned radially around motor shaft hole 52a. Motor shaft 51 is fittingly passed through motor shaft hole 52a unrotatably relative to motor cylinder block 52. Motor cylinder block 52 is slidably rotatably fitted onto motor mounting surface 32a of center section 30 so as to fluidly connect cylinder bores 52b therein to motor kidney ports 32b and 32c. Plungers 53 are fitted into respective cylinder bores 52b reciprocally in the axial direction of motor shaft 51, thereby constituting axial piston type hydraulic motor 50. A bearing abuts against heads of plungers 53 projecting from motor cylinder block 52 so as to serve as fixed swash plate 54.

Referring to FIG. 6, an inner surface of the ceiling wall of transaxle housing 11 at the fore-and-aft middle portion thereof between pump support portion 11b and top opening 11g is formed to protrude rearwardly downward slantwise so as to face upward slant motor port block 32 of center section 30, thereby serving as a motor support portion 11f. Motor support portion 11f is formed with a recess 11f1 that is open forwardly downward to face the front portion of chamber 10a in transaxle housing 11 incorporating HST 20. The thrust bearing serving as fixed swash plate 54 is fitted into forwardly downward open recess 11f1 to abut against the heads of plungers 53 projecting from motor cylinder block 52. On the other hand, motor support portion 11f is formed with another recess 11f3 that is open rearwardly upward to face the rear portion of chamber 10a in transaxle housing 11 incorporating reduction gear train 70, and a bearing 55 for journaling motor shaft 51 is fitted into rearwardly upward open recess 11f3. A through hole 11f2 is formed in motor support portion 11f between recesses 11f1 and 11f3. Motor shaft 51 is extended rearwardly upward from motor cylinder block 52 and is freely passed through fixed swash plate 54 and through hole 11f2 in motor support portion 11f. Further, motor shaft 51 is fittingly passed through bearing 55, and a tip portion of motor shaft 51 projects rearwardly upward from bearing 55 so as to be fixedly provided thereon with a bevel pinion 71.

The advantage of hydraulic motor 50 having the slant axis with regard to the vertical axis of hydraulic pump 40 is to horizontally and vertically minimize a portion of transaxle 1 incorporating hydraulic motor 50 while ensuring the sufficient length of motor shaft 51 and the sufficient capacity of motor cylinder block 52. Therefore, the dimension of transaxle 1 in the fore-and-aft direction between pump shaft 41 serving as the input shaft of transaxle 1 and axle 2 serving as the output shaft of transaxle 1 and the dimension in the lateral direction of transaxle casing 10 required to incorporate both hydraulic pump 40 and hydraulic motor 50 are shortened to facilitate the mounting of transaxle 1 on a small vehicle. In this embodiment, the fore-and-aft middle portion of transaxle casing 10 incorporating hydraulic motor 50 between the front portion of transaxle casing 10 incorporating hydraulic pump 40 and the rear portion of transaxle casing 10 incorporating reduction gear train 70 is shortened in the fore-and-aft direction so as to reduce the entire fore-and-aft length of transaxle 1, and is lowered at the top portion thereof so as to reduce the vertical dimension of the fore-and-aft middle portion of transaxle 1.

More specifically, to enhance the effect of reducing the fore-and-aft dimension and vertical dimension of transaxle 1 from pump shaft 41 to the rear upper end of motor shaft 51 that is more distant from pump shaft 41 than the front lower end of motor shaft 51, it is preferable that the vertical axis of pump shaft 41 and the vertically slant axis of motor shaft 51 have an acute angle therebetween.

HST 20 is installed in chamber 10a in transaxle housing 11 while the bottom opening of chamber 10a is opened by removing lower cover 12 from transaxle housing 11 and top opening 11g is opened by removing top cover 13 from transaxle housing 11. In this regard, movable swash plate 44, trunnion shafts 45 and fixed swash plate 54 are inserted into chamber 10a in transaxle housing 11 through the bottom opening of chamber 10a, so that movable swash plate 44 is fitted to pump support portion 11b, right and left trunnion shafts 45 are fitted through trunnion holes 11c and are fixed to movable swash plate 44, and fixed swash plate 54 is fitted to motor support portion 11f.

Then, center section 30 having pump cylinder block 42 on pump mounting surface 31a and having motor cylinder block 52 on motor mounting surface 32a is inserted into chamber 10a in transaxle housing 11 through the bottom opening of chamber 10a so as to make the heads of plungers 43 abut against movable swash plate 44 fitted to pump support portion 11b and so as to make the heads of plungers 53 abut against fixed swash plate 54. Bolts 38 and 39 are passed through holes 34a and 35a of bosses 34 and 35 and are screwed upward into transaxle housing 11, thereby fixing center section 30 to transaxle housing 11.

Cylindrical filter 26 of HST 20 is mounted on an inner surface of lower cover 12. After HST 20 except for filter 26 is assembled in chamber 10a in transaxle housing 11 as mentioned above, lower cover 12 is fitted to the bottom edge of transaxle housing 11 so as to cover the bottom opening of chamber 10a in transaxle housing 11, thereby fitting filter 26 on lower cover 12 to filter mounting surface 31e of center section 30. Then, bolts 16 are screwed into the bottom edge of transaxle housing 11 so as to fasten lower cover 12 to transaxle housing 11. Incidentally, a charge pump such as a trochoidal pump may be disposed in filter 26 and fitted to filter mounting surface 31e of center section 30. The bottom end portion of pump shaft 41 projecting downward in filter 26 from filter mounting surface 31e of center section 30 can be used as a drive shaft for the charge pump disposed in filter 26. Preferably, center section 30 has an inner fluid passage configured to distribute the fluid delivered from the charge pump to valve ports 22a.

Figure 14A:
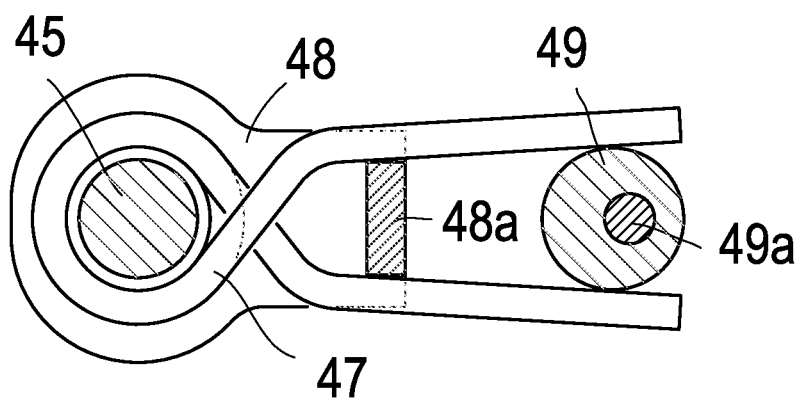
FIG. 14(a) is a sectional side view of a trunnion shaft 45 and an eccentric pin 49 showing neutral return spring 47 when a movable swash plate 44 of HST 20 is disposed at a neutral position.
Figure 14B:
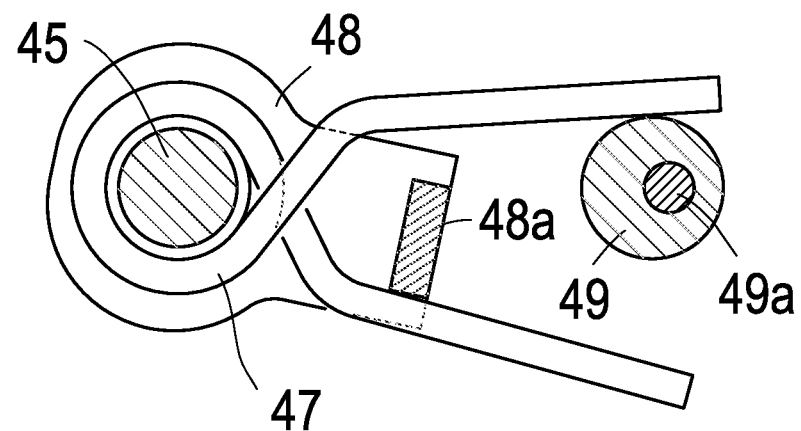
FIG. 14(b) is a sectional side view of trunnion shaft 45 and eccentric pin 49 showing neutral return spring 47 when movable swash plate 44 of HST 20 is not disposed at the neutral position.
Figure 15:
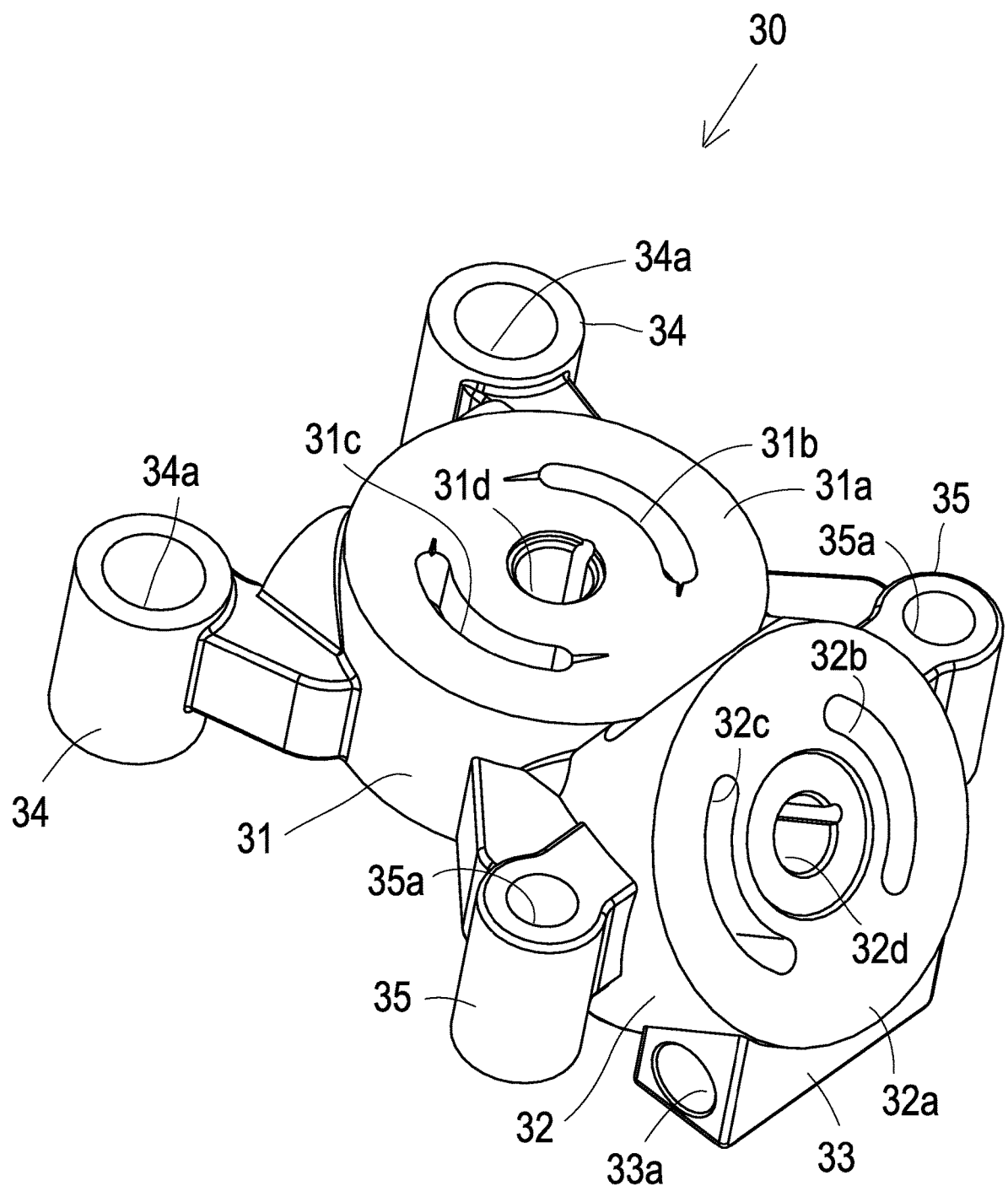
FIG. 15 is a perspective view of a center section 30 for HST 20.
Figure 16:
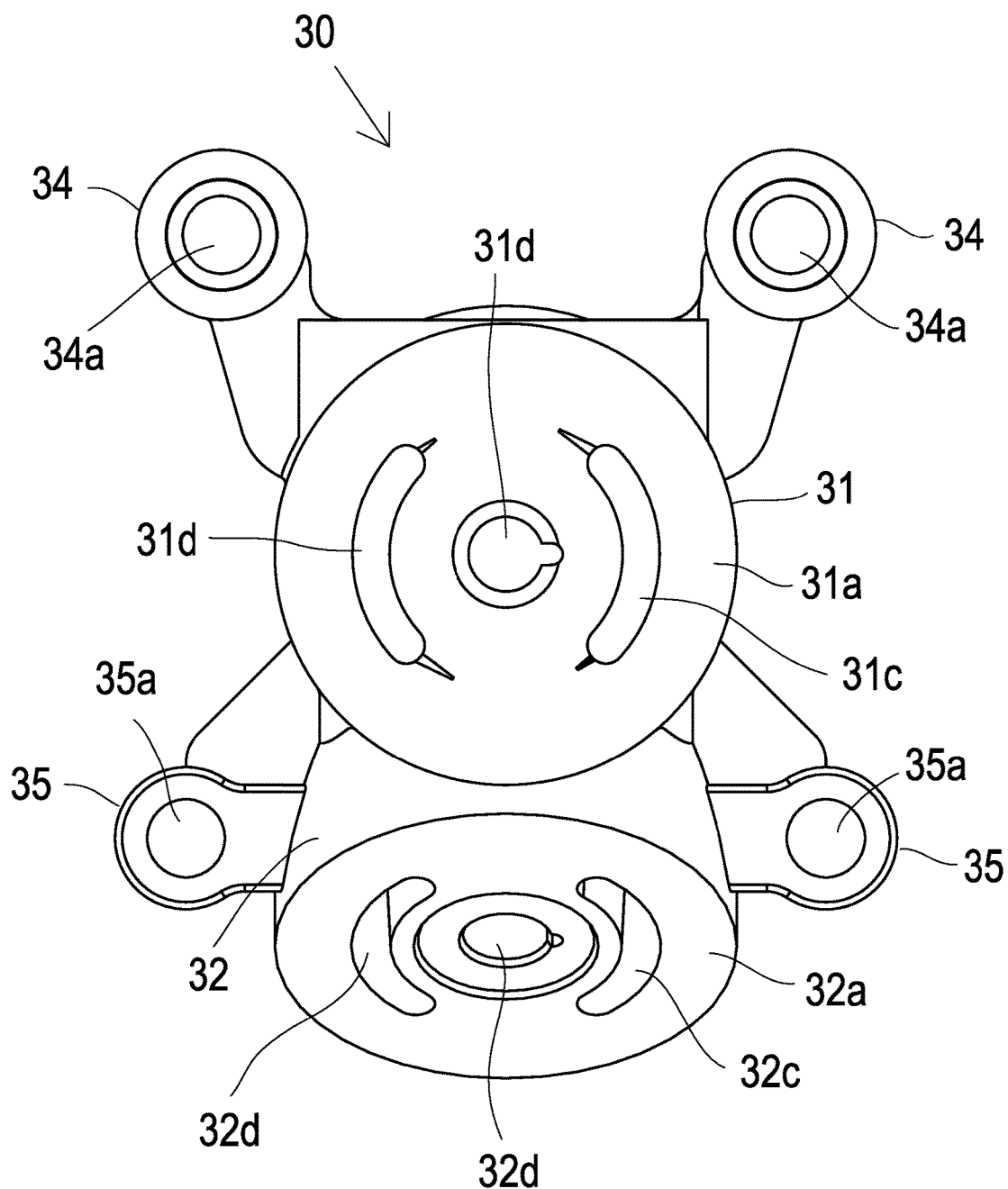
FIG. 16 is a plan view of center section 30.

Further, HST control arm 46 is fixed on the distal end portion of one of right and left trunnion shafts 45 projecting outward from transaxle housing 11 so that the tilt angle and direction of movable swash plate 44 of hydraulic pump 40 is controlled by rotating HST control arm 46. On the other hand, a neutral return spring 47 and a spring retainer 48 are provided on the distal end portion of one of right and left trunnion shafts 45 opposite HST control arm 46. In this regard, as shown in FIGS. 3, 14(a) and 14(b), neutral return spring 47 is coiled on the distal end portion of trunnion shaft 45 and both end portions of neutral return spring 47 are twisted to cross each other and are extended rearward. Spring retainer 48 is fixed on the distal end portion of trunnion shaft 45 by a nut so as to cover the coiled neutral return spring 47. Spring retainer 48 is formed with a stopper 48a that is disposed between the rearwardly extended end portions of neutral return spring 47.

As shown in FIG. 9, right or left side wall 11b2 of transaxle housing 11 adjacently rearward from trunnion shaft 45 having neutral returning spring 47 and spring retainer 48 thereon is formed with an eccentric pin hole 11d, and a laterally horizontal axis shaft 49a of an eccentric pin 49 is fitted into eccentric pin hole 11d. In this regard, right and left side walls 11b2 of transaxle housing 11 adjacently rearward from right and left trunnion holes 11c are formed to have sufficient thickness before boring eccentric pin hole 11d so that either the right or left wall can be selectively bored with eccentric pin hole 11d.

Eccentric pin 49 is fitted on a portion of axis shaft 49a projecting outward from transaxle housing 11 and a nut is screwed on a distal end of axis shaft 49a so as to fasten eccentric pin 49 to axis shaft 49a. The biasing force of spring 47 functions to move both rearwardly extended end portions of spring 47 toward each other when viewed in side. Therefore, movable swash plate 44 and HST control arm 46 are set at their neutral positions when both end portions of spring 47 pinch eccentric pin 49 therebetween as shown in FIG. 14(a). When HST control arm 46 fixed on one trunnion shaft 45 is rotated to move movable swash plate 44 from the neutral position, spring retainer 48 fixed on the other trunnion shaft 45 also rotates so that stopper 48a pushes one end portion of spring 47 away from the other end portion of spring 47 as shown in FIG. 14(b), thereby generating the above-mentioned biasing force of spring 47. When HST control arm 46 having been moved from the neutral position is released, both ends of spring 47 are returned by their own biasing force to pinch eccentric pin 49, thereby returning movable swash plate 44 and HST control arm 46 to their neutral positions.

Due to the eccentricity of eccentric pin 49 to axis shaft 49a, the neutral position of HST control arm 46 defined as the position where both end portions of spring 47 pinch eccentric pin 49 can be adjusted relative to the real neutral position of movable swash plate 44 for stopping the fluid delivery from hydraulic pump 40. In this regard, by loosening the nut, the rotational position of eccentric pin 49 pinched by neutral returning spring 47 relative to axis shaft 49a can be changed to adjust the neutral position of HST control arm 46 relative to the neutral position of movable swash plate 44.

In this way, transaxle 1 comprises HST control arm 46 and the neutral biasing mechanism, including spring 47, for biasing swash plate 44 to the neutral position for hydraulic pump 40. HST control arm 46 is provided on an outside end portion of a corresponding one of side walls 11b2 of transaxle casing 10 to be fixed on the distal end portion of one of trunnion shafts 45 so as to operatively connect swash plate 44 to the operation device such as control lever 101R or 101L or speed control pedal 306. Trunnion shafts 45 are identical in shape to each other. The neutral biasing mechanism is provided on an outside end portion of the other of side walls 11b2 of transaxle casing 10 to be provided on a distal end portion of the other of trunnion shafts 45.

Therefore, the pair of trunnion shafts 45 identical in shape the neutral biasing mechanism including spring 47 can be easily provided or removed on and from of the outside end portion of side wall 11b2 of transaxle casing 10 journaling the other trunnion shaft 45 than trunnion shaft 45 having HST control arm 46 thereon.

Further, as shown in FIG. 9, right and left symmetric bypass valve holes 11e are formed through right and left side walls of transaxle housing 11 facing respective right and left end surfaces of bypass valve block 33 of center section 30. As mentioned above, laterally horizontal axial bypass valve 27 is fitted in bypass valve hole 33a rotatably relative to center section 30. One of right and left ends of bypass valve 27 is disposed in bypass valve hole 33a and the other of right and left ends of bypass valve 27 projects outward from the corresponding right or left end of bypass valve block 33 and is passed through corresponding right or left bypass valve hole 11e rotatably relative to transaxle housing 11 so as to project outward from transaxle housing 11. A bypass valve arm 28 is fixed on the end portion of bypass valve 27 projecting from transaxle housing 11. In this way, either right or left bypass valve hole 11e can be selectively used for passing bypass valve 27.

Figure 11:
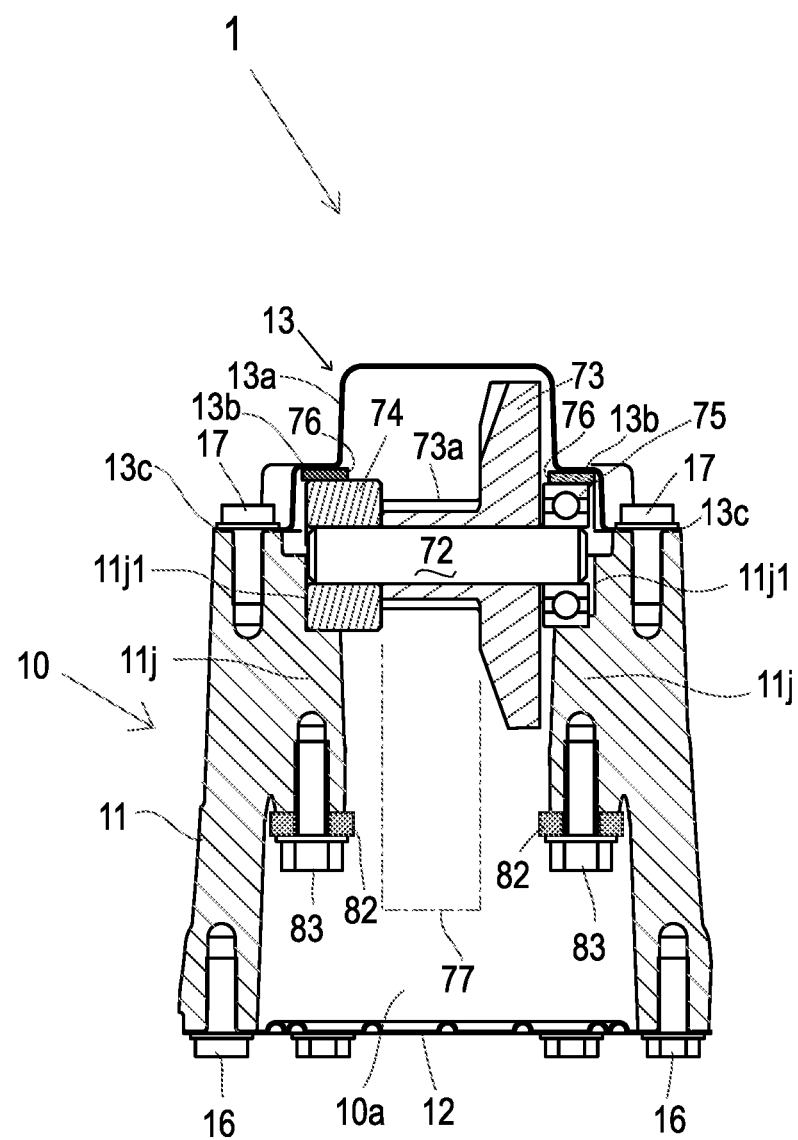
FIG. 11 is a cross sectional rear view of transaxle 1 taken along E-E arrows of FIG. 3 wherein an HST 20 and relevant arms are omitted.

As shown in FIGS. 6 and 11, a laterally horizontal gear shaft 72 is disposed in chamber 10a adjacent to the fore-and-aft middle portion of top opening 11g and is supported at right and left ends thereof by right and left side walls 11j. In this regard, top edges of right and left side walls 11j facing top opening 11g are formed with respective recesses 11j1 facing each other. A bearing 74 is fitted in recess 11j1 of one side wall 11j so as to journal one end of gear shaft 72. A bearing 75 is fitted in recess 11j1 of the other side wall 11j so as to journal the other end of gear shaft 72. Right and left bearings 74 and 75 project upward from the top edges of side walls 11j, and right and left bearing covers 76 are provided on the top edges of side walls 11j so as to cover respective bearings 74 and 75.

Referring to FIGS. 6 and 10 to 13, a bevel gear 73 formed with a spur pinion 73a is fixed on gear shaft 72 between right and left bearings 74 and 75. Bevel gear 73 meshes with bevel pinion 71 fixed on the tip portion of motor shaft 51. An axial boss of bevel gear 73 extended along gear shaft 72 serves as spur pinion 73a. A spur bull gear 77 is fixed on axle 2 supported by transaxle housing 11 and meshes with spur pinion 73a. Therefore, pinions 71 and 73a and gears 73 and 77 constitute reduction gear train 70 for transmitting power from motor shaft 51 of HST 20 to axle 2.

Transaxle 1 includes a gear locking mechanism for applying a parking brake to reduction gear train 70 and axle 2, the gear locking mechanism including a locking pawl 80 adapted to engage with bevel gear 73 meshing with bevel pinion 71 fixed on motor shaft 51. Referring to FIG. 10, right and left symmetric shaft holes 11h are formed through right and left side walls of transaxle housing 11, and a laterally horizontal locking shaft 79 is supported through right and left shaft holes 11h rotatably relative to transaxle housing 11. Either the right or left end of locking shaft 79 is selected to have a locking arm 78 fixed thereon. Referring to FIGS. 6, 10 to 13, bevel gear 73 is peripherally formed on a back surface thereof with plural recesses 73b. A locking pawl 80 is fixed on locking shaft 79. By rotating locking arm 78 and locking shaft 79, locking pawl 80 is shiftable between a locking position where locking pawl 80 is hooked into any one of recesses 73b to lock gear 73 and an unlocking position where locking pawl 80 is not hooked into any recess 73b. By setting locking pawl 80 at the locking position, gear 73 is locked, thereby stopping axle 2 for parking vehicle 100 or 300.

In this regard, referring to FIG. 10, locking shaft 79 is formed with right and left pin holes 79a. One of pin holes 79a is selected and a lock pin 80a is inserted into selected pin hole 79a to fasten locking hook 80 to locking shaft 79. Whether right or left pin hole 79a is selected depends on whether bevel gear 73 is disposed rightward or leftward of pinion 73a. In the embodiment of FIG. 10, right pin hole 79a is selected to fix locking hook 80 to locking shaft 79 because bevel gear 73 is disposed rightward of pinion 73a.

More specifically, the rotary direction of axle 2 depends on the rotary direction of bevel gear 73 and pinion 73a, and the rotary direction of bevel gear 73 depends on whether bevel pinion 71 meshes with bevel gear 73 at the right or left side thereof, i.e., whether bevel pinion 73 is disposed rightward or leftward of pinion 73a. Therefore, if the rotary direction of pump shaft 41 relative to an engine mismatches with the rotary direction of axle 2 for ensuring the desired travel direction of the vehicle, bevel gear 73 with pinion 73a can be reversed to change its position relative to bevel pinion 71 so as to correctly match the rotary direction of axle 2 with the rotary direction of pump shaft 41 relative to the engine for ensuring the desired travel direction of the vehicle.

Referring to FIGS. 3, 5 and 11 to 13, top cover 13 is formed with a central cover portion 13a, a flange 13c and right and left side cover portions 13b between central cover portion 13a and flange 13c. Flange 13c is fastened onto a top edge of transaxle housing 11 surrounding top opening 11g by screwing bolts 17 downward into the ceiling wall of transaxle housing 11, thereby fixing top cover 13 on transaxle housing 11 so that central cover portion 13a and surrounding cover portion 13b cover top opening 11g. Central cover portion 13a is arc-shaped in the side view along the periphery of the upper portion of bevel gear 73 projecting upward from top edges of side walls 11*j* of transaxle housing 11. Right and left side cover portions 13*b* have respective horizontal flat surfaces that are lower than the major part of central cover portion 13*a*. The horizontal flat surfaces of right and left horizontal side cover portions 13*b* are fitted onto the top portions of right and left bearing covers 76 projecting upward from the top edges of side walls 11*j* of transaxle housing 11.

Incidentally, the top of central cover portion 13*a* is lower than input pulley 14 fixed on the top portion of pump shaft 41 projecting upward from pump support portion 11*b*. Therefore, even if an engine is disposed rearward from transaxles 1R and 1L arranged so as to have HSTs 20 forward from reduction gear trains 70 as mentioned above, or even if an engine is disposed forward from transaxles 1R and 1L arranged so as to have HSTs 20 rearward from reduction gear trains 70, a belt looped over an output pulley of the engine and input pulleys 14 of transaxles 1R and 1L is prevented from interfering with central cover portion 13*a*, thereby enhancing the freedom of layout of the right and left transaxles 1R and 1L in the vehicle relative to the engine.

Figure 12:
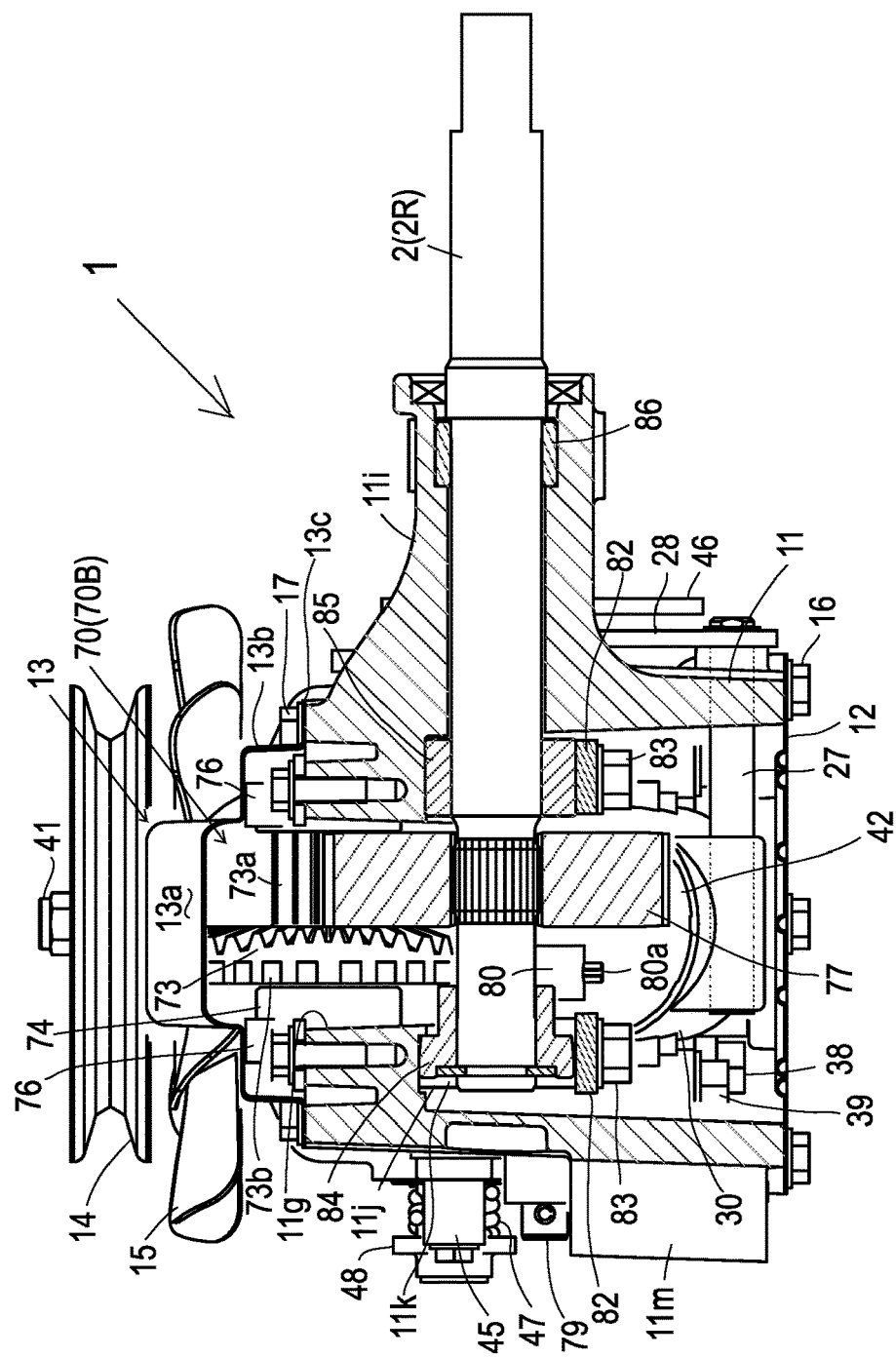
FIG. 12 is a cross sectional rear view of transaxle 1 taken along F-F arrows of FIG. 3.
Figure 13:
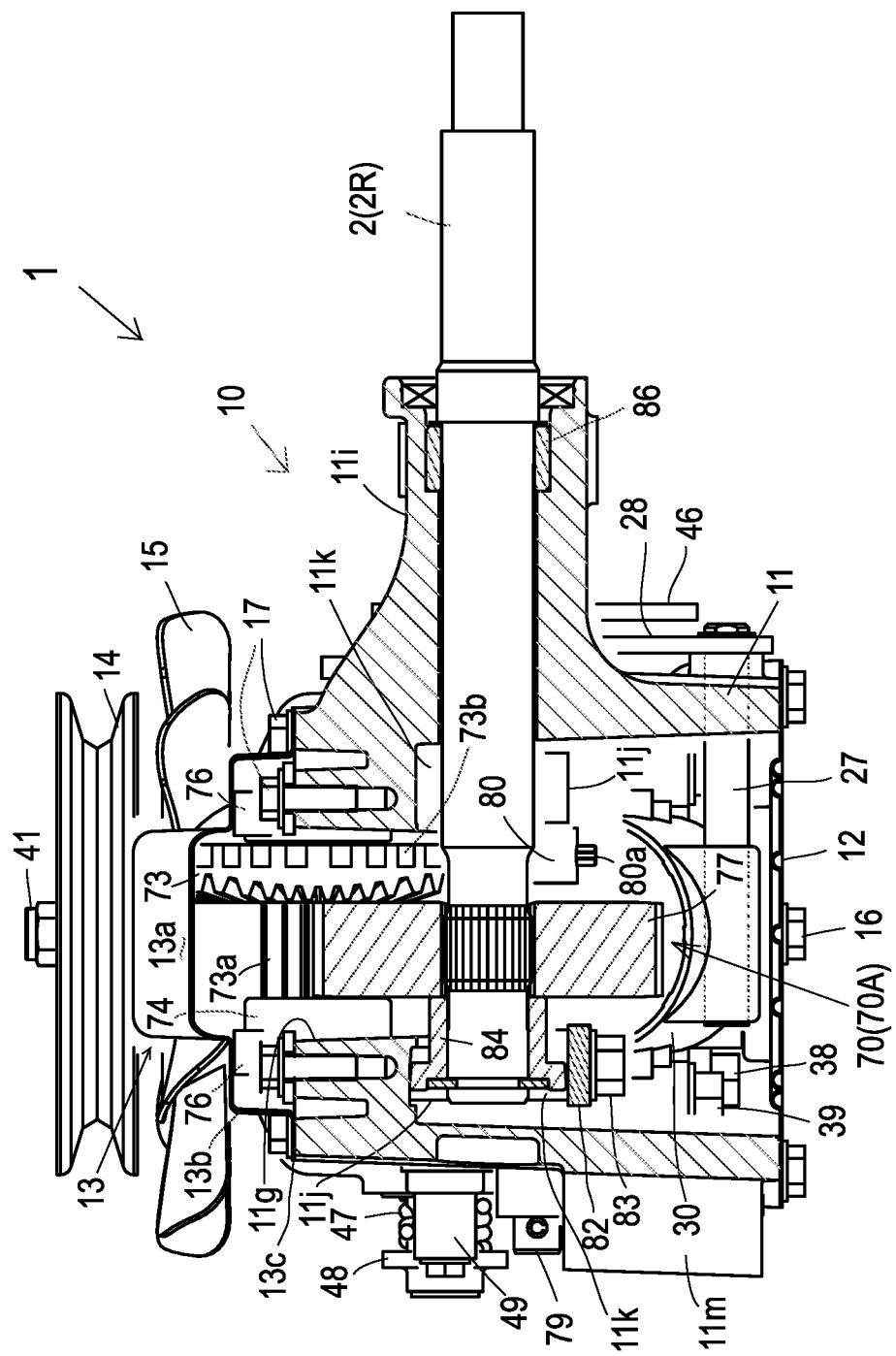
FIG. 13 is the same cross sectional rear view of transaxle 1 as FIG. 12 except for an alternative reduction gear train 70B.

Referring to FIGS. 12 and 13, axle support portion 11*i* journals axle 2 via a bush 86. Axle 2 supported by axle support portion 11*i* is extended at a distal portion thereof outward from a distal end of axle support portion 11*i*, and is extended at a proximal portion thereof into chamber 10*a* in transaxle housing 11 between right and left support wall portions 11*j* so as to be fixedly provided thereon with bull gear 77 meshing with pinion 73*a*.

In this regard, as shown in FIG. 6, each of right and left support wall portions 11*j* is formed to have a reverse U-shaped edge 11*k* defining top, front and rear ends of an opening that laterally penetrates each support wall portion 11*j* and is downwardly open. A bearing 84 is disposed in the opening defined by one of right and left edges 11*k* or bearings 84 or 85 are disposed in the openings defined by respective right and left edges 11*k* so as to journal axle 2. Each reverse U-shaped edge 11*k* has front and rear bottom ends to which a support plate 82 can be fastened by front and rear bolts 83 so as to close the downward open end of the opening, thereby supporting bearing 84 or 85 in the opening defined by edge 11*k*.

Regardless of whether transaxle 1 serves as right transaxle 1R or left transaxle 1L, two types are prepared as reduction gear train 70 of transaxle 1 as mentioned above. One type referred to as a reduction gear train 70A has bevel gear 73 being closer to axle support portion 11*i* than pinion 73*a*, as shown in FIG. 12. The other type referred to as a reduction gear train 70B has bevel gear 73 being more distant from axle support portion 11*i* than pinion 73*a*, as shown in FIG. 13.

When reduction gear train 70A having bevel gear 73 rightward of pinion 73*a* in FIG. 12 is selected as reduction gear train 70 of transaxle 1, bull gear 77 meshing with pinion 73*a* approaches the proximal end of axle 2 so as to sufficiently receive the support force from bearing 84 fitted to one reverse U-shaped edge 11*k*. Therefore, it is unnecessary to use the opening defined by the other reverse U-shaped edge 11*k* closer to axle support portion 11*i* for journaling axle 2 so that axle 2 is journalled at two points by bearings 84 and 86.

When reduction gear train 70B having bevel gear 73 leftward of pinion 73*a* in FIG. 13 is selected as reduction gear train 70 of transaxle 1, bull gear 77 meshing with pinion 73*a* comes distant from bearing 84 so as to insufficiently receive the support force from bearing 84. Therefore, the opening defined by reverse U-shaped edge 11*k* closer to axle support portion 11*i* has bearing 85 journaling an axial intermediate portion of axle 2 therein. In this regard, bearing 85 journaling axle 2 is fitted to edge 11*k*, and another support plate 82 is fastened to front and rear bottom ends of edge 11*k* fitting bearing 85 by front and rear bolts 83 so as to close the downward open end of the opening, thereby supporting bearing 85. Therefore, axle 2 is journalled at three points by bearings 84, 85 and 86.

Referring to FIGS. 21 to 30, description will be given of an alternative transaxle 1A including axle 2, an HST 120 and a reduction gear train 170 for transmitting power from HST 120 to axle 2. Transaxle 1A has members and portions designated by the same reference numerals as those used for transaxle 1. Description of these members and portions of transaxle 1A will be omitted unless otherwise specifically noted, because they are identical or similar to the corresponding members and portions of transaxle 1 with regard to arrangement, structure, function and the like. Further, some reference numerals to be used to designate corresponding members and portions of transaxle 1 are omitted from the drawings illustrating transaxle 1A on the premise that the members and portions of transaxle 1A illustrated as being identical or similar to the corresponding members and portions of transaxle 1 should have been marked with the same reference numerals as those designating the corresponding members and portions of transaxle 1. Further, on the assumption that HST 120 is disposed forward from axle 2 and reduction gear train 170, illustrated transaxle 1A serves as right transaxle 1R carrying right axle 2R, however, transaxle 1A may be adapted as left transaxle 1L carrying left axle 2L.

A transaxle casing 110 of transaxle 1A includes an upper transaxle housing 111, a lower transaxle housing 112 and a gear top cover 113. Bolts 116 are screwed upward to fasten a flanged top edge of lower transaxle housing 112 to a bottom edge of upper transaxle housing 111 fringing a bottom opening of upper transaxle housing 111. Bolts 117 are screwed downward to fasten a flanged bottom edge of gear top cover 113 to a top edge of a rear half portion of upper transaxle housing 111 fringing a top opening of the rear half portion of upper transaxle housing 111.

In comparison with substantially horizontally flat thin plate-shaped bottom cover 12 fixed to the bottom edge of transaxle housing 11 defining the bottom end of transaxle casing 10, lower transaxle housing 112 has an inner space whose vertical dimension defines a depth for accommodating a lower portion of bull gear 77 and a lower portion of HST 2. Especially, center section 30 fastened to upper transaxle housing 111 via bolts 38 and 39 screwed through bosses 34 and 35 has filter mounting surface 31*e* (see FIGS. 17 and 20) that is level with the bottom edge of upper transaxle housing 111, and the top edge of cylindrical filter 26 accommodated in lower transaxle housing 112 is level with the top edge of lower transaxle housing 112, so that the top edge of filter 26 in lower transaxle housing 112 can be easily fitted to filter mounting surface 31*e*, and the top outer peripheral surface of filter 26 to filter retainers 31*i*, when the bottom edge of upper transaxle housing 111 is joined to the top edge of lower transaxle housing 112.

In this regard, a space in transaxle casing 10 between slanted hydraulic motor 50 and flat bottom cover 12 serving as the bottom end of transaxle casing 10 below hydraulic motor 50 has a considerably great vertical length, and right and left vertical walls of transaxle housing 11 are extended downward to ensure this space in transaxle casing 10. Fluid in this space serves as a part of the fluid sump in transaxle casing 10, thereby increasing the volume of the fluid sump so as to increase the weight of transaxle 1. On the contrary, the space in transaxle casing 110 between slanted hydraulic motor 50 and the bottom portion of transaxle casing 110 below hydraulic motor 50 is defined by lower transaxle housing 112. The bottom of the fore-and-aft middle portion of lower transaxle housing 112 below hydraulic motor 50 is formed higher than the bottom of the front portion of lower transaxle housing 112 incorporating the bottom portion of center section 30 and filter 26 and is slanted to have a shape corresponding to the lower side portion of hydraulic motor 50. Further, the bottom of the rear portion of lower transaxle housing 112 is formed higher than the bottom of the front portion of lower transaxle housing 112 and is curved so as to have a shape corresponding to the lower end portion of bull gear 77. Therefore, the space between hydraulic motor 50 and bull gear 77 and lower transaxle housing 112 is reduced so as to reduce the volume of the fluid sump in transaxle casing 110, thereby lightening transaxle 1A.

As discussed later, transaxle 1A is provided with a gear locking system 180 for applying a parking brake to reduction gear train 170 and axle 2. In this regard, referring to FIG. 22, gear top cover 113 of transaxle casing 110 for accommodating an upper portion of reduction gear train 170 supports locking shaft 79 of gear locking system 180, in comparison with transaxle housing 11 of transaxle casing 10 that supports locking shaft 79. Therefore, gear top cover 113 of transaxle casing 110 for transaxle 1A is a thick cover made by die-casting or the like so as to ensure a sufficient rigidity for supporting locking shaft 79, in comparison with thin plate-shaped gear top cover 13 of transaxle casing 10 for transaxle 1, which does not support locking shaft 79.

Figure 26:
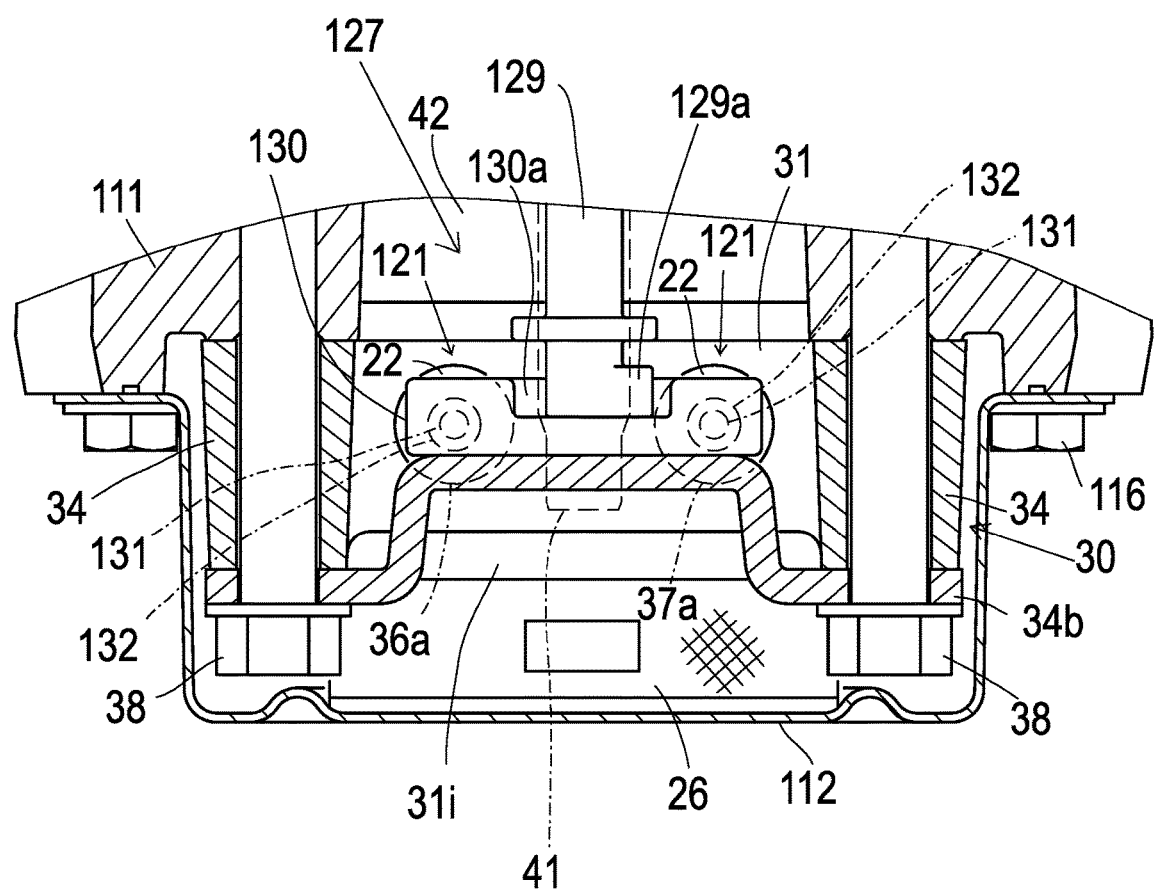
FIG. 26 is a fragmentary sectional front view of transaxle 1A taken along K-K arrows of FIG. 22, showing front views of charge check and bypass valves 121 having function as bypass valves in HST 120 and a bypass valve operation mechanism 127.
Figure 27:
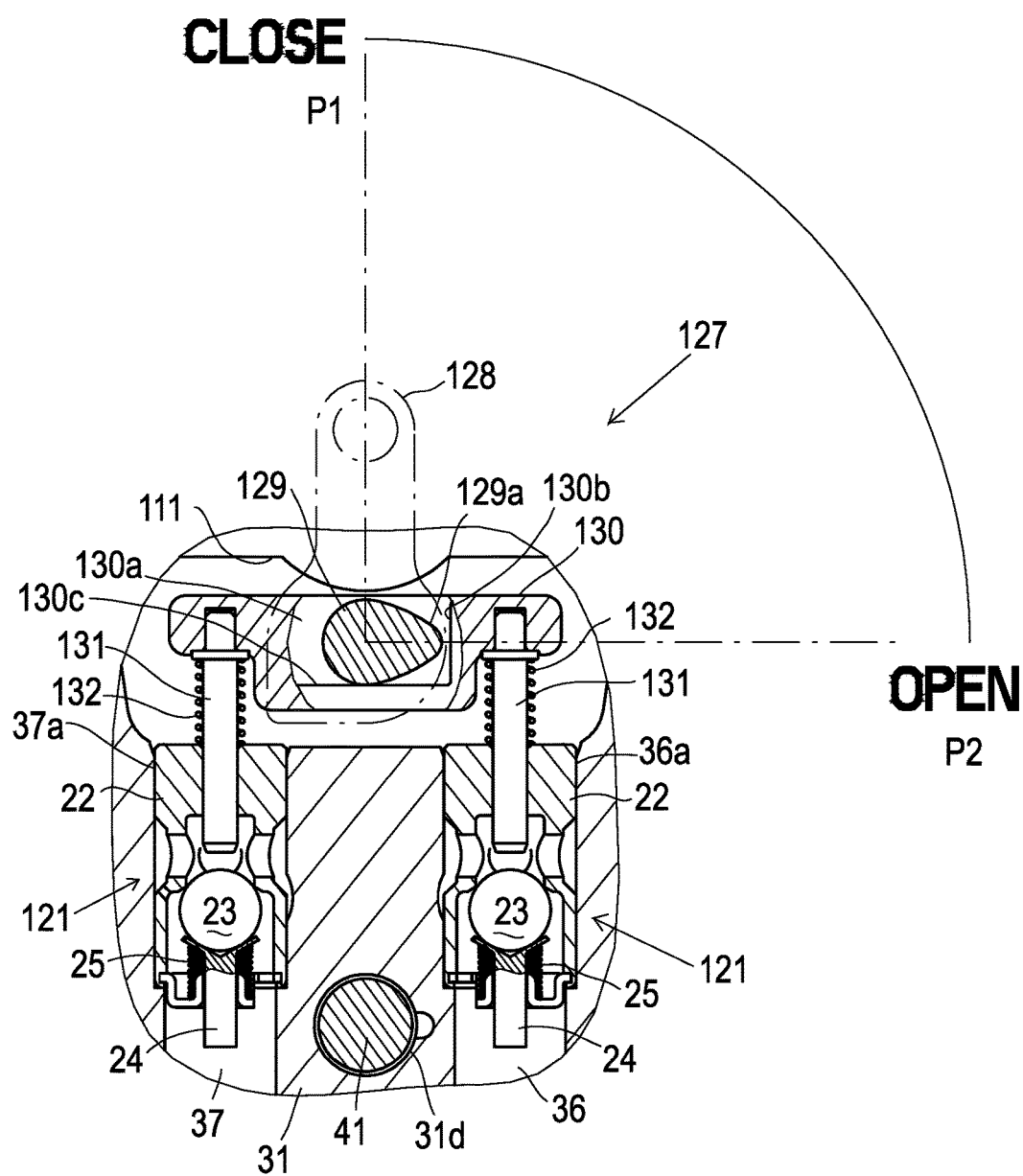
FIG. 27 is a fragmentary sectional plan view of transaxle 1A taken along L-L arrows of FIG. 23, showing front views of charge check 121 having the function as bypass valves in HST 120 and bypass valve operation mechanism 127.
Figure 28:
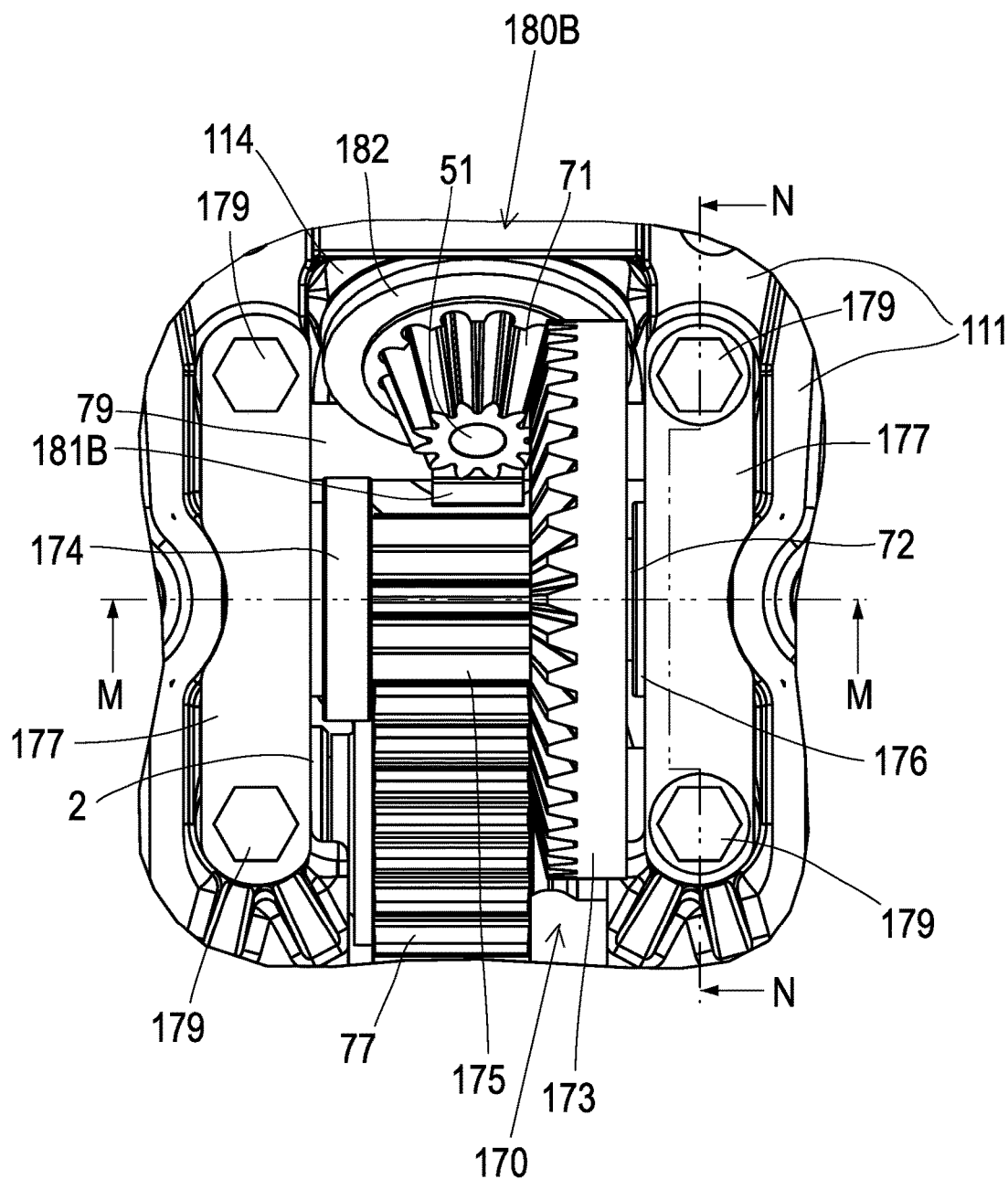
FIG. 28 is a plan view of reduction gear train 170 in transaxle casing 110 of transaxle 1A from which a gear top cover 113 has been removed, showing a gear locking system 180B serving as another embodiment of gear locking system 180.

Features of HST 120 of transaxle 1A distinguished from corresponding features of HST 20 of transaxle 1 will be described. Referring to FIGS. 26 and 27, right and left charge check valves 121 having function as bypass valves are fitted in respective right and left charge check valve chambers 36a and 37a formed in center section 30. Right and left charge check valves 121 correspond to right and left charge check valves 21 excluding that charge check and bypass valves 121 are additionally provided with respective pressure rods 131 that are disposed parallel to each other mechanically operably for simultaneous opening of charge check valves 121. Therefore, HST 120 does not have an additional bypass valve corresponding to bypass valve 27 as shown in FIG. 9 to be disposed in center section 30, so that center section 30 can be formed without bypass valve hole 33a for accommodating bypass valve 27 and/or without bypass ports 33b and 33c for fluidly connecting bypass valve 27 to a fluid sump in transaxle casing 110, thereby reducing processes to form center section 30.

Referring to FIGS. 22, 23, 26 and 27, transaxle 1A is provided with a bypass valve operation mechanism 127 for operating right and left charge check valves 121 to function as bypass valves. Bypass valve operation mechanism 127 includes a bypass valve operation arm 128, a vertical camshaft 129 formed with a cam 129a, a pressure member 130, right and left pressure rods 131 and springs 132 wound respective pressure rods 131. Upper transaxle housing 111 journals vertical camshaft 129. Bypass valve operation arm 128 is fixed on a top end of camshaft 129 projecting upward from upper transaxle housing 111 of transaxle casing 110. Referring to FIG. 27, bypass valve operation arm 128 is rotatable to be shifted between a valve-close position P1 as drawn in phantom lines and a valve-open position P2.

Figure 22:
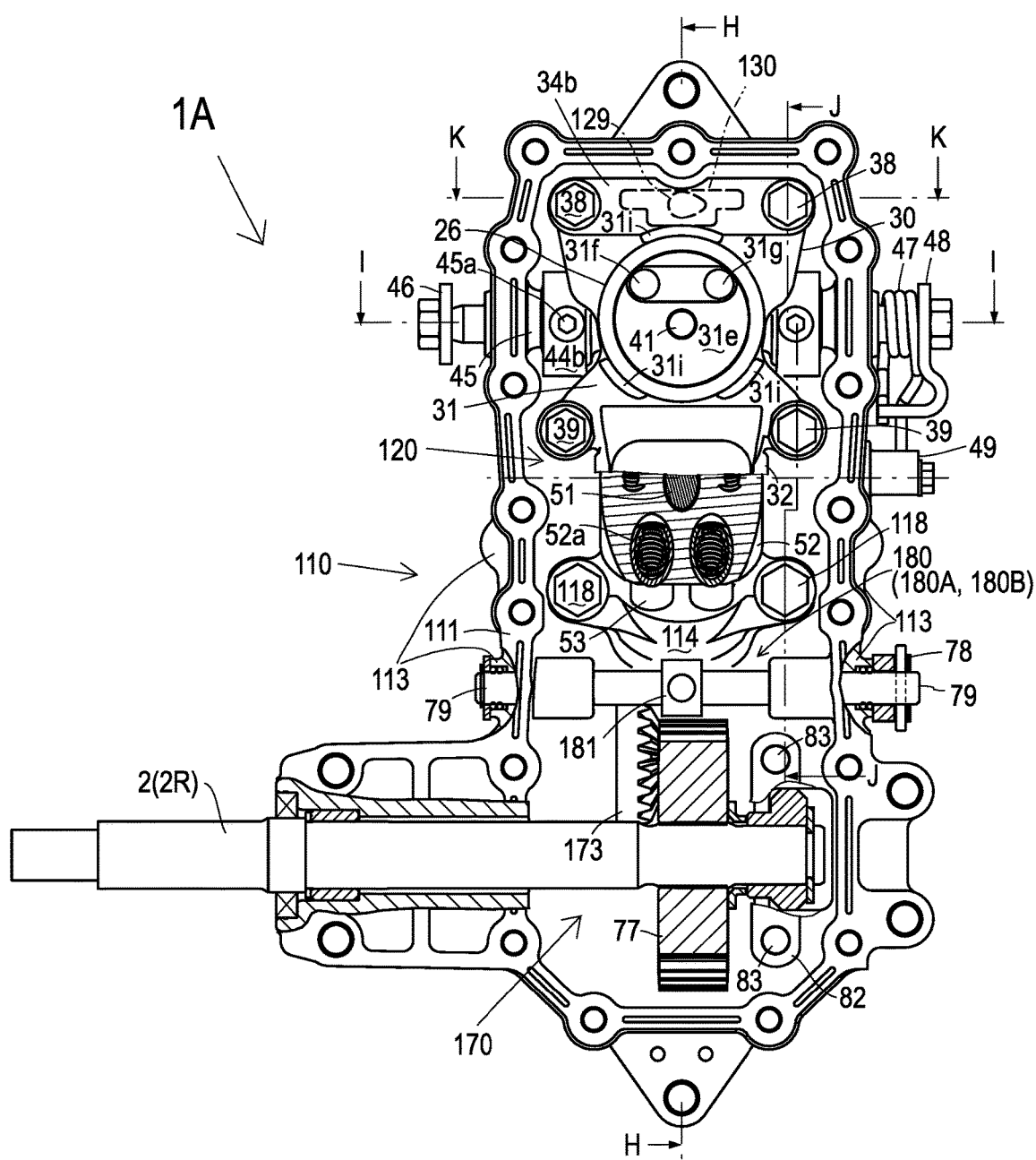
FIG. 22 is a sectional bottom view of transaxle 1A taken along G-G arrows of FIG. 21, showing bottom views of axle 2, an HST 120, reduction gear train 170 and a gear locking system 180 in a transaxle casing 110 from which a lower transaxle housing 112 has been removed.

Referring to FIGS. 22 and 26, a bottom plate 34b is interposed between bottom surfaces of right and left front bosses 34 and bottom heads of bolts 38. Pressure member 130 is disposed in a space between right and left front bosses 34 and slidably abuts at a bottom horizontal surface thereof against a top horizontal surface of bottom plate 34b. Pressure member 130 is formed with right and left vertical surface 130b and a rear vertical surface 130c defining an upwardly open recess 130a. Cam 129a formed on a bottom end of camshaft 129 is disposed in recess 130a. Right and left pressure rods 131 are extended rearward from right and left portions of pressure member 130 and are inserted into respective valve casings 22. Springs 132 wound respective pressure rods 131 are interposed between the right and left portions of pressure member 130 and front end surfaces of respective valve casings 22 so as to bias pressure member 130 forward.

When bypass valve operation arm 128 is disposed at valve-close position P1 as drawn in phantom lines, cam 129a is directed to right or left vertical surface 130b so that pressure member 130 is located at its forward limit position by the forward biasing forces of springs 132. In this state, rear ends of pressure rods 131 are spaced from respective ball valve members 23 so as to allow ball valve members 23 forwardly biased by respective springs 25 to function as charge check valves. On the other hand, when bypass valve operation arm 128 is disposed at valve-open position P2, cam 129a is directed rearward so as to contact rear vertical surface 130c, thereby pushing pressure member 130 and pressure rods 131 rearward against springs 132. In this state, the rear ends of pressure rods 131 push respective ball valve members 23 rearward against springs 25 so as to open respective valve ports 22a (see FIG. 19) to respective main fluid passages 36 and 37, thereby draining pressurized fluid from main fluid passages 36 and 37 to the fluid sump in transaxle casing 110.

Figure 23:
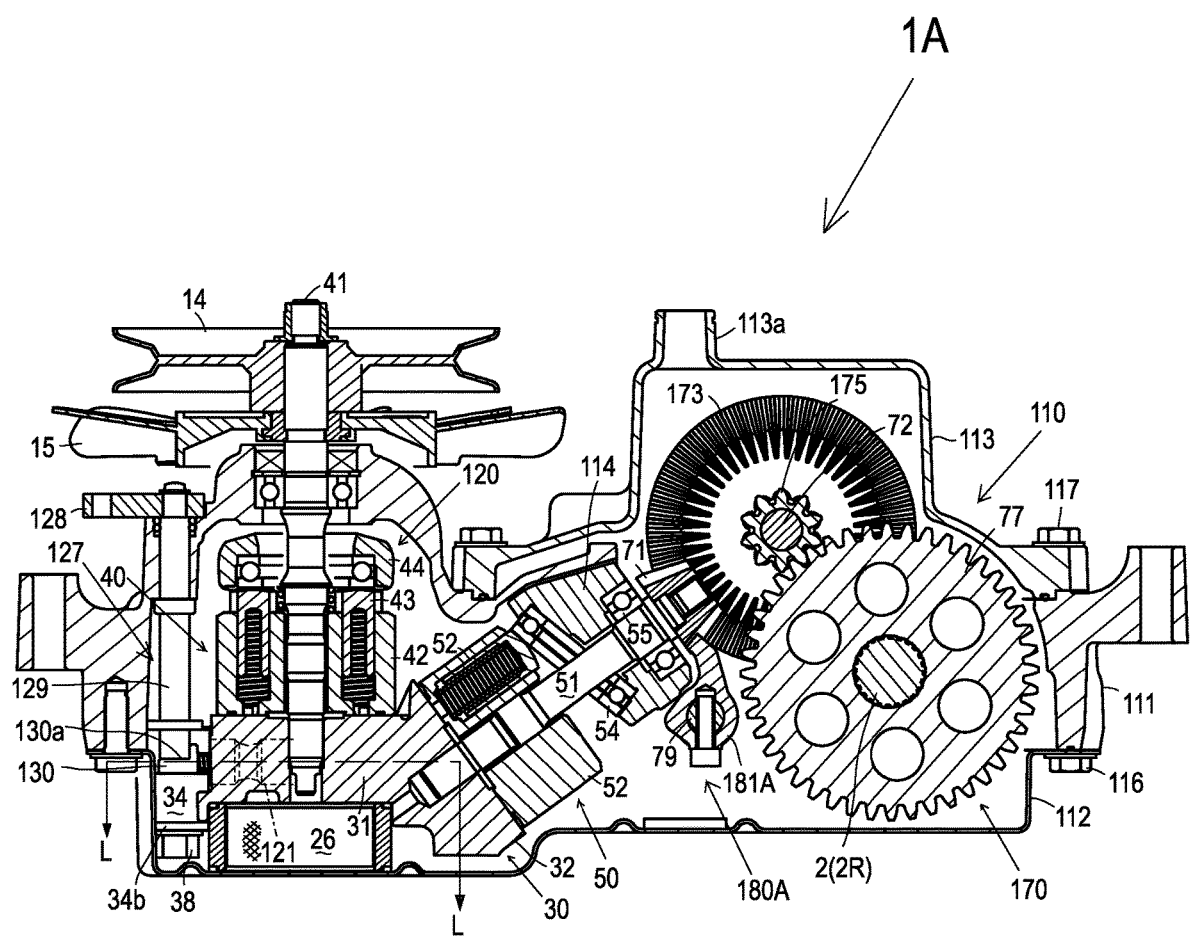
FIG. 23 is a sectional side view of transaxle 1A taken along H-H arrows of FIG. 22, showing sectional side views of axle 2, HST 120, reduction gear train 170 and a gear locking system 180A as an embodiment of gear locking system 180.
Figure 24:
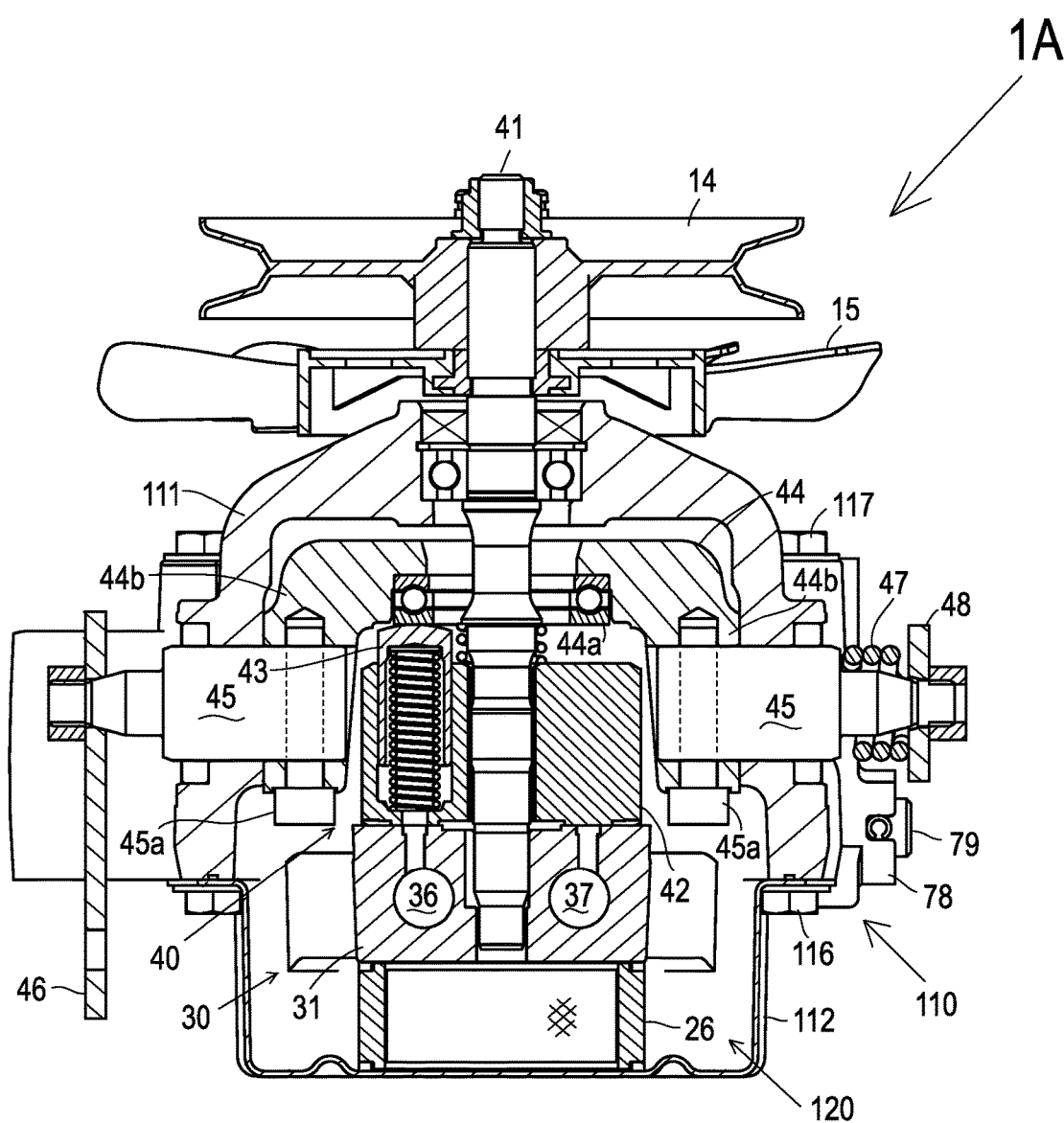
FIG. 24 is a sectional front view of transaxle 1A taken along I-I arrows of FIG. 22, showing a sectional font view of HST 120.
Figure 25:
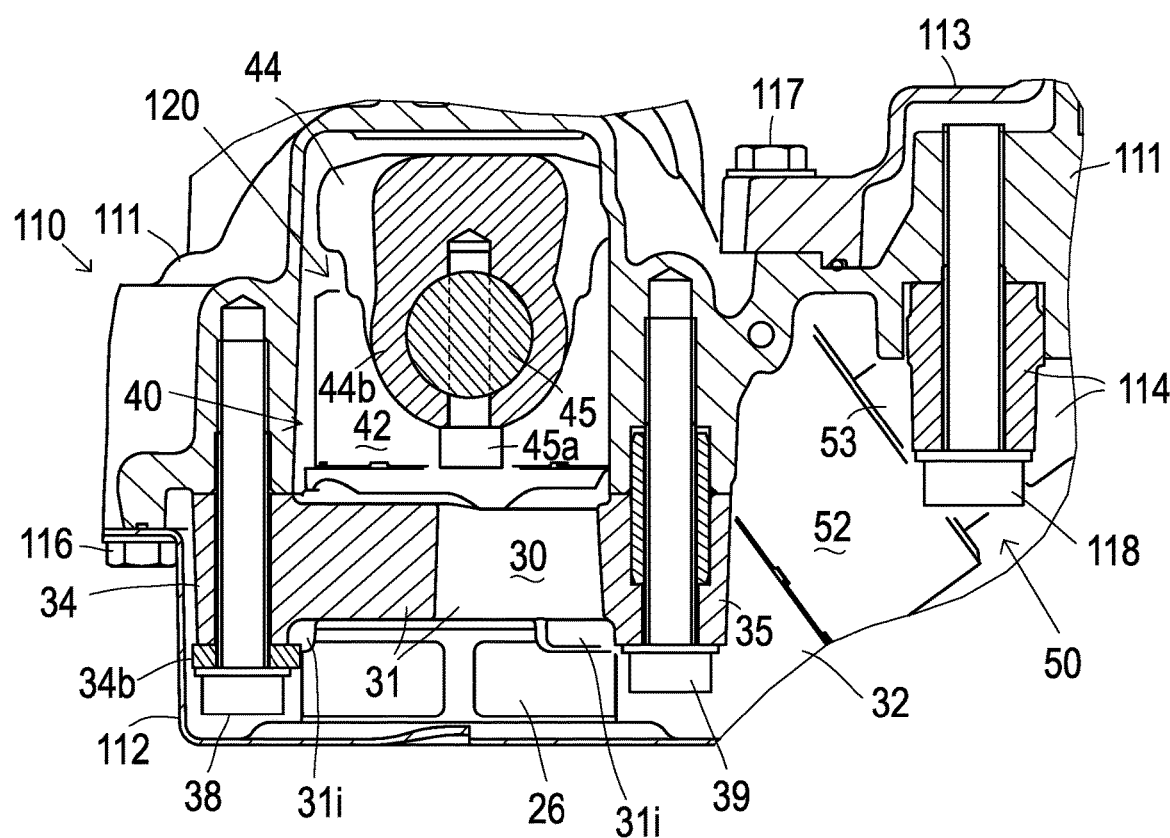
FIG. 25 is a fragmentary sectional side view of transaxle 1A taken along J-J arrows of FIG. 22, showing a sectional side view of HST 120.

A motor swash plate support member 114 is fixedly disposed in transaxle casing 110 so as to support the thrust bearing serving as fixed swash plate 54 of hydraulic motor 50 mounted on motor port block 32 of center section 30 and so as to journal slant motor shaft 51 of hydraulic motor 50, in comparison with motor support portion 11f that is formed on transaxle housing 11 so as to support fixed swash plate 54 and motor shaft 51. Referring to FIGS. 22, 23 and 25, upper transaxle housing 111 is formed to extend under gear top cover 113 so as to cover an upper surface of motor swash plate support member 114, and motor swash plate support member 114 is fastened to the extended portion of upper transaxle housing 111 under gear top cover 113 via bolts 118.

The advantage of motor swash plate support member 114 separated from transaxle casing 110 is that motor swash plate support member 114 is reversible so as to enable fixed swash plate 54 to be reversed in correspondence to which rotational direction of pump shaft 41 relative to motor shaft 51 is designed. Therefore, it is unnecessary to design a later-discussed bevel gear 173 of reduction gear train 170 as being reversible in correspondence to the rotational direction of pump shaft 41 relative to motor shaft 51. On the contrary, as mentioned above, reduction gear train 70 of transaxle 1 has bevel gear 73 designed to be reversible in accordance to the rotational direction of pump shaft 41 relative to motor shaft 51 because fixed swash plate 54 supported by motor support portion 11f of transaxle housing 11 is not reversible.

An upper rear end of slant motor shaft 51 projects upwardly rearward from motor swash plate support member 114 so as to be fixedly provided thereon with bevel pinion 71. Bevel pinion 71 meshes with bevel gear 173 corresponding to bevel gear 73 of transaxle 1. Referring to FIG. 22, representative gear locking system 180 for transaxle 1A has a representative locking pawl 181 engageable with bevel pinion 71 in comparison with the gear locking system for transaxle 1 having locking pawl 80 engageable with bevel gear 73. In this regard, as discussed later, gear locking system 180 is representative of gear locking systems 180A and 180B, and locking pawl 181 is representative of locking pawls 181A and 181B. Therefore, bevel gear 173 is not formed with recesses for engagement with locking pawl 181. The use of bevel pinion 71 to engage with locking pawl 181 is advantageous in consideration of a case that large bevel gear 73 meshing with bevel pinion 71 may be hard to be formed with recesses 73b by sintering or the like.

Figure 29A:
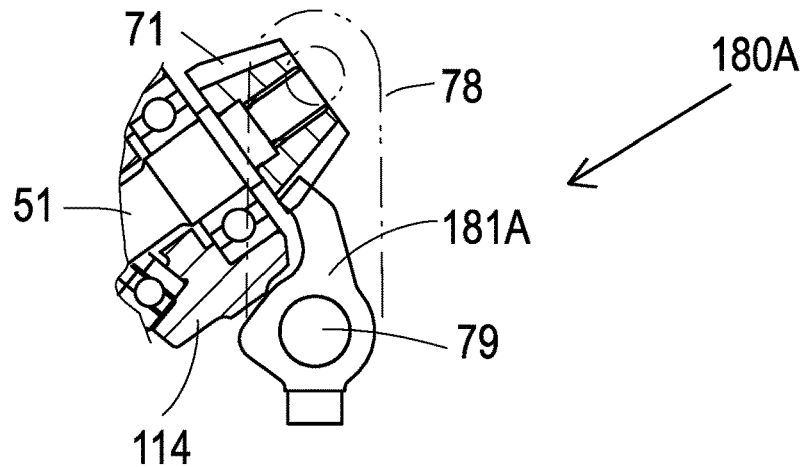
FIG. 29(a) is a sectional side view of gear locking system 180A when a locking pawl 181A engages with bevel pinion 71.
Figure 29B:
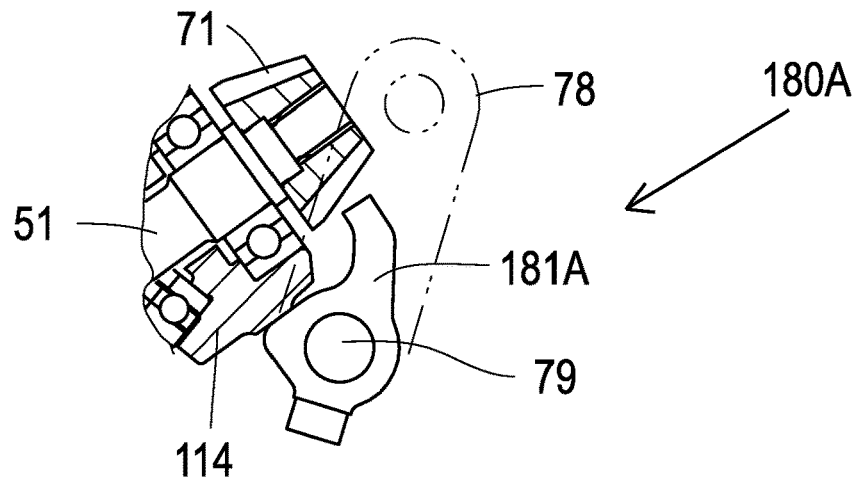
FIG. 29(b) is a sectional side view of gear locking system 180A when locking pawl 181A disengages from bevel pinion 71.
Figure 29C:
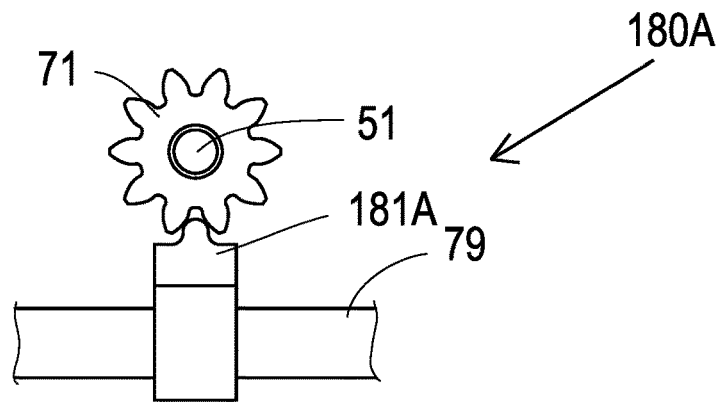
FIG. 29(c) illustrates gear locking system 180A when viewed in the axial direction of a motor shaft 51.

Either a gear locking system 180A or a gear locking system 180B serves as gear locking system 180. Referring to FIGS. 23, 29(a), 29(b) and 29(c), gear locking system 180A is configured to have a locking pawl 181A adapted to be directly engaged into one of recesses among gear teeth of bevel pinion 71. FIG. 29(a) illustrates locking pawl 181A rotated forward to be engaged in one of the recesses among gear teeth of bevel pinion 71 so as to engage with bevel pinion 71. FIG. 29(b) illustrates locking pawl 181A rotated rearward to be removed from the recess of bevel pinion 71 so as to disengage from bevel pinion 71.

Figure 30A:
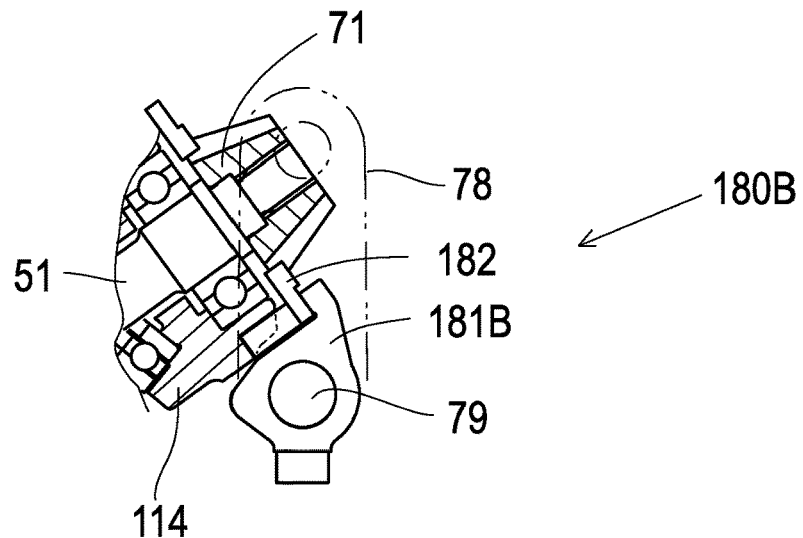
FIG. 30(a) is a sectional side view of gear locking system 180B when a locking pawl 181B engages with bevel pinion 71 via an engagement plate 182.
Figure 30B:
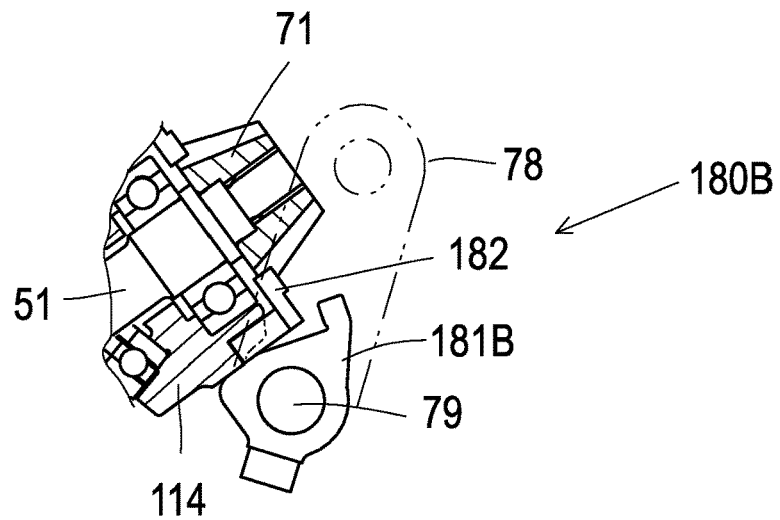
FIG. 30(b) is a sectional side view of gear locking system 180B when locking pawl 181B disengages from bevel pinion 71 and engagement plate 182.
Figure 30C:
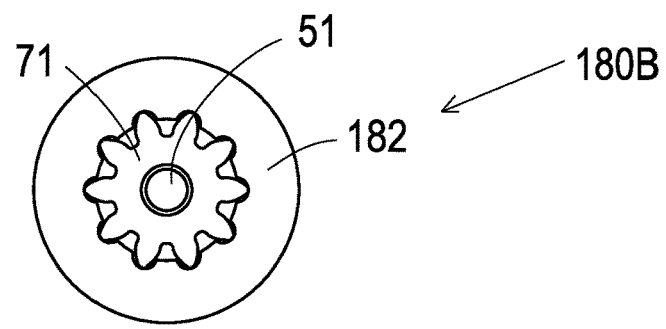
FIG. 30(c) illustrates gear locking system 180B when viewed in the axial direction of motor shaft 51.

Referring to FIGS. 28, 30(a), 30(b) and 30(c), gear locking system 180B is configured to have a locking pawl 181B adapted to engage with bevel pinion 71 via an engagement plate 182. Engagement plate 182 is slidably fitted onto a slant surface of motor swash plate support member 114 so as to be annularly fitted onto a maximum diametric end portion of bevel pinion 71 adjacent to the slant surface of motor swash plate support member 114. In other words, engagement plate 182 serves as a flange fixed on bevel pinion 71. To engage with bevel pinion 71, as shown in FIG. 30(a), locking pawl 181B is rotated forward to be hooked on engagement plate 182 so as to stop engagement plate 182 rotatably integrated with bevel pinion 71. FIG. 30(b) illustrates locking pawl 181B rotated rearward to be separated from engagement plate 182 so as to disengage from bevel pinion 71.

Bevel pinion 71 is disposed at the laterally middle position in transaxle casing 110 so that locking pawl 181 adapted to engage with bevel pinion 71 (directly or via engagement plate 182) is fixed on a laterally middle portion of locking shaft 79 in comparison with locking pawl 80 that is fixed on a rightward or leftward portion of locking shaft 79 so as to correspond to bevel gear 73 disposed rightward or leftward from bevel pinion 71. Therefore, to fasten locking pawl 181 to locking shaft 79, locking shaft 79 has to be provided with only a single fastening means such as a fastener pin hole at the lateral middle portion thereof so as to reduce the number of processes and costs, in comparison with locking shaft 79 for transaxle 1, which is formed with two right and left holes 79a so that one of holes 79a is selected to fasten locking pawl 80 to locking shaft 79 in correspondence to whether bevel gear 73 is disposed rightward or leftward in transaxle casing 10.

Bevel pinion 71 has the engagement portion to engage with locking pawl 181 (directly or via engagement plate 182) at or below the lateral middle bottom end of bevel pinion 71 so that the movement direction of rotating bevel pinion 71 at the engagement portion is substantially laterally horizontal parallel to the axial direction of locking shaft 79 while the rotation direction of locking pawl 181 with locking shaft 79 for engaging with bevel pinion 71 is perpendicular to the axial direction of locking shaft 79. Therefore, an operation force required to rotate locking pawl 181 for engaging with bevel pinion 71 is constant regardless of whether motor shaft 51 rotates clockwise or counterclockwise. On the contrary, if a right or left portion of bevel pinion 71 were adapted to engage with locking pawl 181, the operation force required to rotate locking pawl 181 for engaging with bevel pinion 71 would be changed depending on whether bevel pinion 71 rotates clockwise or counterclockwise because the right or left portion of bevel pinion 71 moves either upward or downward perpendicularly to the axis of locking shaft 79 and parallel to the rotation direction of locking pawl 181 depending on whether bevel pinion 71 rotates clockwise or counterclockwise.

As understood from the above-mentioned features, the setting of relative rotational direction between pump shaft 41 and motor shaft 51 depends on the setting of motor swash plate support member 114 to define the slant angle of fixed swash plate 54 relative to motor shaft 51 or the setting of bevel gear 173 to define whether bevel gear 173 meshes with the right or left side portion of bevel pinion 71. Therefore, the constant operation force for engagement of locking pawl 181 with bevel pinion 71 regardless of the rotational direction of motor shaft 51 relative to pump shaft 41 means that the operation force is constant regardless of the setting of motor swash plate support member 114 or regardless of the setting of bevel gear 173.

Right and left ends of locking shaft 79 project outward from right and left side surfaces of gear top cover 113. Locking arm 78 is selectively fixed on either the right or left end of locking shaft 79. The rotation of locking shaft 79 with locking arm 181 for engaging with bevel pinion 71 is constant regardless of whether locking arm 78 is fixed on the right or left end of locking shaft 79, thereby meaning that an operation force to be applied to locking arm 78 for rotating locking shaft 79 for the engagement of locking pawl 181 with bevel pinion 71 is constant regardless of whether locking arm 78 is fixed on the right or left end of locking shaft 79.

For example, the rotation direction of locking shaft 79 for engaging locking arm 181 with bevel pinion 71 corresponds to the depression direction of a brake pedal for forwardly pulling locking arm 78 via a wire or a rod. Therefore, when a pair of transaxles 1A are equipped on a vehicle to serve as right and left transaxles 1R and 1L, both transaxles 1A serving as right and left transaxles 1R and 1L have respective locking arms 78 that are operatively connected to the brake pedal so that both locking arms 78 are pulled forward together by depressing the brake pedal regardless of whether each transaxle 1A has locking arm 78 on the right or left side of transaxle casing 110, regardless of the setting of motor swash plate support member 114 of each transaxle 1A to define the slant angle of fixed swash plate 54 relative to motor shaft 51, or regardless of the setting of bevel gear 173 to define whether bevel gear 173 meshes with the right or left side portion of bevel pinion 71.

Figure 21:
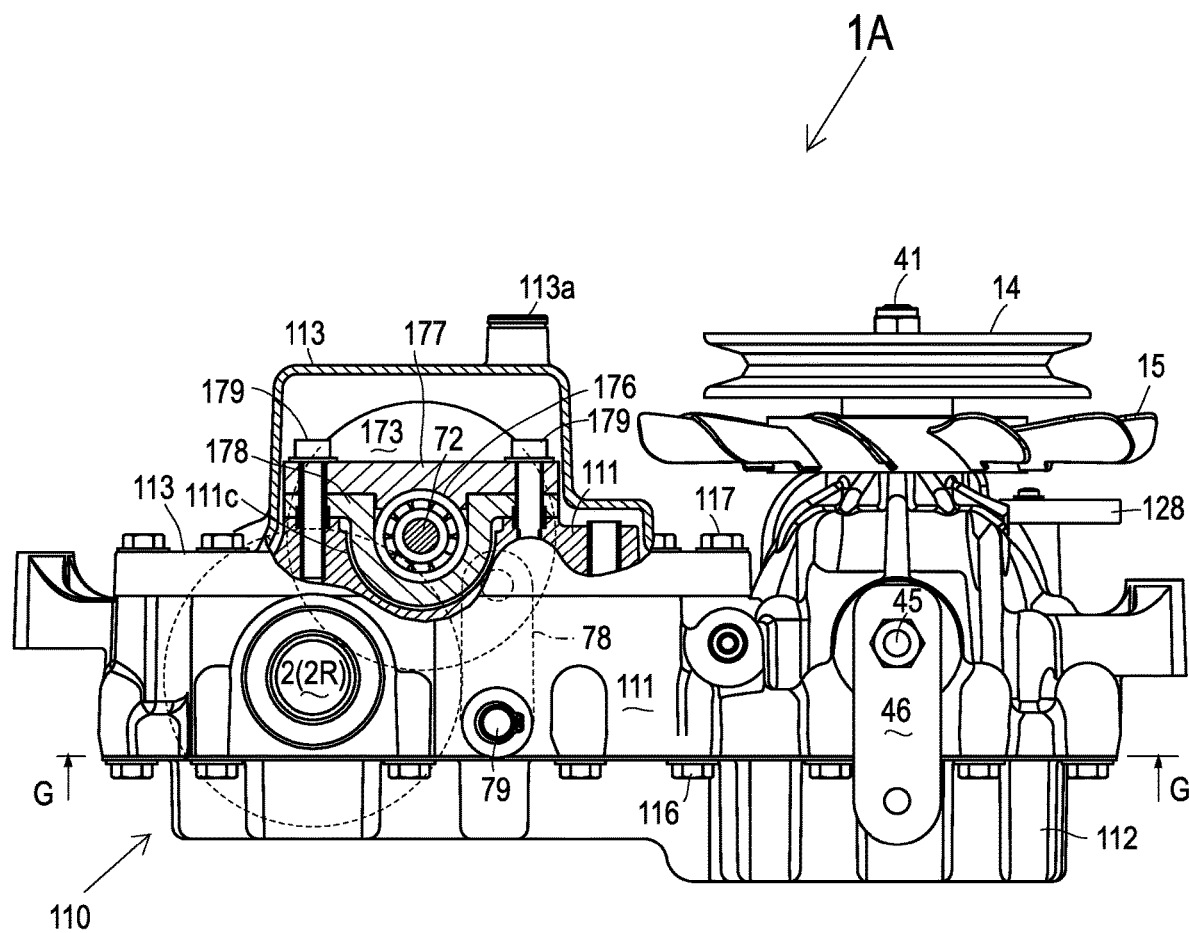
FIG. 21 is a side view of an alternative transaxle 1A serving as right transaxle 1R that represents the pair of right and left transaxles 1R and 1L, including a sectional side view of an upper portion of a reduction gear train 170 taken along N-N arrows of FIG. 28.
Figure 31:
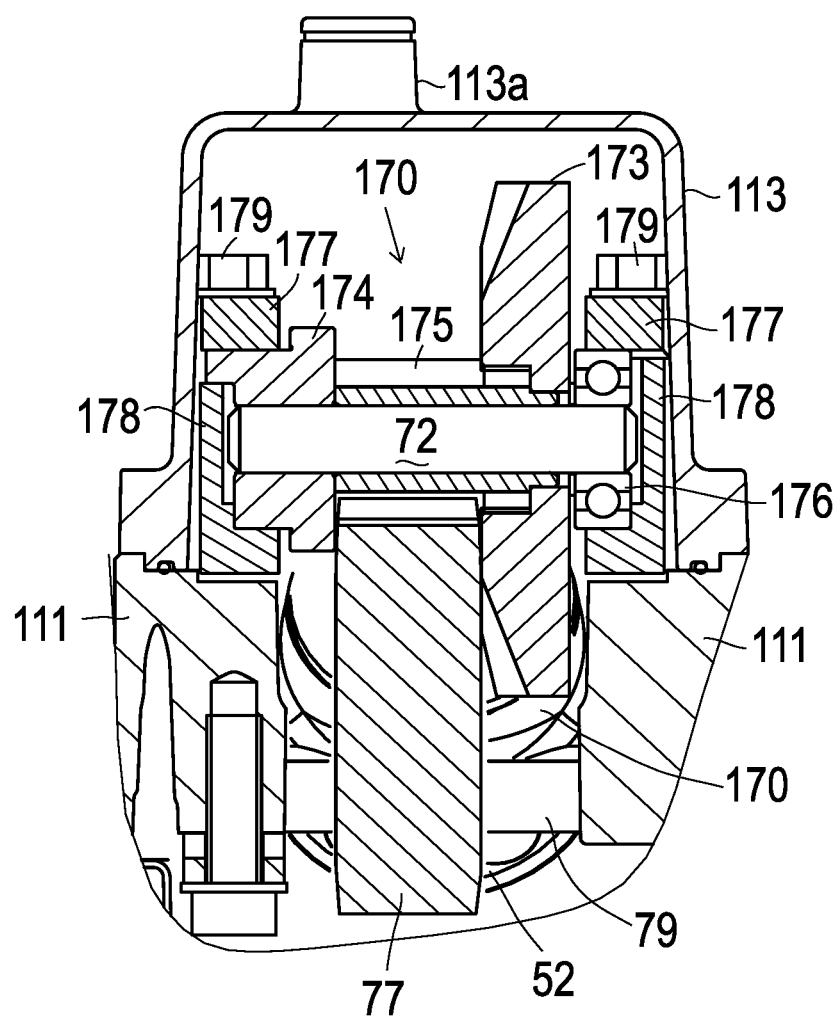
FIG. 31 is a fragmentary sectional rear view of transaxle 1A taken along M-M arrows of FIG. 28, showing a sectional rear view of reduction gear train 170 provided with a bevel gear shaft support structure shown in FIGS. 21 and 28.

Referring to FIGS. 21, 23 and 31, a structure for supporting gear shaft 72 will be described. Gear shaft 72 has a ball bearing 176 on one axial end portion (in this embodiment, a right end portion) thereof adjacent to bevel gear 173 fixed on gear shaft 72, so that ball bearing 176 surely journals gear shaft 72 against the weight of bevel gear 173. On the other hand, gear shaft 72 has a bush 174 on the other axial end portion (in this embodiment, a left end portion) thereof laterally opposite bevel gear 173. Between bush 174 and ball bearing 176, bevel gear 173 is fixed on gear shaft 72 so as to mesh with a right or left (in this embodiment, right) portion of bevel pinion 71, and a pinion 173a is fixed on gear shaft 72 so as to mesh with the upper portion of bull gear 77.

As shown in FIG. 21, upper transaxle housing 111 has edges along right and left bottom edges of gear top cover 113. Each of these edges of upper transaxle housing 111 is formed with front and rear horizontal surfaces and is formed with a downward semicircular recess between the front and rear horizontal surfaces. Right and left bearing covers 178 are disposed along right and left vertical portions of gear top cover 113 so as to cover bush 174 and ball bearing 176 and the axial ends of gear shaft 72, respectively. In this regard, each bearing cover 178 has front and rear horizontal extended portions and a downward semicircular portion between the front and rear horizontal extended portions. The front and rear horizontal extended portions of bearing covers 178 are fitted to the respective front and rear horizontal surfaces of the edges of upper transaxle housing 111, and the downward semicircular portions of bearing covers 178 are fitted to the respective downward semicircular recesses of the edges of upper transaxle housing 111. Right and left horizontal upper bearing covers 177 are extended so as to cover the top ends of bush 174 and ball bearing 176 and are fastened by respective bolts 179 at front and rear portions thereof to upper transaxle housing 111 via the front and rear horizontal extended portions of respective bearing covers 178, thereby journaling the right and left ends of gear shaft 72 with bush 174 and ball bearing 176.

Figure 32:
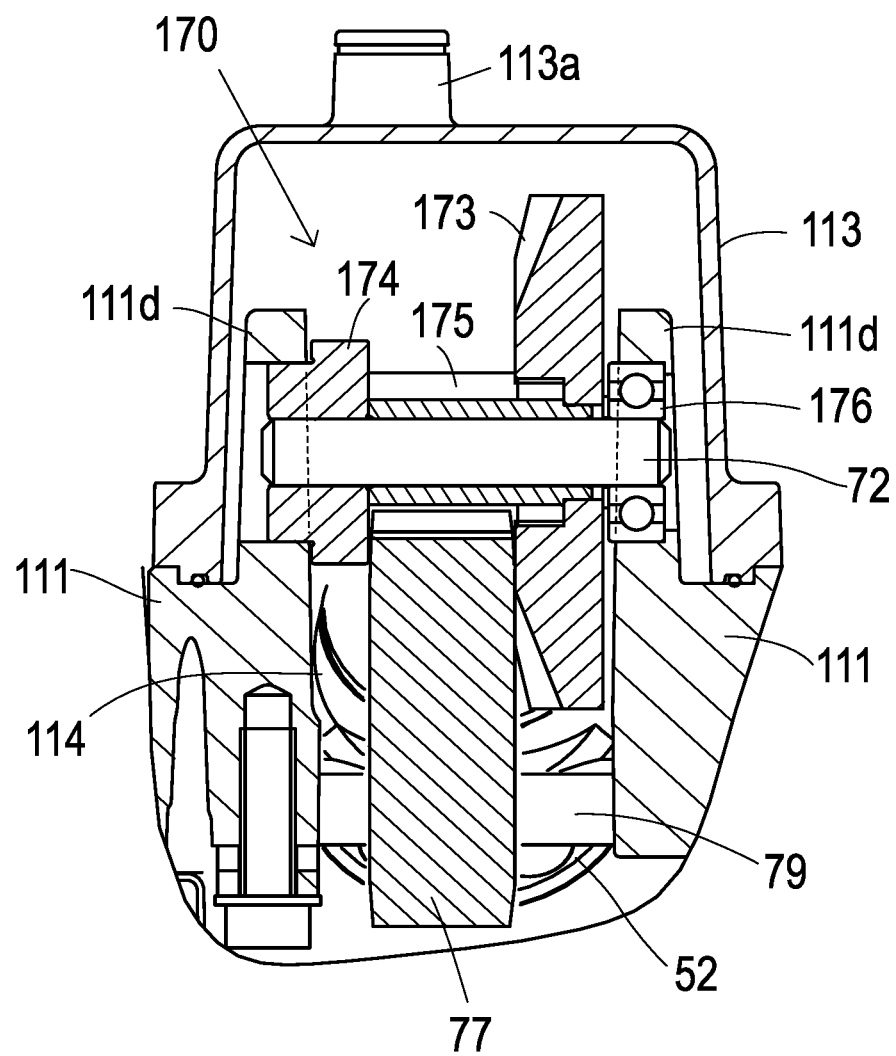
FIG. 32 is a fragmentary sectional rear view of transaxle 1A taken along M-M arrows of FIG. 28, showing a sectional rear view of reduction gear train 170 provided with an alternative bevel gear shaft support structure.

Referring to FIG. 32, an alternative simple structure for supporting gear shaft 72 will be described. Upper transaxle housing 111 is formed with right and left bracket portions 111d extended upright along the right and left vertical portions of gear top cover 113. Bracket portions 111d of upper transaxle housing 111 are formed with respective sectionally circular bearing holes that laterally penetrate respective bracket portions 111d, thereby accommodating bush 174 and ball bearing 175 on the axial end portions of gear shaft 72. To form these bearing holes in respective bracket portions 111d, bracket portions 111d are bored laterally inward from the right and left outsides of respective bracket portions 111d before gear top cover 113 is joined to upper transaxle housing 111. The boring process of these bearing holes in bracket portions 111d is performed on the spot so as to make diametric dimensions of the holes match with the diametric dimensions of bush 174 and ball bearing 176. Further, to support ball bearing 176 in the corresponding bearing hole of bracket portion 111d, the corresponding bearing hole is formed to have a step for defining the axial position of ball bearing 176.

Such a boring of bearing holes in bracket portions 111d for accommodating bush 174 and ball bearing 176 is advantageous to reduce the number of component parts and to accurately and surely journal bush 174 and ball bearing 176 so as to flexibly respond the diametric and/or axial dimensional errors of bush 174 and ball bearing 176 provided on gear shaft 72, in comparison with the foregoing structure using bearing covers 177 and 178, which increases the number of component parts and which is hard to flexibly correspond to diametric and/or axial dimensional errors of bush 174 and ball bearing 176 on gear shaft 72.

A transaxle 1Aa serving as a modification of transaxle 1A will be described with reference to FIGS. 33 to 39. Transaxle 1Aa has members and portions designated by the same reference numerals as those used for transaxle 1A. Omission or adaptation of description and reference numerals are employed as those for transaxle 1A in comparison with transaxle 1 for the same reasons. Further, HST 120 is regarded as being disposed forward from axle 2 as that of transaxle 1A. In this regard, as understood from FIG. 35, transaxle 1Aa shown in FIGS. 33 to 39 serves as a left transaxle having left axle 2L, however, this is just a representative of right and left transaxles having respective right and left axles 2R and 2L, similar to representative transaxle 1A while transaxle 1A shown in FIGS. 21 to 32 serves as a right transaxle having right axle 2R.

Figure 33:
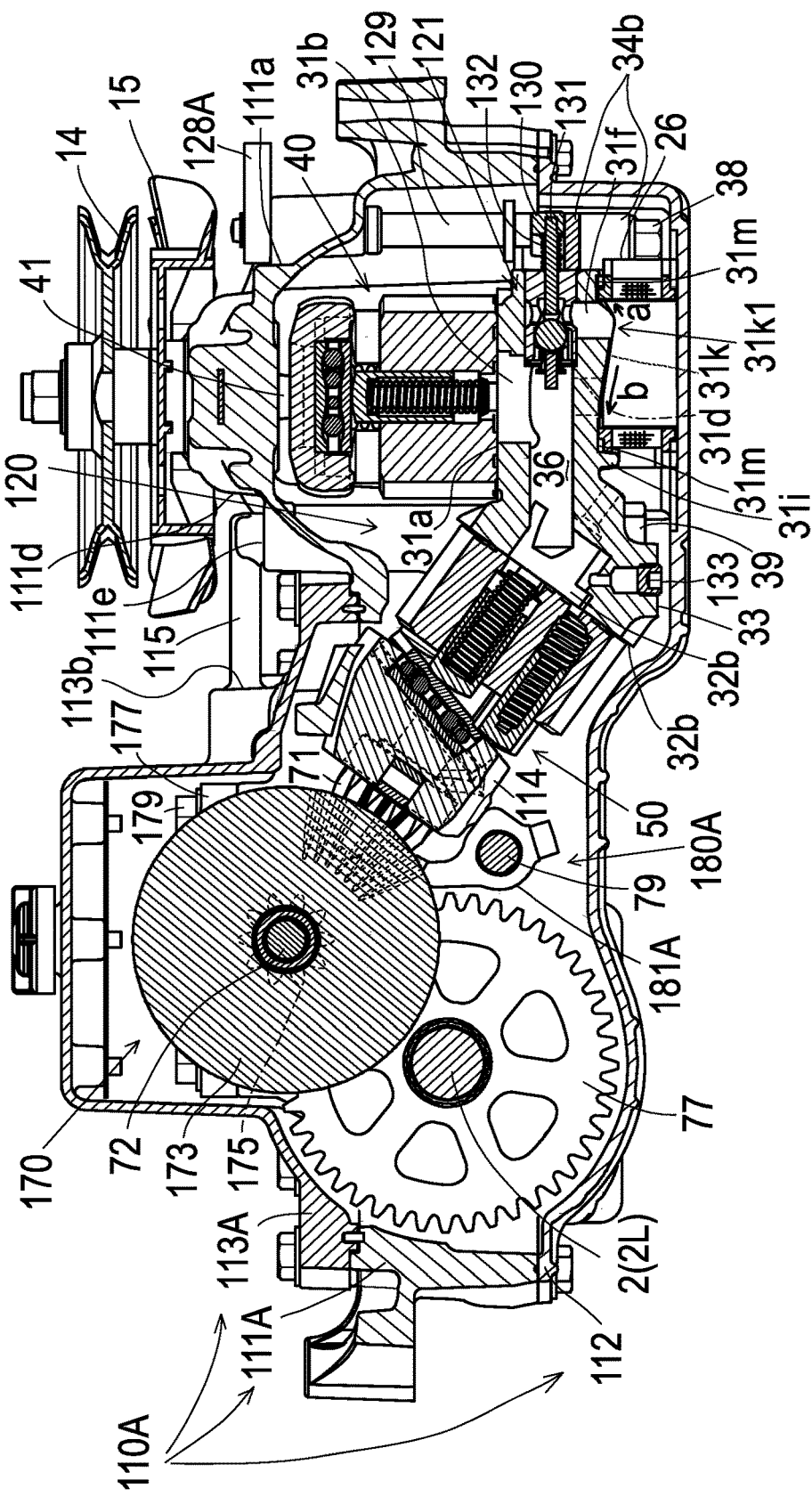
FIG. 33 is a sectional side view of a transaxle 1Aa including HST 120, showing a sectional side view of a center section 30A and charge check valve 121 having the function of bypass valves.

Referring to FIG. 33, transaxle 1Aa includes a transaxle casing 110A incorporating HST 120, reduction gear train 170, axle 2 (in this embodiment, left axle 2L) and gear locking system 180 (in this embodiment, gear locking system 180A), similar to transaxle 1A. Transaxle casing 110A includes an upper transaxle housing 111A and lower transaxle housing 112 joined to each other, and includes a gear top cover 113 mounted on upper transaxle housing 111A.

Figure 34:
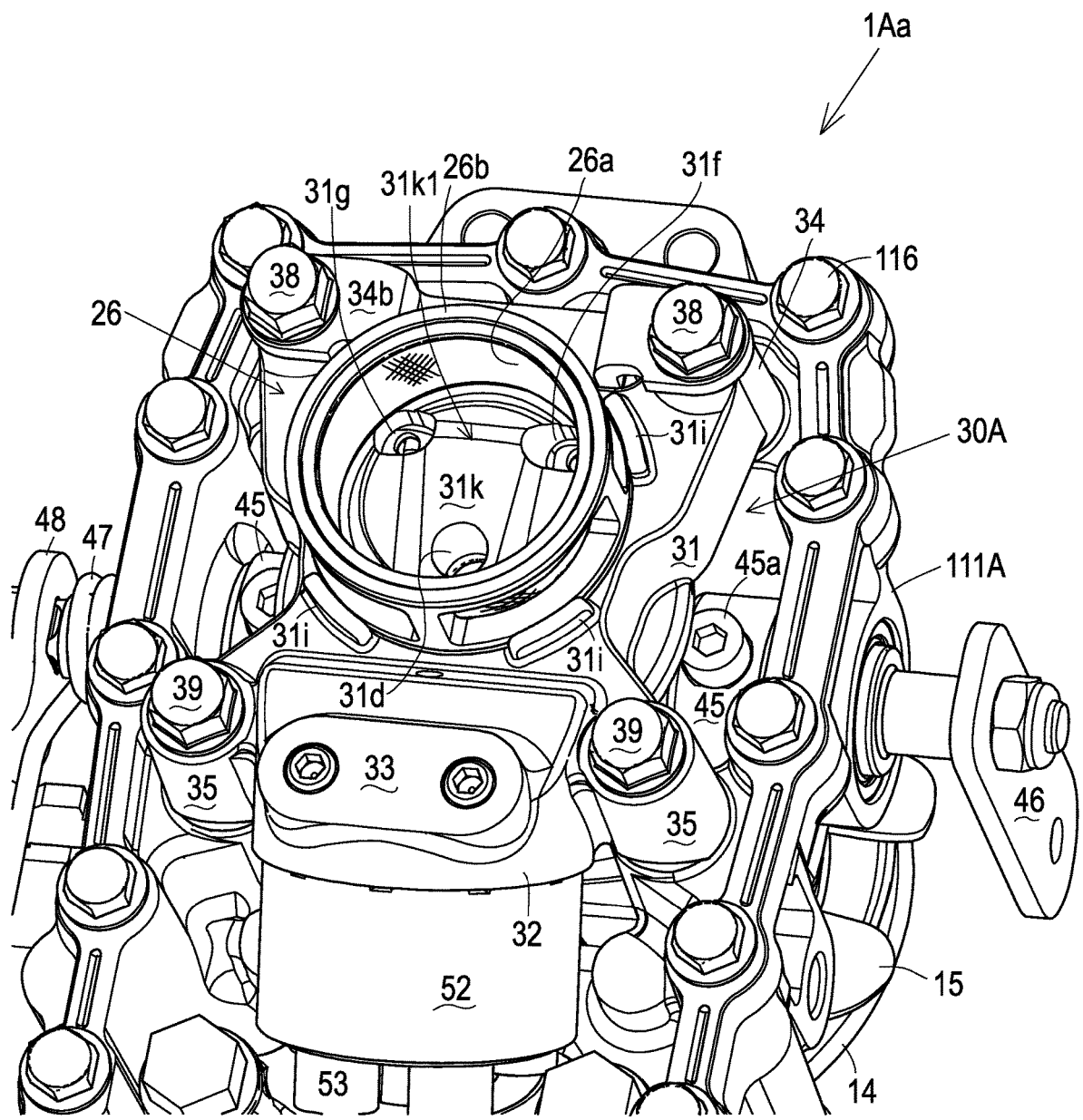
FIG. 34 is a perspective bottom view of transaxle 1Aa from which a lower transaxle housing 112 has been removed.
Figure 35:
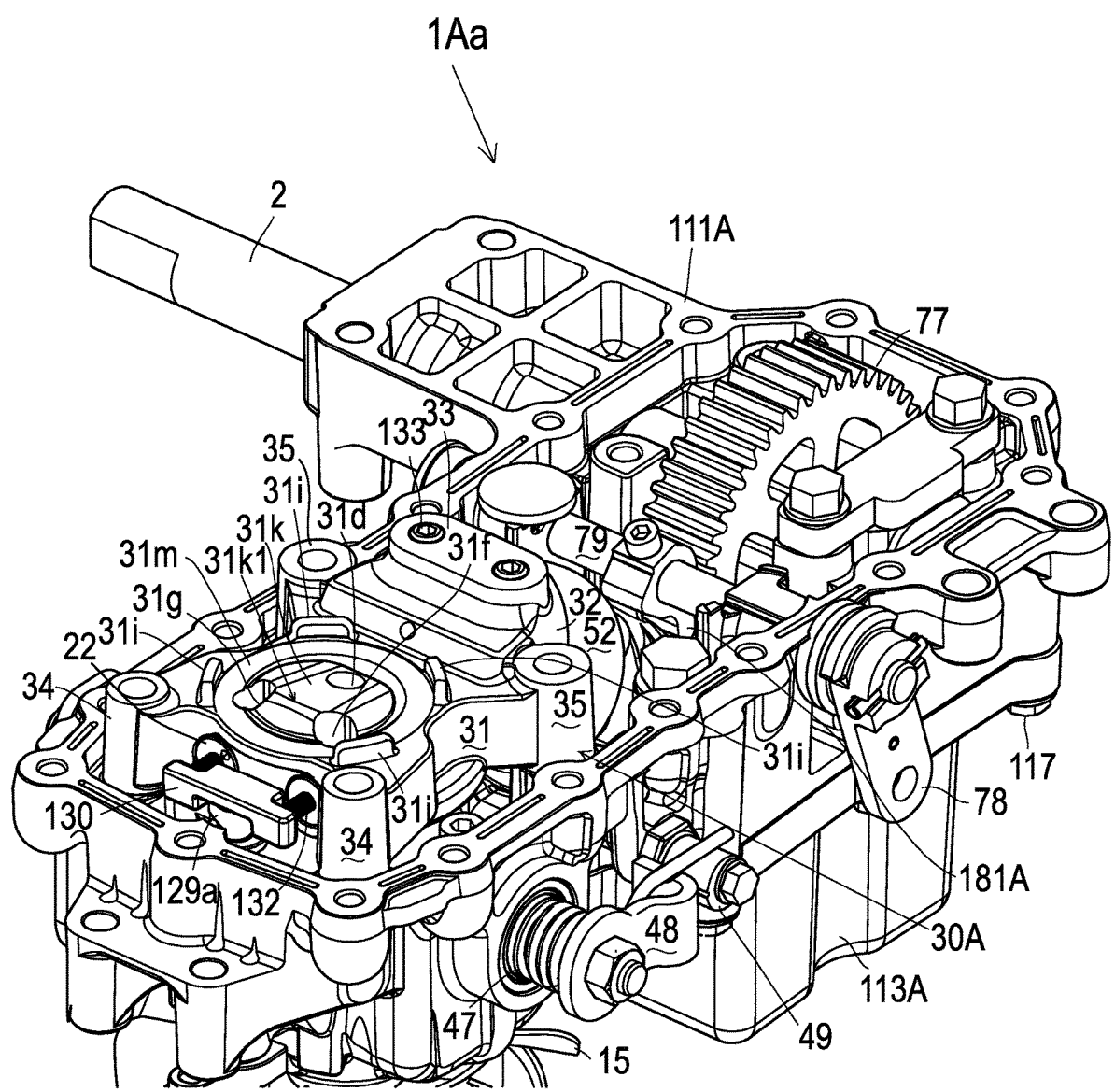
FIG. 35 is another perspective bottom view of transaxle 1Aa from which lower transaxle housing 112 and a filter 26 have been removed.

Referring to FIGS. 33 to 35, a center section 30A used for HST 120 of transaxle 1Aa is the same as center section 30 except that a bottom portion of pump port block 31 of center section 30A is different from that of center section 30. Pump port block 31 of center section 30A is formed with downwardly projecting filter retainers 31i defining an annular horizontal filter mounting surface 31j to which the top surface of vertical cylindrical filter 26 is fitted. In this regard, as understood from FIG. 34, filter 26 includes a cylindrical main filter member 26a having meshes and a filter frame 26b surrounding main filter member 26a. A horizontal flat top surface of filter frame 26b has a width in the radial direction of cylindrical filter 26, and this width of the top surface of filter frame 26b corresponds to the radial width of annular horizontal filter mounting surface 31j.

The bottom portion of pump port block 31 of center section 30A is formed as a convex bottom 31k that projects downward in an irregularly semispherical hill-like shape. Annular horizontal filter mounting surface 31j is defined as a circumferential edge surrounding convex bottom 31k. Therefore, convex bottom 31k projects downward in the vertical columnar space surrounded by filter 26. Convex bottom 31k has a maximum vertical length at a forward portion between right and left charge ports 31f and 31g. This portion is referred to as maximum vertical length portion 31k1. In other words, maximum vertical length portion 31k1 of convex bottom 31k of center section 30A is serves as an apex of the downward convex shape of bottom 31k at the lowest end of convex bottom 31k, and bottom openings of charge ports 31f and 31g are directed to maximum vertical length portion 31k1. Convex bottom 31k is rather steeply sloped upward as it goes forward from maximum vertical length portion 31k1 to a forward portion of annular horizontal filter mounting surface 31j. On the other hand, convex bottom 31k is rather gently sloped upward as it goes rearward from maximum vertical length portion 31k1 to a rearward portion of annular horizontal filter mounting surface 31j so as to pass the bottom opening of pump shaft hole 31d.

The upwardly sloped surface of convex bottom 31k toward annular horizontal filter mounting surface 31j is advantageous to prevent air bubbles from entering charge ports 31f and 31g. In this regard, if air bubbles entered the fluid in the closed circuit of HST 120 including main fluid passages 36 and 37, they would cause cavitation of the closed circuit so as to be harmful for operation of HST 120. Actually, most of all the air bubbles in the fluid in the columnar space surrounded by filter 26 are dispersed at maximum vertical length portion 31k1 of convex bottom 31k and flow along the upwardly sloped forward surface of convex bottom 31k (as an arrow "a" in FIG. 33) and the upwardly sloped rearward surface of convex bottom 31k (as an arrow "b" in FIG. 33) away from charge ports 31f and 31g toward annular horizontal filter mounting surface 31j, thereby reducing air bubbles to enter the closed circuit of HST 120 via charge port 31*f* or 31*g*.

Vertical camshaft 129 is disposed forward from center section 30A so that cam 129*a* formed on the bottom end portion of camshaft 129 is associated with pressure member 130 for forcibly opening charge check valves 21 similar to that of camshaft 129 in transaxle 1A. A top end portion of camshaft 129 projects upward from an upper transaxle housing 111A, and a bypass operation arm 128A is fixed on the top end portion of camshaft 129. Bypass operation arm 128A is formed with a round base portion 128*a*, an arm portion 128*b* extended from round base portion 128*a*, and a square corner portion 128*c* projecting from round base portion 128*a* perpendicular to arm portion 128*b*. Round base portion 128*a* is fitted on the top end portion of camshaft 129 so as to surround the top end portion of camshaft 129. Arm portion 128*b* is adapted to be joined to a link or the like operative connected to a bypass manipulator provided in a vehicle for forcibly opening both charge check valves 21. Bypass operation arm 128 of transaxle 1A also has round base portion 128*a* and arm portion 128*b* although it has not literally described as having such portions. Square corner portion 128*c* is a characteristic portion of bypass operation arm 128A in comparison with bypass operation arm 128 that does not have such a shaped portion.

Square corner portion 128*c* of bypass operation arm 128A projects either rightward or leftward on the assumption that arm portion 128*b* is extended forward from round base portion 128*a*. In this regard, bypass operation arm 128A has two horizontal surfaces opposite each other so that bypass operation arm 128A is reversibly fitted onto the top end portion of camshaft 129 to selectively have each horizontal surface as either the top or bottom surface of bypass operation arm 128A in correspondence to the decision of whether square corner portion 128*c* should project rightward or leftward from round base portion 128*a*.

Upper transaxle housing 111A of transaxle 1Aa is the same as upper transaxle housing 111 of transaxle 1A except that upper transaxle housing 111A is formed with stopper edges 111*a*, 111*b* and 111*c* in correspondence to bypass operation arm 128A and is formed with a later-discussed opening 111*f* for a breathing pipe 115. Stopper edge 111*a* is a laterally vertical surface adapted to constantly contact a rear end of bypass operation arm 128A regardless of rotation of bypass operation arm 128A together with camshaft 129. Right stopper edge 111*b* and left stopper edge 111*c* are formed as vertical surfaces extended rightward and leftward from right and left ends of stopper edge 111*a*, and stepped slightly forward from stopper edge 111*a*, so that one of right and left stopper edges 111*b* and 111*c* is adapted to contact arm portion 128*b* of bypass operation arm 128A.

Referring to FIGS. 38(*a*) and 38(*c*), regardless of whether bypass operation arm 128A is fitted on camshaft 129 so as to have square corner portion 128*c* projecting rightward or leftward, square corner portion 129*c* comes to the rear end of bypass operation arm 128A so as to contact stopper edge 111*a* when arm portion 128*b* is extended forward. In this state, bypass operation arm 128A is unrotatable to further move arm portion 128*b* rightward or leftward toward square corner port 128*c* contacting stopper edge 111*a*, but is rotatable to move arm portion 128*b* rightward or leftward opposite square corner portion 128*c*. Referring to FIG. 38(*a*), when square corner portion 128*c* projects rightward to contact stopper edge 111*a*, bypass operation arm 128A is unrotatable further rightward but is rotatable leftward. Referring to FIG. 38(*c*), when square corner portion 128*c* projects leftward to contact stopper edge 111*a*, bypass operation arm 128A is unrotatable further leftward but is rotatable rightward.

On the other hand, referring to FIGS. 38(*b*) and 38(*d*), regardless of whether bypass operation arm 128A is fitted on camshaft 129 so as to have square corner portion 128*c* projecting rightward or leftward, arm portion 128*b* contacts one of right and left stopper edges 111*b* and 111*c* when arm portion 128*b* is extended rightward or leftward. In this state, bypass operation arm 128A is rotatable rightward or leftward freely from stopper edge 111*a* because square corner portion 128*c* does not contact stopper edge 111*a* so that only the round edge of round base portion 128*a* contacts stopper edge 111*a*. However, referring to FIG. 38(*b*), arm portion 128*b* contacting left stopper edge 111*c* prevents bypass operation arm 128A from further rotating leftward but allows bypass operation arm 128A to rotate only rightward. Referring to FIG. 38(*d*), arm portion 128*b* contacting right stopper edge 111*c* prevents bypass operation arm 128A from further rotating rightward but allows bypass operation arm 128A to rotate only leftward.

Any one of the four states of bypass operation arm 128A shown in FIGS. 38(*a*) to 38(*d*) may be selectively defined as a non-bypass position (a normal position) of bypass operation arm 128A to allow operation of charge check valves 21 free from pressure member 130. This selection of non-bypass position of bypass operation arm 128A depends on whether bypass operation arm 128A and camshaft 129 should be rotated rightward (clockwise) or leftward (counterclockwise) to reach a bypass position for forcibly opening charge check valves 21, and depends on which of the forward, rightward and leftward directions bypass operation arm 128A should be extended when it is located at its non-bypass (or bypass) position, in consideration of a design of transaxle 1A. For example, if bypass operation arm 128A has to be extended forward at the non-bypass position and has to be rotated rightward to reach the bypass position, the state of bypass operation arm 128A shown in FIG. 38(*c*) is set as that at the non-bypass position, and the state of bypass operation arm 128A shown in FIG. 38(*d*) is set as that at the bypass position.

In this regard, cam 129*a* formed on the bottom portion of camshaft 129 extends leftward or rightward from camshaft 129 at the non-bypass position, and extends rearward from camshaft 129 at the bypass position. If cam 129*a* extends leftward at the non-bypass position, the rotation of camshaft 129 from the non-bypass position to the bypass position by 90 degrees should be leftward (counterclockwise). Therefore, the state of bypass operation arm 128A shown in FIG. 38(*a*) should be selected to correspond to cam 129*a* extended leftward at the non-bypass position, so that the state of bypass operation arm 128A shown in FIG. 38(*b*) corresponds to cam 129*a* extended rearward at the bypass position. Alternatively, the state of bypass operation arm 128A shown in FIG. 38(*d*) may be selected to correspond to cam 129*a* extended leftward at the non-bypass position, so that the state of bypass operation arm 128A shown in FIG. 38(*c*) corresponds to cam 129*a* extended rearward at the bypass position.

On the contrary, if cam 129*a* extends rightward at the non-bypass position, the rotation of camshaft 129 from the non-bypass position to the bypass position by 90 degrees should be rightward (clockwise). Therefore, the state of bypass operation arm 128A shown in FIG. 38(*c*) should be selected to correspond to cam 129*a* extended rightward at the non-bypass position, so that the state of bypass operation arm 128A shown in FIG. 38(*d*) corresponds to cam 129*a* extended rightward at the bypass position. Alternatively, the state of bypass operation arm 128A shown in FIG. 38(b) may be selected to correspond to cam 129a extended rightward at the non-bypass position, so that the state of bypass operation arm 128A shown in FIG. 38(a) corresponds to cam 129a extended rearward at the bypass position.

Figure 36:
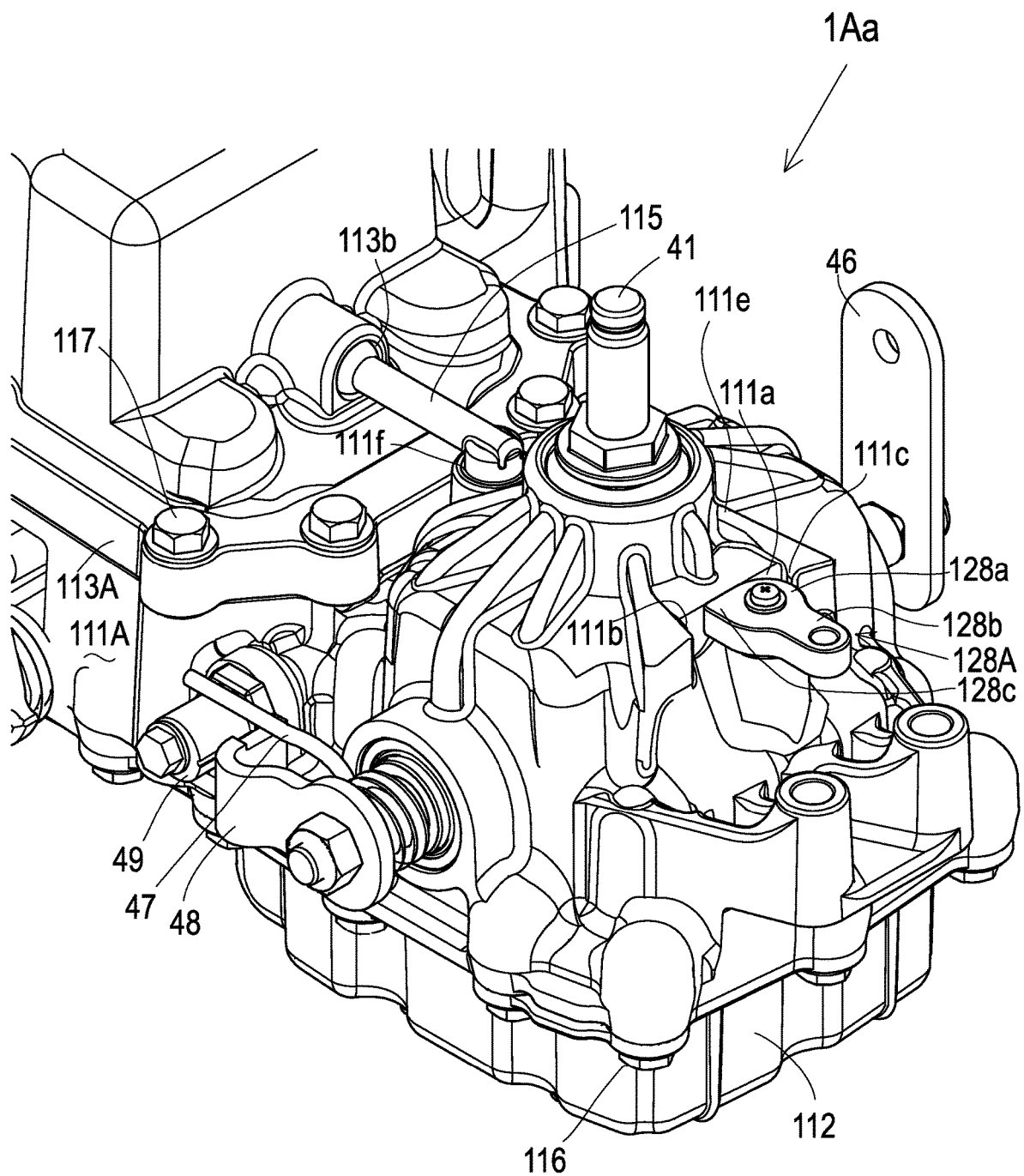
FIG. 36 is a perspective plan view of a front portion of transaxle 1Aa with a pump shaft 41 from which an input pulley 14 and a cooling fan 15 have been removed.
Figure 37:
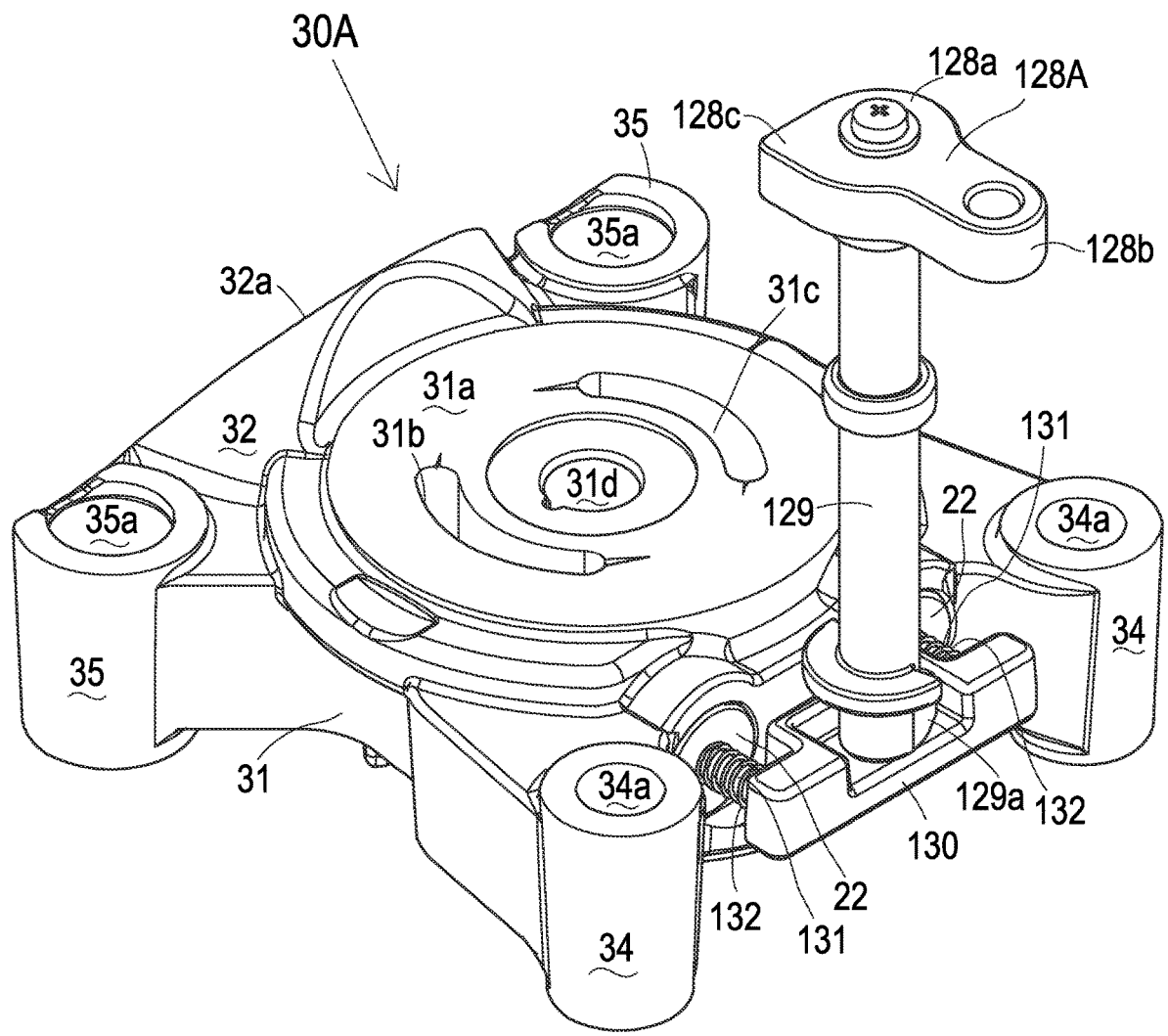
FIG. 37 is a perspective front view of center section 30A.
Figure 38A:
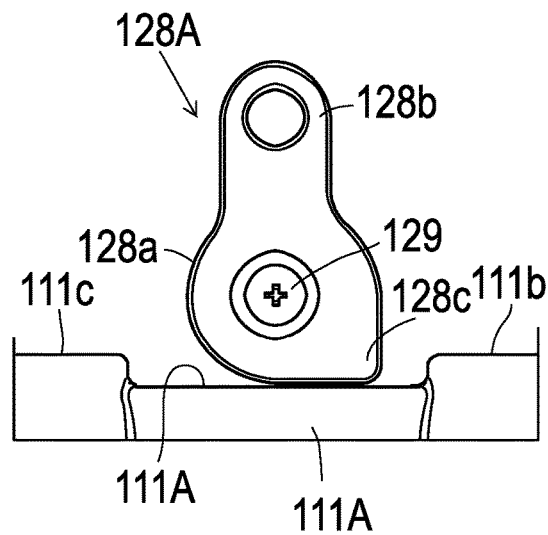
FIG. 38(a) is a schematic plan view of a bypass operation arm 128A and stopper edges 111a-111c.
Figure 38B:
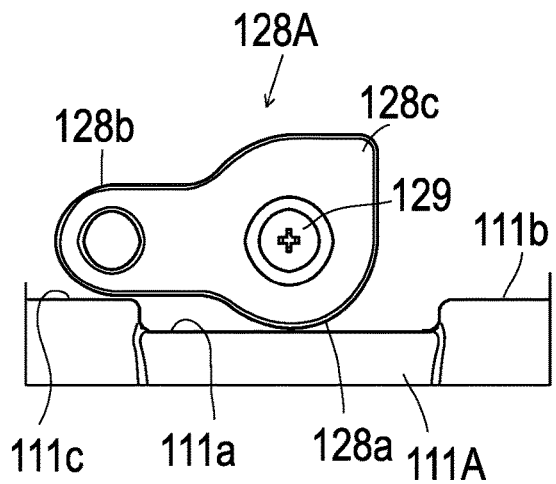
FIG. 38(b) is another schematic plan view of a bypass operation arm 128A and stopper edges 111a-111c.
Figure 38C:
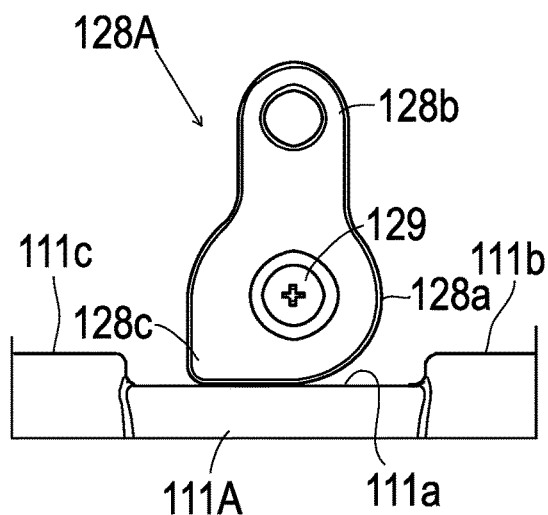
FIG. 38(c) is another schematic plan view of a bypass operation arm 128A and stopper edges 111a-111c.
Figure 38D:
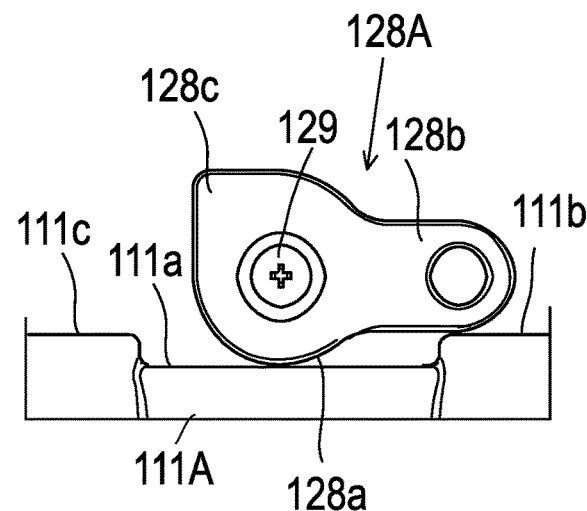
FIG. 38(d) is another schematic plan view of a bypass operation arm 128A and stopper edges 111a-111c.
Figure 39:
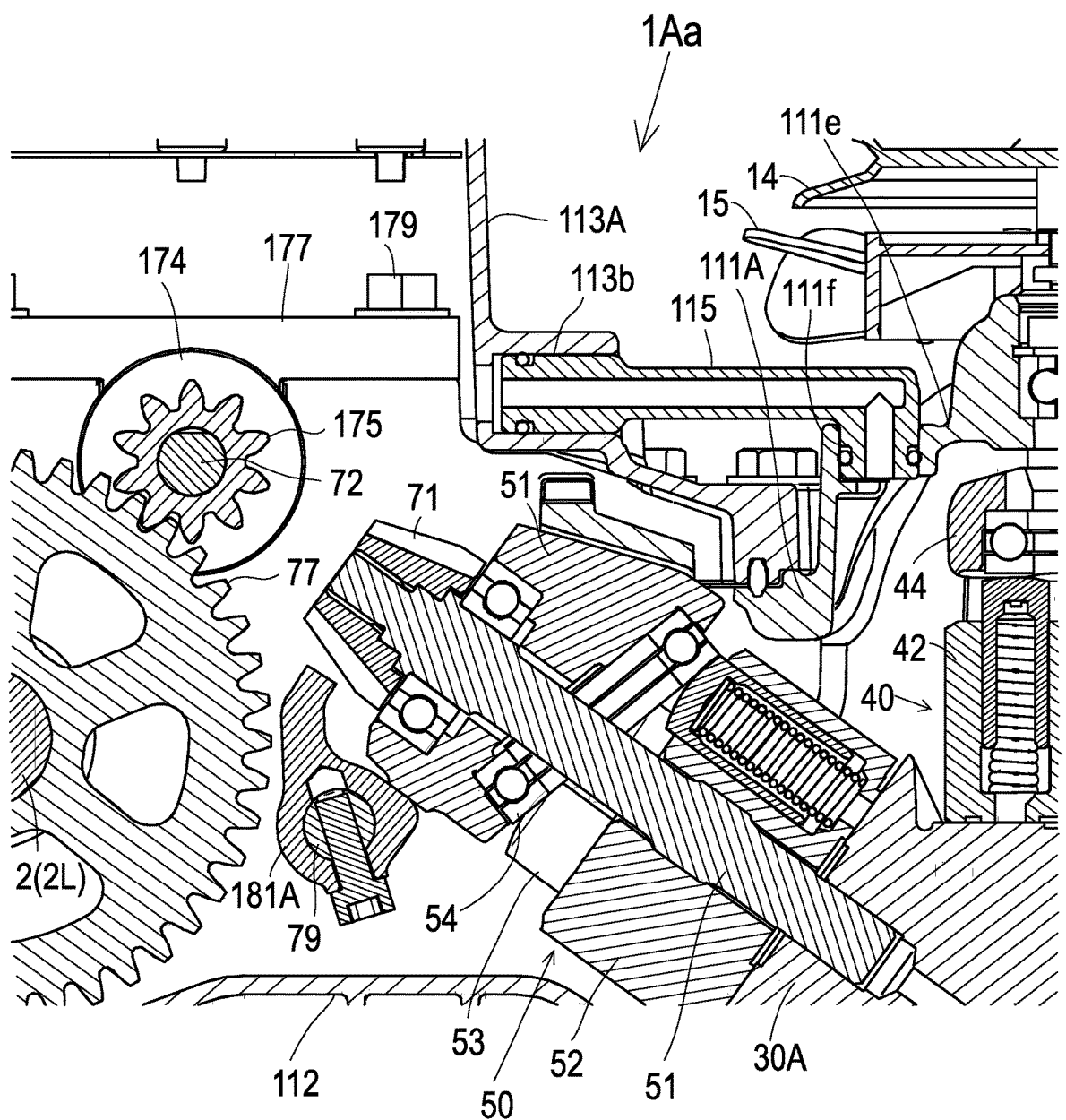
FIG. 39 is a fragmentary sectional side view of transaxle 1Aa, showing a sectional side view of a breathing pipe 115.

Breathing pipe 115 will be described with reference to FIGS. 33, 36 and 39. In this regard, cradle-type movable swash plate 44 is slidably rotatably fitted to a dome-shaped ceiling 111e of upper transaxle housing 111A (corresponding to pump support portion 11b of transaxle housing 11) covering the upper portion of hydraulic pump 40 of HST 120. In this regard, a gap between movable swash plate 44 and ceiling 111e of upper transaxle housing 111A tends to catch air in lubricating fluid in upper transaxle housing 111 so as to act as an air pocket wrongly influencing flow of fluid for operating HST 120 because the lubricating fluid is also used as operation fluid of HST 120. Accurate design of ceiling 111e for reducing the gap space between ceiling 111e and movable swash plate 44 may contribute to reduction of air in the gap space, however, it is costly. Increase of fluid for transaxle 1Aa may contribute to increase of lubricating fluid in the gap space between ceiling 111e and movable swash plate 44 so as to reduce air in the gap space, however, it is also costly, and increase of lubricating fluid may increase agitation resistance of gears of reduction gear train 170.

Therefore, breathing pipe 115 for breathing air from the gap space between ceiling 111e and movable swash plate 44 is interposed between upper transaxle housing 111 and a gear top cover 113A. In this regard, a rear portion of ceiling 111e is formed with a vertical opening 111f that is open to the gap space between ceiling 111f and movable swash plate 44. An L-shaped breathing pipe 115 is fitted at a vertical end portion thereof into opening 111f. On the other hand, gear top cover 113A is the same as gear top cover 113 of transaxle casing 110 of transaxle 1A except that gear top cover 113A is formed with a fore-and-aft horizontal opening 113b that is open to an upper space in gear top cover 113A above reduction gear train 170. Air in this upper space in gear top cover 113A hardly influences to be contaminated in lubricating fluid in transaxle casing 110A of transaxle 1Aa. Another horizontal end portion of breathing pipe 115 is fitted into opening 113b. Therefore, air contaminated in the gap space in upper transaxle housing 111A rises into the vertical end portion of breathing pipe 115 in opening 111f, flows through breathing pipe 115, and is released to the upper space in gear top cover 113A via the horizontal end portion of breathing pipe 115 in opening 113b, thereby reducing the contamination of lubricating fluid with air, and thereby making the circulation of fluid for operating HST 120 free from the air contamination of fluid in the gap space between swash plate 44 and ceiling 111e of upper transaxle housing 111A.

Incidentally, breathing pipe 115 may be formed in another shape than the L-shape, and openings 111f in upper transaxle housing 111A and opening 113a of gear top cover 113A may be designed in shape or arrangement in another way, as far as the required function of breathing pipe 115 for releasing air from the gap space between ceiling 111e and movable swash plate 44 to an appreciate space like the upper space in top cover 113A is ensured. Further, the name "breathing pipe" of the pipe designated by the reference numeral "115" does not merely mean a pipe for passage of only air but also means a pipe for passage of fluid contaminated with air. In other words, pipe 115 serves as an air passage, that also means a fluid passage for flow of fluid contaminated with air. This is also adapted to a later-discussed "breathing pipe 115A" of a transaxle 1Ab shown in FIGS. 40 and 43.

Figure 40:
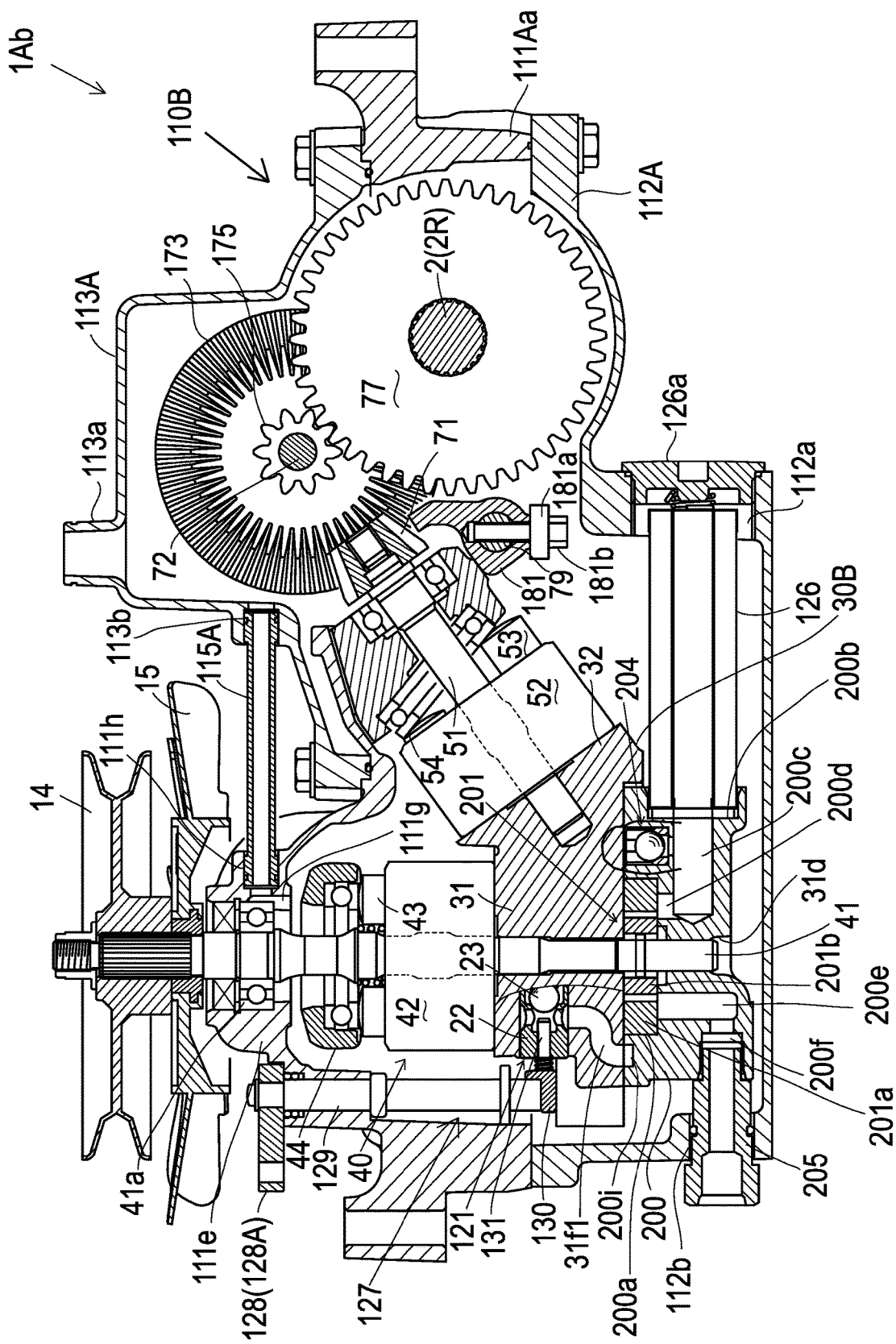
FIG. 40 is a sectional side view of an alternative transaxle 1Ab including HST 120 provided with a charge pump mechanism.
Figure 41:
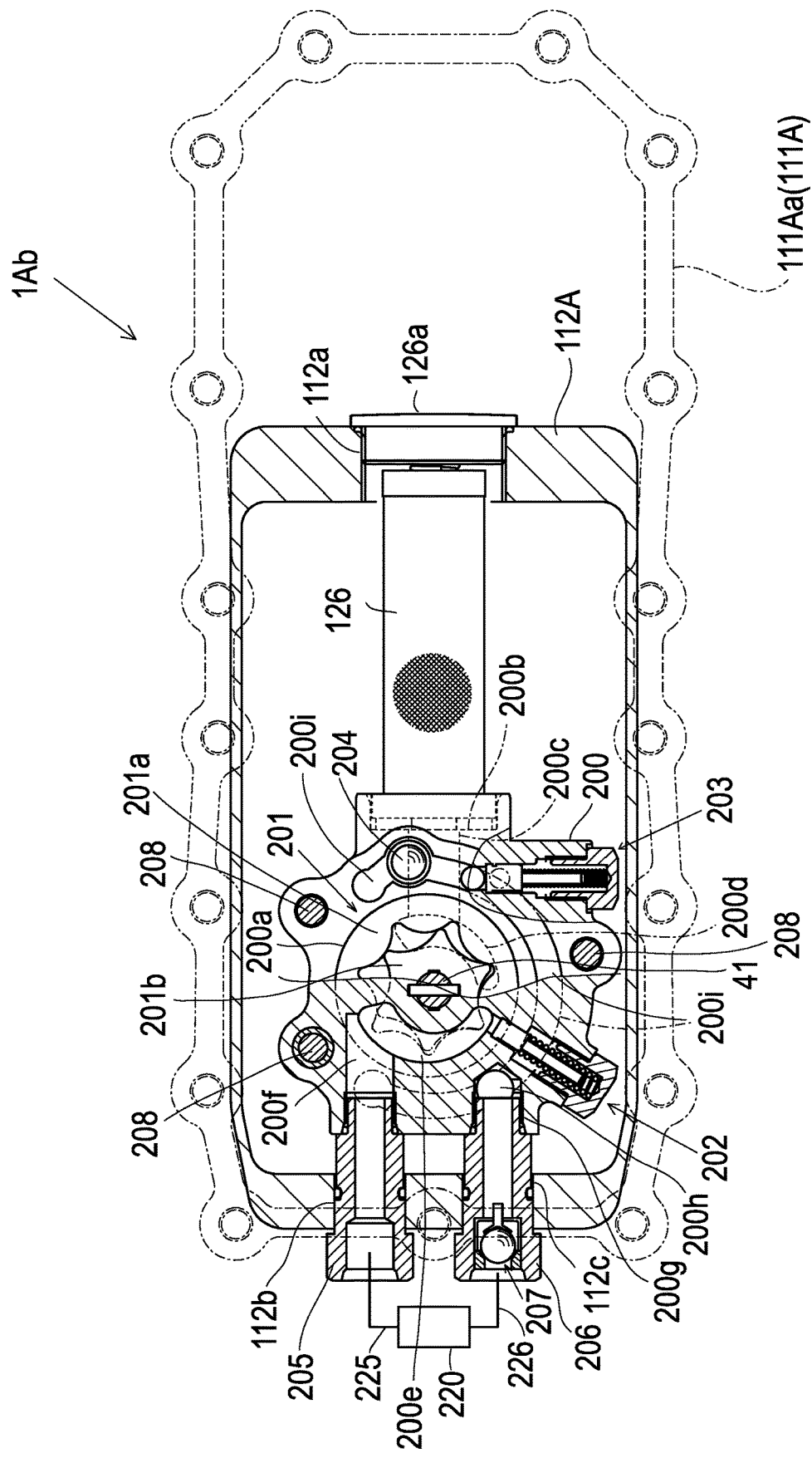
FIG. 41 is a sectional plan view of a lower transaxle housing 112A of transaxle 1Ab, showing a plan view partly in section of the charge pump mechanism.
Figure 42:
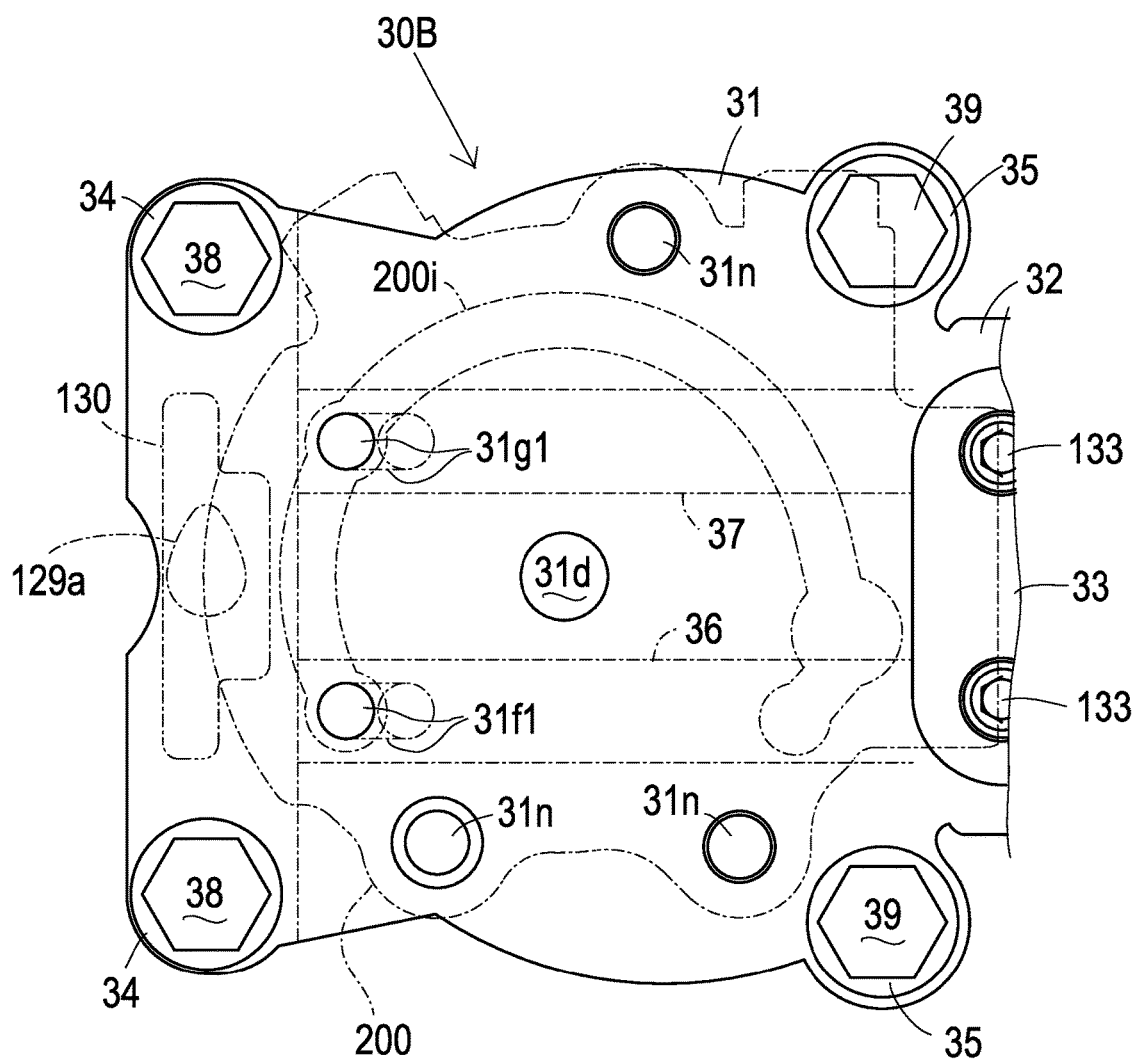
FIG. 42 is a bottom view of a center section 30B used for transaxle 1Ab, showing the charge pump mechanism drawn in phantom lines as fitted to center section 30B.

An alternative transaxle 1Ab will be described with reference to FIGS. 40 to 42 on the same assumption as adapted to the description of transaxle 1Aa based on the description of transaxle 1A (and transaxle 1). For example, transaxle 1Ab is assumed to be arranged so as to have HST 120 disposed forward from reduction gear train 170 and axle 2.

Transaxle 1Ab includes HST 120 including hydraulic pump 40 and hydraulic motor 50, however, HST 120 of transaxle 1Ab is provided with a charge pump mechanism in comparison with HST 120 of transaxle 1Aa (or 1A) which includes center section 30A (or 30) having charge pots 31f and 31g directly open to the fluid sump in transaxle casing 110A (or 110) so as to supply fluid to the closed fluid circuit of HST 120 without a charge pump.

A transaxle casing 110B of transaxle 1Ab includes an upper transaxle housing 111Aa, a lower transaxle housing 112A and gear top cover 113A. Gear top cover 113A is the same as gear top cover 113A of transaxle casing 110A of transaxle 1Aa. Upper transaxle housing 111Aa is discussed later. Similar to lower transaxle housing 112 (not literally described in the above description), lower transaxle housing 112A is formed so that a front portion of lower transaxle housing 112A for housing a lower portion of HST 120 (e.g., a center section 30B of HST 120) is deeper than a rear portion of lower transaxle housing 112A so as to have a lateral vertical wall at a fore-and-aft intermediate portion between the front and rear portions. Especially, the front portion of lower transaxle housing 112A (or 112) will be referred to as a "deeper front portion" hereinafter. The lateral vertical wall of lower transaxle housing 112A at the fore-and-aft intermediate portion, i.e., the rear end of the deeper front portion, is formed with an outwardly open filter hole 112a for inserting or releasing a later-discussed filter 126 into and from transaxle casing 110B in comparison with the rear end of the deeper front portion of lower transaxle housing 112 that has no hole for inserting or releasing a filter into and from transaxle casing 110A. Further, a front end portion of transaxle housing 111Aa is formed with right and left outwardly open port holes 112b and 112c for fitting later-discussed outwardly open port members 205 and 206 therein in comparison with the front end portion of lower transaxle housing 112 that does not have such an outwardly open hole.

HST 120 of transaxle 1Ab includes a center section 30B in which pump port block 31 has a bottom surface that is not convex but is flat in comparison with pump port block 31 of center section 30A having convex bottom 31k. The charge pump mechanism of transaxle 1Ab includes a charge pump housing 200 and a charge pump 201 fitted in charge pump housing 200. Charge pump housing 200 has a flat top surface contacting the flat bottom surface of pump port block 31 of center section 30B. Vertical bolts 208 are passed through bolt holes of center section 30B so as to fasten center section 30B to transaxle casing 110B of transaxle 1Ab.

Charge pump housing 200 is formed at the top surface thereof with an upwardly open discoid recess serving as a charge pump chamber 200a in which charge pump 201 is fitted. Charge pump 201 is a trochoid pump including an outer rotor 201a and an inner rotor 201b surrounded by outer ring 201a. Outer rotor 201a is fitted at an outer peripheral surface thereof to an inner peripheral surface of charge pump chamber 200a slidably and rotatably relative to charge pump housing 200. Inner rotor 201b is fixed on a bottom portion of pump shaft 41 and engages with outer rotor 201a so that outer and inner rotors 201a and 201b rotate according to rotating pump shaft 41. In this regard, a bottom portion of vertical hydraulic pump 40 of transaxle 1Ab disposed in vertical pump shaft hole 31d formed through pump port block 31 of center section 30B is further extended downward into pump chamber 200a of pump housing 200 below center section 30B so as to be fixedly provided thereon with inner rotor 201b. Top surfaces of outer and inner rotors 201a and 201b are leveled with the top surface of pump housing 200 contacting the flat bottom surface of pump port block 31 of center section 30B.

A bottom portion of charge pump housing 200 is fixed to a bottom portion of the deeper front portion of lower transaxle housing 112A. A filter retaining recess 200b is open at a rear end portion of charge pump housing 200 in correspondence to filter hole 112a of lower transaxle housing 112A. A cylindrical mesh filter 126 is fitted at a rear end portion thereof into filter retaining recess 200b and is extended rearward from charge pump housing 200 so as to have a fore-and-aft horizontal axis of its cylindrical shape. A cap 126a is fitted into filter hole 112a so as to close filter hole 112a, and a front end of filter 126 is fitted to cap 126a fitted in filter hole 112a. In this way, filter 126 is disposed in the deeper front portion of lower transaxle housing 112A so as to be submerged in a fluid sump in transaxle casing 110B.

When filter 126 has to be exchanged for a new one, cap 126a is removed from filter hole 112a so as to open filter hole 112a, and filter 126 is moved rearward away from charge pump housing 200 and is released from transaxle casing 110B via filter hole 112a. Alternatively, filter 126 may engage with cap 126a so as to be movable together with cap 126a, so that filter 126 can be released together with cap 126a from transaxle casing 110B when cap 126a is moved away from filter hole 112a. When filter 126 is inserted into transaxle casing 110B via filter hole 112a of lower transaxle housing 112A, vice versa.

Charge pump housing 200 is formed therein with a suction port 200d. Suction port 200d is arcuate when viewed in plan, and a top end of suction port 200d is open at a bottom surface of a rear portion of charge pump chamber 200a. Charge pump housing 200 is formed therein with a suction hole 200c extended fore-and-aft horizontally between filter retaining recess 200b and suction port 200d. Therefore, charge pump 201 sucks fluid from the fluid sump in transaxle casing 110B via filter 126, filter retaining recess 200b, suction hole 200c and suction port 200d. In other words, filter retaining recess 200b, suction hole 200c and suction port 200d constitute a suction fluid passage 210 (see FIG. 43) in transaxle casing 110B to supply fluid from filter 126 to charge pump 201.

Charge pump housing 200 is formed therein with a delivery port 200e. Delivery port 200e is arcuate when viewed in plan, and a top end of delivery port 200e is open at the bottom surface of a front portion of charge pump chamber 200a. In the plan view, arcuate suction port 200d and arcuate delivery port 200e are symmetric with respect to the vertical axis of pump shaft 41. Charge pump housing 200 is formed therein with a port hole 200f extended forward from delivery port 200e so as to open at a front end surface of pump housing 200 in correspondence to port hole 112b of lower transaxle housing 112A. Port member 205 is passed through port hole 112b and is fitted at a rear end thereof into the open front end of port hole 200f. Therefore, charge pump 201 delivers fluid from delivery port 200e to pump member 205 via port hole 200f. In other words, delivery port 200e and port hole 200f constitute a delivery fluid passage 211 (see FIG. 43) in transaxle casing 110B to supply fluid delivered from charge pump 201 to port member 205.

An outwardly open front end of port member 205 is disposed forward from the front end surface of lower transaxle housing 112A so as to serve as a fluid extraction port for supplying fluid delivered from charge pump 201 via delivery port 200e and port hole 200f to an external hydraulic implement 220 disposed outside of transaxle casing 110B of transaxle 1Ab. External hydraulic implement 220 is fluidly connected to port member 205 via a fluid pipe 225 joined to port member 205.

Port hole 200f is extended from one of right and left end portions (in this embodiment, the right end portion) of delivery port 200e. A relief valve 202 is fitted into a side portion of charge pump housing 200 laterally opposite port hole 200f and is joined to the other of right and left end portions (in this embodiment, the left end portion) of delivery port 200e. Therefore, relief valve 202 serves as an implement pressure regulation valve 202 for regulating the pressure of fluid supplied to external hydraulic implement 220 via port member 205. Fluid released from implement pressure regulation valve 202 is recovered to fluid in a later-discussed charge fluid passage 212 (see FIG. 43) to be charged to HST 120. Incidentally, relief valve 202 is extended horizontally, however, slantwise in the fore-and-aft and lateral directions so as to be prevented from interfering with the left side portion of lower transaxle housing 110B and so as to ensure a space for a junction of a later-discussed charge port 200i to a later-discussed vertical fluid hole 200h.

Charge pump housing 200 is formed with an upwardly open groove serving as a charge port 200i at the top surface thereof. Charge port 200i is substantially C-shaped when viewed in plan so as to surround front and rear portions and one of right and left portions (in this embodiment, the left portion) of charge pump chamber 200a. A vertical fluid hole 200h is formed in charge pump housing 200 so as to extend downward from a leftward front portion of charge port 200i. A fore-and-aft horizontal port hole 200g is formed in charge pump housing 200 so as to extend forward from vertical fluid hole 200h and is open at the front end surface of charge pump housing 200 in correspondence to port hole 112c of lower transaxle housing 112A.

Port member 206 is passed through port hole 112c and is fitted at a rear end thereof into the open front end of port hole 200g. An outwardly open front end of port member 206 is disposed forward from the front end surface of lower transaxle housing 112A, and is fluidly connected to external hydraulic implement 220 via a fluid pipe 226. Therefore, the opening of port member 206 serves as a fluid introduction port for introducing fluid discharged from external hydraulic implement 220 to charge port 200i via port hole 200g and vertical fluid hole 200h. In other words, port hole 200g, vertical fluid hole 200h and charge port 200i constitute a charge fluid passage 212 (see FIG. 43) in transaxle casing 110B to supply fluid discharged from external hydraulic implement 220 to the closed fluid circuit of HST 120.

Port holes 200e and 200f in the front end portion of charge pump housing 200 are juxtaposed right and left, and port holes 112b and 112c in the front end portion of lower transaxle housing 112A are juxtaposed right and left so as to correspond to right and left port holes 200e and 200f, whereby port member 205 serving as the fluid extraction port and port member 206 serving as the fluid introduction port are juxtaposed right and left, thereby preventing lower transaxle housing 112A and charge pump housing 200 from being expanded vertically.

Pump port block 31 of center section 30B is formed therein with right and left charge ports 31f1 and 31g1. Right and left charge ports 31f1 and 31g1 are joined at top ends thereof to right and left main fluid passages 36 and 37 in center section 30B, respectively, and are joined at bottom ends thereof to right and left portions of the front portion of charge port 200i of charge pump housing 200. In this regard, the junctions of main fluid passages 36 and 37 to the top ends of charge ports 31f1 and 31g1 have to be considerably distant rearward from the front ends of main fluid passages 36 and 37, i.e., the front end of center section 30B, so as to correspond to charge check valves 121 disposed in front portions of main fluid passages 36 and 37. On the other hand, as noticed from FIG. 41 that an imaginary circle drawn along the C-shape of charge port 200i in the plan view has a great diameter so that the front portion of charge port 200i approaches the front end of center section 30B in the fore-and-aft direction of transaxle 1Ab. Therefore, charge ports 31f1 and 31g1 are bent in side view as understood from FIGS. 40 and 42 so that the bottom ends of charge ports 31f1 and 31g1 joined to the front portion of charge port 200i are disposed forward from the top ends of charge ports 31f1 and 31g1 joined to fluid passages 36 and 37.

Further, a relief valve 203 is fitted into charge pump housing 200 and is joined to the rear portion of charge port 200i so as to serve as a charge pressure regulation valve for regulating the pressure of fluid in charge port 200i before supplied to main fluid passage 36 or 37. An auxiliary charge check valve 204 is disposed in charge pump housing 200 so as to be interposed between suction hole 200c and the rear portion of charge port 200i. Auxiliary charge check valve 204 is adapted to only allow the flow fluid from the fluid sump in transaxle casing 110B to charge port 200i, thereby preventing the closed fluid circuit of HST 120 from lacking fluid when pump shaft 41 and charge pump 201 are not driven.

Features of transaxle 1Ab other than the charge pump mechanism will be described. As shown in FIG. 40, transaxle 1Ab uses a horizontal straight breathing pipe 115A in comparison with L-like bent breathing pipe 115 of transaxle 1Aa. In this regard, a front end portion of breathing pipe 115A is not bent vertically but is extended horizontally as a rear end portion of breathing pipe 115A fitted into opening 113b of gear top cover 113A. Upper transaxle housing 111Aa is the same as upper transaxle housing 111A except that upper transaxle housing 111Aa is formed at a rear portion of dome-shaped ceiling 111e with a horizontal opening 111h instead of a vertical opening such as vertical opening 111f. The horizontal front end portion of breathing pipe 115A is fitted into horizontal opening 111h so that horizontal breathing pipe 115A is interposed between upper transaxle housing 111Aa and gear top cover 113A.

A front end of horizontal opening 111h open into transaxle casing 110B is higher than the bottom end of vertical opening 111f open into transaxle casing 110A so that the front end of horizontal opening 111h is disposed rearwardly adjacent to bearing 41a journaling pump shaft 41 in ceiling 111e of upper transaxle housing 111. Therefore, an air guide hole 111g is formed in ceiling 111e along a rear portion of bearing 41a so as to be open at a bottom end thereof to the gap between ceiling 111e and movable swash plate 44 and so as to be joined to the front end of horizontal opening 111h. Accordingly, air in the gap between ceiling 111e and movable swash plate 44 is introduced into the front end portion of breathing pipe 115A via air guided hole 111g and is expelled into the space surrounded by gear top cover 113A via breathing pipe 115A. Straight breathing pipe 115A is advantageous in reduction of manufacturing processes and costs and in facilitation of inventory control.

Locking pawl 181 (in this embodiment, 181A, however, it may be 181B) is provided with a weight 181a for balancing locking pawl 181 at its unlocking position. In other words, weight 181a directs locking pawl 181 to disengage from bevel pinion 71. Therefore, locking pawl 181 can disengage from bevel pinion 71 as soon as a manipulator having been operated to locking bevel pinion 71 with locking pawl 181 is operated to unlock bevel pinion 71. Alternatively, a torque spring may be coiled around locking shaft 79 if the torque spring has the function equivalent to weight 181a for locking pawl 181.

The illustration of straight breathing pipe 115A and locking pawl 181 with weight 181a in this embodiment of transaxle 1Ab does not mean that straight breathing pipe 115A and locking pawl 181 with weight 181a have to be employed by a transaxle having the charge pump mechanism. In other words, the transaxle (1, 1A or 1Aa) having no charge pump for supplying fluid to the HST (20 or 120) may employ a straight breather pipe, such as pipe 115A, for breathing air from the air pocket along movable swash plate 44 of hydraulic pump 40 and/or a locking pawl with a weight, such as locking pawl 181 with weight 181a, for balancing the locking pawl at the unlocking position.

An embodiment of a zero-turn vehicle shown in FIG. 43 will be described. The zero-turn vehicle includes right and left transaxles carrying respective right and left axles 2R and 2L of respective right and left drive wheels 3R and 3L. Each of the right and left transaxles includes HST 120 (or 20) having hydraulic pump 40, hydraulic motor 50 and main fluid passages 36 and 37 fluidly connecting hydraulic pump 40 to hydraulic motor 50. Transaxle 1Aa represents one of the right and left transaxles (in this embodiment, the left transaxle carrying left axle 2L), which includes no charge pump for supplying fluid to HST 120, and transaxle 1Ab represents the other of the right and left transaxles (in this embodiment, the right transaxle carrying right axle 2R), which includes charge pump 201 for supplying fluid to HST 120.

This zero-turn vehicle includes an engine 230 having an engine output pulley 231 that is drivingly connected to input pulleys 14 on pump shafts 41 of hydraulic pumps 40 of left and right transaxles 1Aa and 1Ab via a belt 232, so that pump shafts 41 are rotated by the output power of engine 230. In transaxle 1Ab, charge pump 201 is driven together with hydraulic pump 40 by rotating pump shaft 41.

In this embodiment, a hydraulic cylinder 221 serves as typical external hydraulic implement 220. A piston 222 serving as a hydraulic actuator is disposed in hydraulic cylinder 221 so that piston 222 divides an inside space of hydraulic cylinder 221 into fluid chambers 221a and 221b. Fluid chamber 221a is fluidly connected via fluid pipe 225 to fluid extraction port (port member) 205. Fluid chamber 221b is fluidly connected via fluid pipe 226 with a line filter 224 to fluid introduction port (port member) 206 for introducing fluid from fluid chamber 221b of hydraulic cylinder 221 into transaxle casing 110B.

A switching valve 223 is interposed between fluid pipes 225 and 226. Switching valve 223 is manipulatable to be shifted between an opening position and a closing position. During the rotation of pump shaft 41, when switching valve 223 is set at the closing position so as to separate fluid pipes 225 and 226 from each other, fluid delivered from charge pump 201 is supplied to fluid chamber 221a of hydraulic cylinder 221 so as to push piston 222 in one direction to thrust out a piston rod extended from piston 222. During the movement of piston 222, fluid is discharged from fluid chamber 221*b* to fluid introduction port 206, and flows into fluid charge fluid passage 212 via a charge check valve 207. After piston 222 reaches its maximum stroke, fluid delivered from charge pump 201 is released from implement pressure regulation valve 202 to charge fluid passage 212.

During the rotation of pump shaft 41, when switching valve 223 is set at the opening position so as to fluidly connect fluid pipes 225 and 226 to each other, fluid delivered from charge pump 201 flows through switching valve 223 so as to bypass hydraulic cylinder 221. A part of fluid having passed switching valve 223 flows to fluid introduction port 206 via fluid pipe 226 and line filter 224. The remaining part of fluid having passed switching valve 223 flows to fluid chamber 221*b* of hydraulic cylinder 221 via fluid pipe 226 so as to push piston 222 in the other direction to withdraw the piston rod. Therefore, fluid is discharged from fluid chamber 221*a* into fluid pipe 225 against the fluid flow from fluid extraction port 205, however, this fluid is introduced to fluid pipe 226 via switching valve 223.

In this way, HST 120 of transaxle 1Ab has charge pump 201 for supplying fluid to main fluid passages 36 and 37 via external hydraulic implement 220 outside of transaxle casing 110B. On the contrary, HST 120 of transaxle 1Aa does not have such a charge pump, however, charge ports 31*f* and 31*g* directly open to the fluid sump in transaxle casing 110A so as to naturally suck fluid from the fluid sump for sufficient fluid supply to the closed fluid circuit of HST 120.

Figure 43:
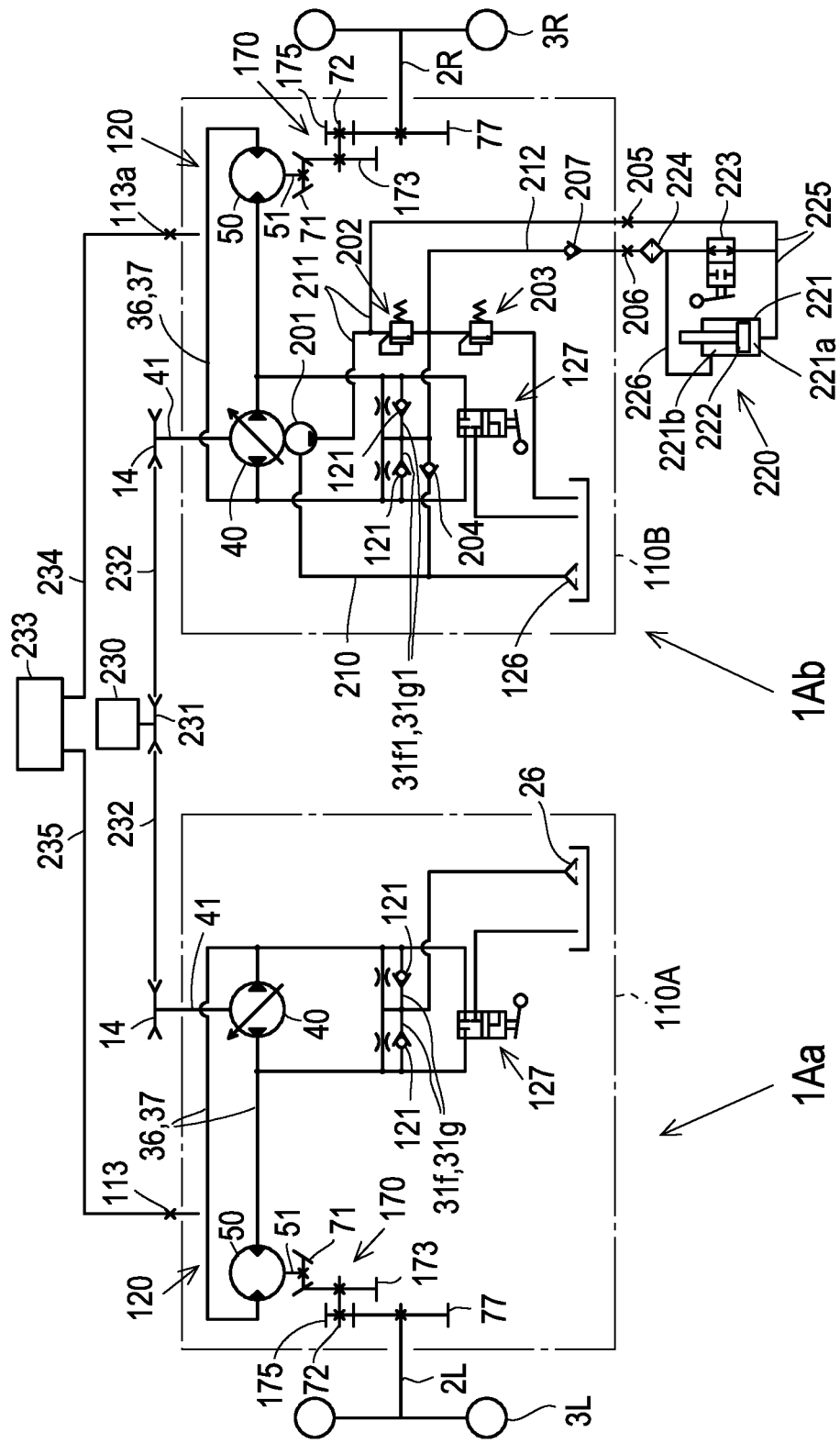
FIG. 43 is a hydraulic circuit diagram of a zero-turn vehicle in which transaxle 1Aa having no charge pump mechanism serves as the left transaxle and transaxle 1Ab having the charge pump mechanism serves as the right transaxle.

Incidentally, referring to FIG. 43, this zero-turn vehicle is provided with a reservoir tank 233 that is fluidly connected to the fluid sump in transaxle casing 110B of transaxle 1Ab via a fluid pipe 234 and that is fluidly connected to the fluid sump in transaxle casing 110A of transaxle 1Aa via a fluid pipe 235, thereby regulating the fluid sumps in transaxle casings 110A and 110B of transaxles 1Aa and 1Ab in volume and pressure.

A transaxle 1Ac serving as a modification of transaxle 1A will be described with reference to FIGS. 44 to 47. Transaxle 1Ac has members and portions designated by the same reference numerals as those used for transaxle 1A. Omission or adaptation of description and reference numerals are employed as those for transaxle 1A in comparison with transaxle 1 for the same reasons. Further, HST 120 is regarded as being disposed forward from axle 2 as that of transaxle 1A.

Figure 44:
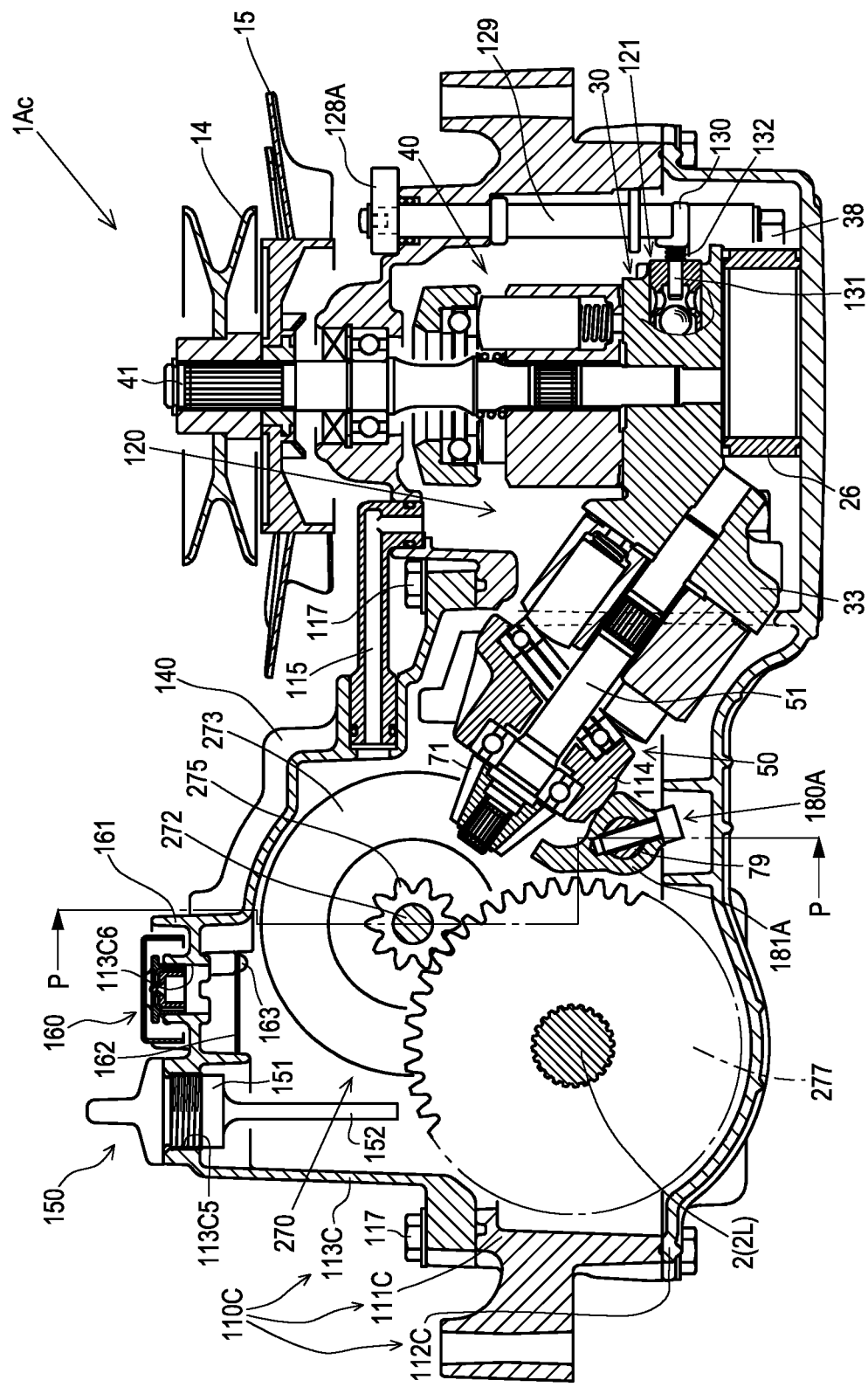
FIG. 44 is a side cross-sectional view of a transaxle 1Ac including an HST 120, showing a side cross-sectional view of a gear top cover 113C.

In this regard, as understood from FIG. 44, transaxle 1Ac shown in FIGS. 44 to 47 serves as a left transaxle having left axle 2L, however, this is just an example of right and left transaxles having respective right and left axles 2R and 2L, similar to representative transaxle 1 while transaxle 1A shown in FIGS. 21 to 32 serves as a right transaxle having right axle 2R.

As shown in FIG. 44, transaxle 1Ac includes an HST 120, an axle 2 (in this embodiment, left axle 2L), and a gear locking system 180 (in the present embodiment, a gear locking system 180A) similar to transaxle 1A, and includes a reduction gear train 270. Then, transaxle 1Ac has a transaxle casing 110C to accommodate the above. Transaxle casing 110C includes an upper transaxle housing 111C and a lower cover (lower transaxle housing) 112C joined to each other, where upper transaxle housing 111C and lower transaxle housing 112C are configured to be separated or split apart. Transaxle casing 110C also includes a gear top cover 113C mounted on upper transaxle housing 111C. Further, transaxle 1Ac is provided with an L-shaped breathing pipe 115 between upper transaxle housing 111C and gear top cover 113C.

In transaxle 1Ac, fluid tightness of transaxle casing 110C is secured by sealing a boundary between upper transaxle housing 111C and gear top cover 113C with liquid packing.

Figure 45:
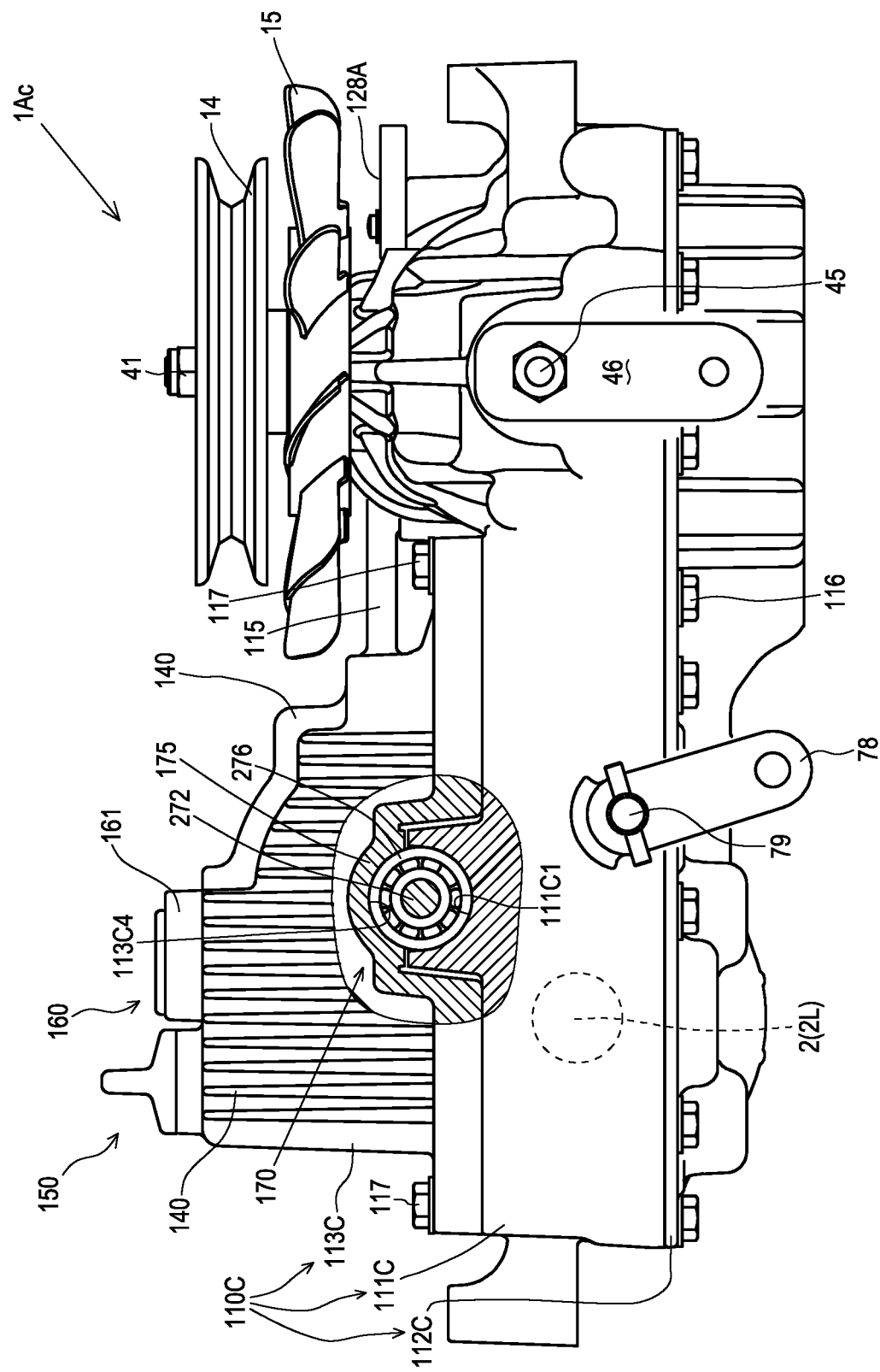
FIG. 45 is the same side view of FIG. 44, including a partial cross-sectional view of transaxle 1Ac.
Figure 46:
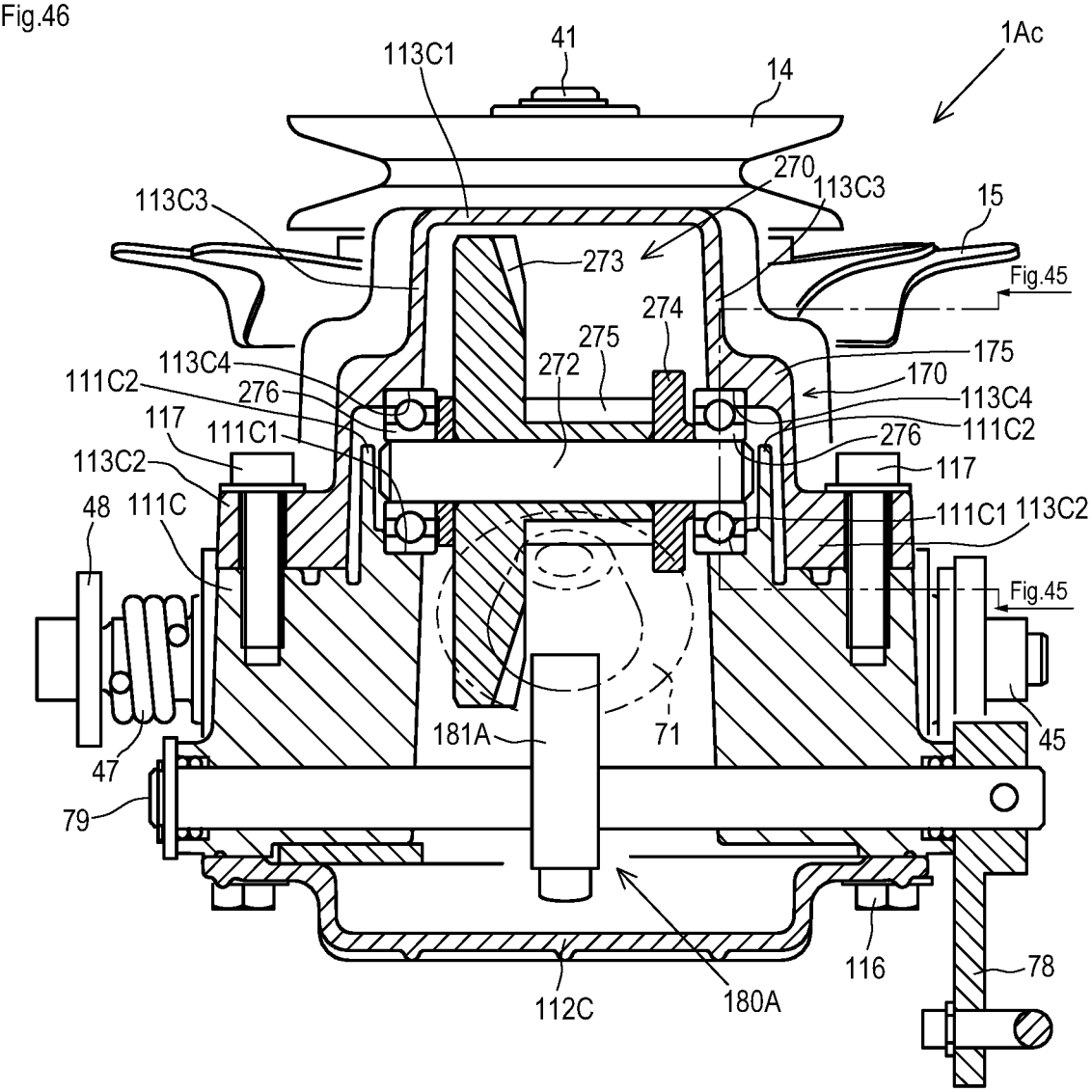
FIG. 46 is a partial rear cross-sectional view of transaxle 1Ac taken along P-P arrows of FIG. 44.

Referring to FIGS. 44 to 46, gear top cover 113C is formed with a central cover portion 113C1, a flange 113C2, and right and left side cover portions 113C3 between central cover portion 113C1 and flange 113C2. Flange 113C2 is fastened onto a top edge of upper transaxle housing 111C by screwing bolt 117 downward into the ceiling wall of upper transaxle housing 111C, thereby fixing gear top cover 113C on upper transaxle housing 111C so that central cover portion 113C1 and side cover portion 113C3 cover reduction gear train 270.

Reduction gear train 270 includes a gear shaft 272, a bevel gear 273, a bush 274, a spur pinion 275, a ball bearing 276, a spur bull gear 277, and the like. Spur bull gear 277 is fixed on axle 2 supported by transaxle casing 110C so as to mesh with spur pinion 275. Bevel gear 273 meshes with bevel pinion 71 on motor shaft 51.

Central cover portion 113C1 is arcuate in the side view along a periphery of the upper portion of bevel gear 273. Left and right side cover portions 113C3 have a stepped shape having a horizontal flat portion that is lower than central cover portion 113C1, and a bearing recess 113C4 is formed inside the horizontal flat portion.

Upper transaxle housing 111C has edges along left and right bottom edges of gear top cover 113C. Each of these edges of upper transaxle housing 111C is formed with front and rear horizontal surfaces, and is formed with right and left bearing cover portions 111C2 along left and right vertical portions of gear top cover 113C from the horizontal surfaces. Bearing cover portion 111C2 covers the axial end of gear shaft 272. Gear shaft 272 is a shaft member that supports bevel gear 273 and bush 274, and is rotatably supported by upper transaxle housing 111C and gear top cover 113C via a pair of ball bearings 276 and 276.

Further, at an inner lower end of the right and left vertical portions of gear top cover 113C, a pair of right and left bearing recesses 113C4 and 113C4 to hold ball bearings 276 and 276 are formed. Then, by disposing gear top cover 113C at a predetermined position and fastening to upper transaxle housing 111C with bolt 117, ball bearing 276 is clamped and held between bearing recesses 113C4 and 111C1. That is, in transaxle 1Ac, ball bearing 276 and gear shaft 272 are journaled without using bearing cover 178, and the number of component parts is reduced as compared with transaxle 1A and the like.

Such a transaxle 1Ac is advantageous to reduce the number of component parts and to accurately and surely journal ball bearing 276 by forming bearing recess 113C4 to hold ball bearing 276 in upper transaxle housing 111C and gear top cover 113C, and directly holding ball bearings 276 and 276 with the both members 111C and 113C, in comparison with the foregoing structure using bearing covers 177 and 178, which increases the number of component parts and which is hard to flexibly correspond to diametric and/or axial dimensional errors of bush 274 and ball bearing 276 on gear shaft 272.

In addition, in a case where the gear top cover is made of resin, it has been difficult to efficiently release heat generated inside the gear top cover to the outside since the resin gear top cover has lower thermal conductivity than that of a metal gear top cover. In transaxle 1Ac, a plurality of heat radiation fins 140 are provided on an outer surface (in particular, an upper surface and a side surface) of gear top cover 113C. Since gear top cover 113C is made of metal and is provided with fins 140, it is possible to radiate heat efficiently and evenly from each part of gear top cover 113C. Therefore, in transaxle 1Ac, variations in temperature distribution in each part are reduced.

In addition, when the gear top cover is made of a material that can see through the inside, such as resin, a fluid surface level of the hydraulic fluid in the gear top cover can be visually recognized from the outside. On the other hand, transaxle 1Ac employs gear top cover 113C made of metal (in this embodiment, made of aluminum). Therefore, the fluid surface level in gear top cover 113C is not to be visually recognized from the outside. Accordingly, transaxle 1Ac is provided with a fluid inspection rod 150. Fluid inspection rod 150 includes a base portion 151 and a fluid inspection portion 152, and is configured to be attachable to and detachable from gear top cover 113C. Base portion 151 is a part formed with a male screw on the outer periphery, and is configured to be screwable into a screw hole 113C5 formed at a top portion of gear top cover 113C. Fluid inspection portion 152 is a part to be inserted to a predetermined depth in gear top cover 113C, and can check the liquid surface level of the hydraulic fluid by visually checking a wet condition of fluid inspection portion 152 due to the hydraulic fluid.

Further, in transaxle 1Ac, a breather 160 is provided at the top portion of gear top cover 113C. Breather 160 is a lid-shaped body that allows air to flow in and out of gear top cover 113C. Breather 160 is screwed into a fluid supply hole 113C6 formed at the top portion of gear top cover 113C. Fluid supply hole 113C6 is a hole portion formed with a female screw corresponding to the male screw formed on breather 160.

Since breather 160 is configured with an air flow path to gear top cover 113C, when breather 160 is exposed to a liquid such as water, the liquid may enter gear top cover 113C via the air flow path. In transaxle 1Ac, a rib 161 is provided around breather 160, and is configured to protect the outer peripheral side surface of breather 160 from direct exposure to a liquid such as water. Rib 161 is a wall-shaped part projecting from the top portion of gear top cover 113C so as to surround fluid supply hole 113C6.

Incidentally, gear top cover 113C shown in the present embodiment is made of aluminum die-cast, and fins 140, rib 161, and the like are also integrally die-cast molded. Further, employing metal gear top cover 113C enables reduction of noise leaking from transaxle casing 110C. Furthermore, while employing a resin gear top cover requires management of a fastening torque of a cover-fastening bolt in order to inhibit cracking of the gear top cover, employing metal gear top cover 113C eliminates necessity of time and effort to manage a fastening torque in bolt 117, facilitating assembling work.

Further, since the air flow path is formed in breather 160, in gear top cover 113C, the hydraulic fluid may leak to outside of gear top cover 113C via the air flow path when breather 160 is subject, from below, to the hydraulic fluid splashed by rotation of reduction gear train 270. In transaxle 1Ac, a baffle plate 162 is provided below breather 160 inside of gear top cover 113C, and is configured to protect a lower surface of breather 160 from being subject to the hydraulic fluid so as to inhibit leakage of hydraulic fluid. Baffle plate 162 is a plate-shaped member, and is fixed by a screw 163 to the inside of gear top cover 113C.

Transaxle 1Ad serving as a modification of transaxle 1A will be described with reference to FIGS. 47 to 51. Transaxle 1Ad has members and portions designated by the same reference numerals as those used for transaxle 1A. Omission or adaptation of description and reference numerals are employed as those for transaxle 1A in comparison with transaxle 1 for the same reasons. Further, an HST 120 is regarded as being disposed forward from an axle 2 as that of transaxle 1A. In this regard, as understood from FIG. 47, transaxle 1Ad shown in FIGS. 47 to 51 serves as a left transaxle having a left axle 2L, however, this is just a representative of right and left transaxles having respective right and left axles 2R and 2L, similar to the representative transaxle 1 while transaxle 1A shown in FIGS. 21 to 32 serves as a right transaxle having right axle 2R.

Figure 47:
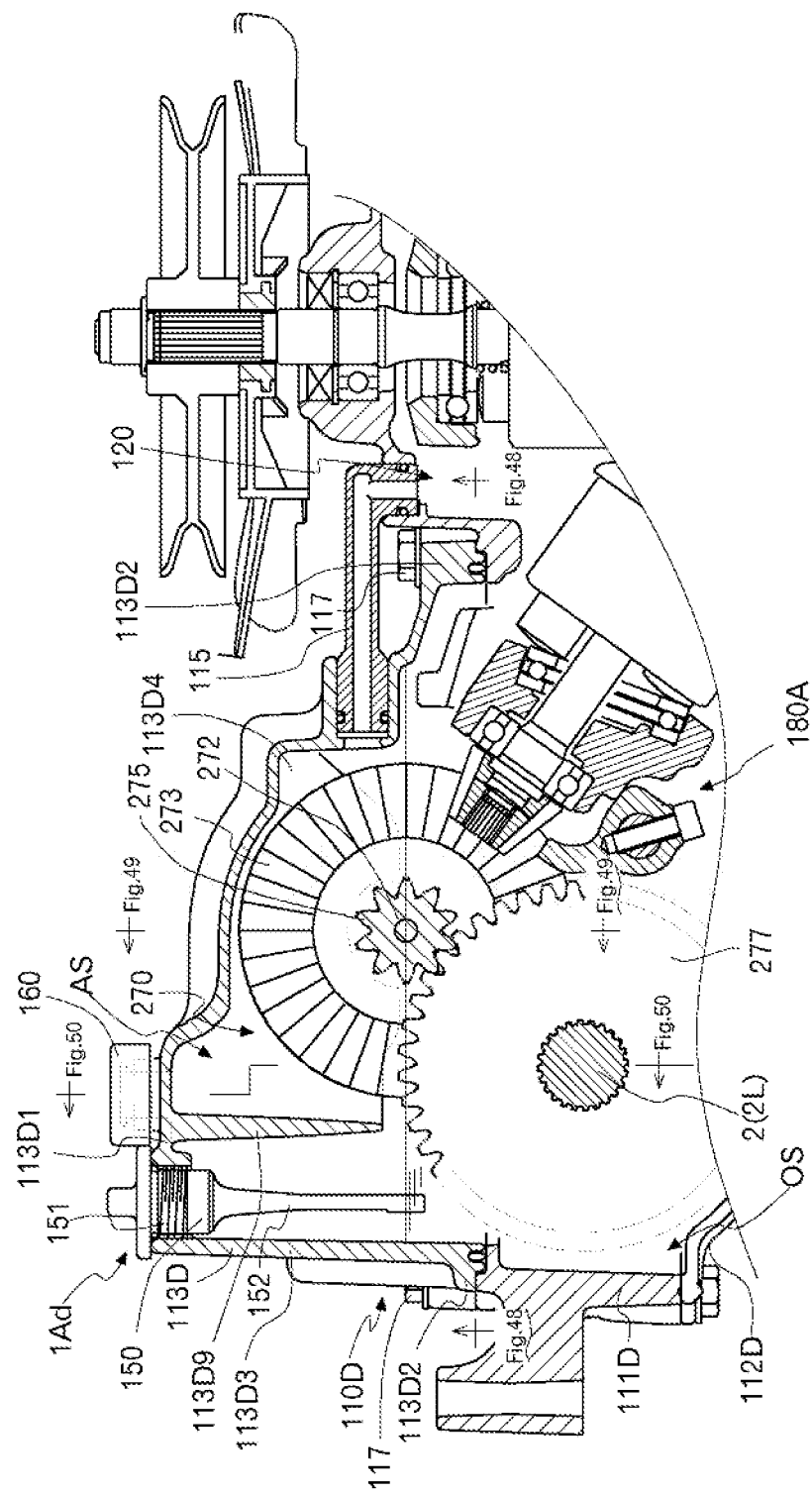
FIG. 47 is a side cross-sectional view of a transaxle 1Ad including an HST 120, showing a side cross section of a gear top cover 113D.

As shown in FIG. 47, similarly to transaxle 1A, transaxle 1Ad includes HST 120, axle 2 (left axle 2L in the present embodiment), and a gear locking system 180 (a gear locking system 180A in the present embodiment), and also includes a reduction gear train 270. Then, transaxle 1Ad has a transaxle casing 110D to accommodate the above. Transaxle casing 110D is obtained by joining an upper transaxle housing 111D and a lower cover (a lower transaxle housing) 112D, and covering upper transaxle housing 111D with a gear top cover 113D. Further, transaxle 1Ad is provided with an L-shaped breathing pipe 115 between upper transaxle housing 111D and gear top cover 113D.

In transaxle 1Ad, fluid tightness of transaxle casing 110D is secured by sealing a boundary between upper transaxle housing 111D and gear top cover 113D with liquid packing.

As shown in FIGS. 48 to 51, gear top cover 113D is formed with an upper wall 113D1, a flange 113D2 that joins with upper transaxle housing 111D, and a side wall 113D3 between upper wall 113D1 and flange 113D2. By screwing at least one bolt 117 into upper transaxle housing 111D from an upper side of a ceiling wall, flange 113D2 is fastened to a top edge of upper transaxle housing 111D. Fro example, embodiments of top gear cover 113D like those shown in FIGS. 48 to 51 may include 10 bolts 117 spaced around a perimeter of gear top cover 113D. This causes gear top cover 113D to be fixed on upper transaxle housing 111D, and reduction gear train 270 is covered by upper wall 113D1 and side wall 113D3. In a space sealed by gear top cover 113D and upper transaxle housing 111D, lubricating fluid is sealed, an air sump AS is formed in an upper part, and a fluid sump OS is formed in a lower part. Air sump AS is formed in a portion covered with gear top cover 113D.

Reduction gear train 270 includes a gear shaft 272, a bevel gear 273, a bush 274, a spur pinion 275, a ball bearing 276, a spur bull gear 277, and the like. Spur bull gear 277 is fixed on axle 2 supported by transaxle casing 110D so as to mesh with spur pinion 275. Bevel gear 273 meshes with bevel pinion 71 on motor shaft 51. Lubricating fluid is filled up to a height of a center of gear shaft and bevel gear 273 of reduction gear train 270. An upper half of bevel gear 273 is positioned in air sump AS, and a lower half of bevel gear 273 is positioned in fluid sump OS.

Upper wall 113D1 is arc-shaped in side view along a periphery of an upper portion of bevel gear 273. Upper wall 113D1 is formed in a stepped shape having an upper flat portion 113D7 and a lower flat portion 113D8 formed below upper flat portion 113D7, and a first bearing holding half portion 113D4 and a second bearing holding half portion 113D5 are respectively provided in a straddling manner over lower flat portion 113D8 and left and right side walls 113D3.

Figure 48:
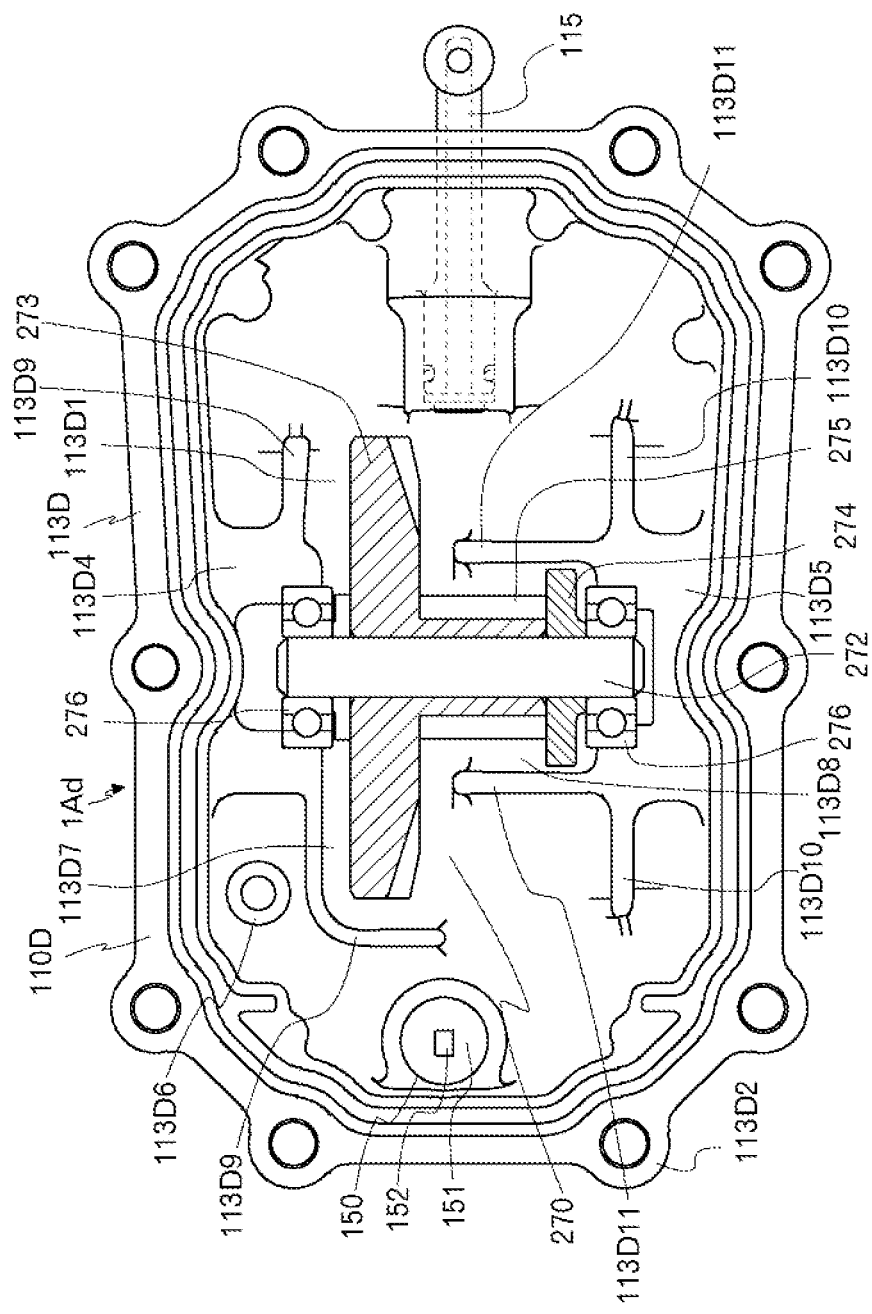
FIG. 48 is a partial bottom cross-sectional view of transaxle 1Ad taken along FIG. 48-FIG. 48 arrow shown in FIG. 47.
Figure 49:
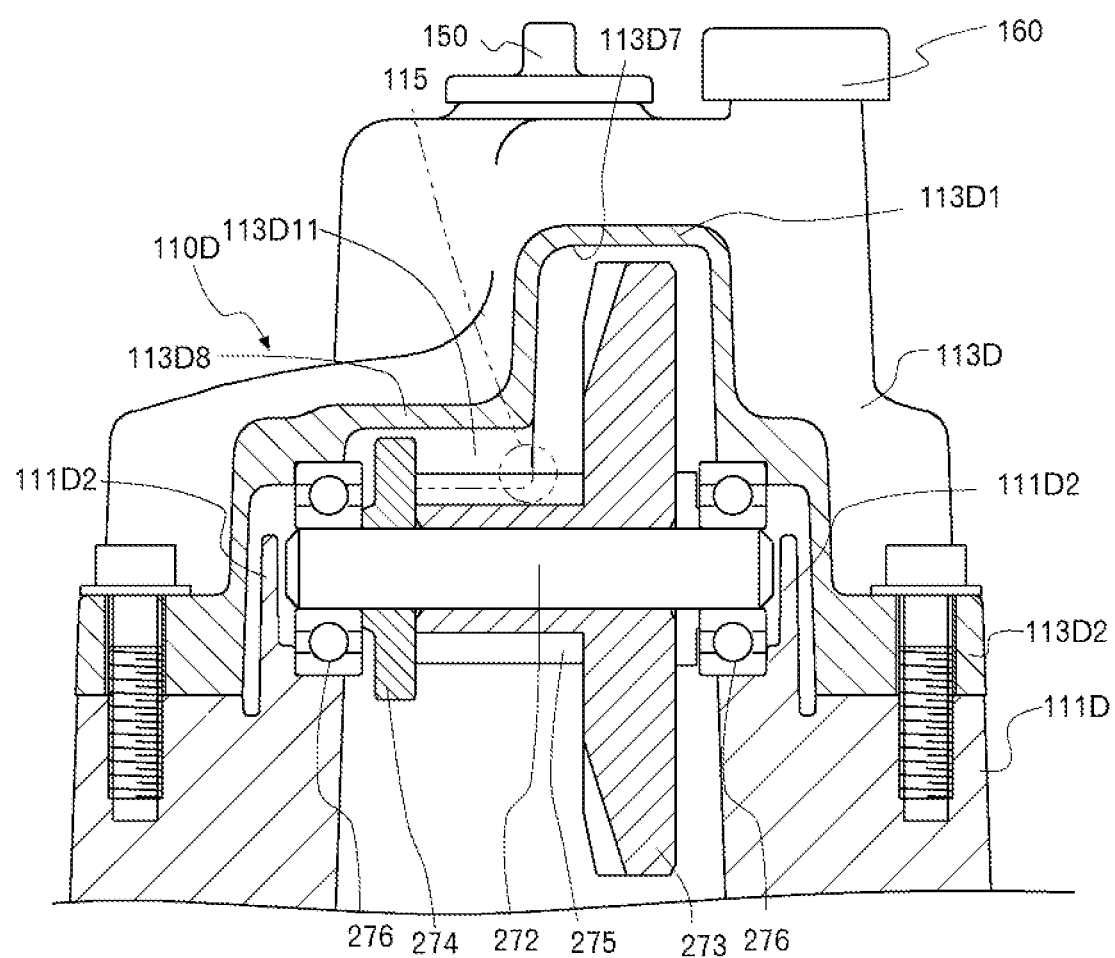
FIG. 49 is a partial side cross-sectional view of transaxle 1Ad taken along FIG. 49-FIG. 49 arrow shown in FIG. 47.
Figure 50:
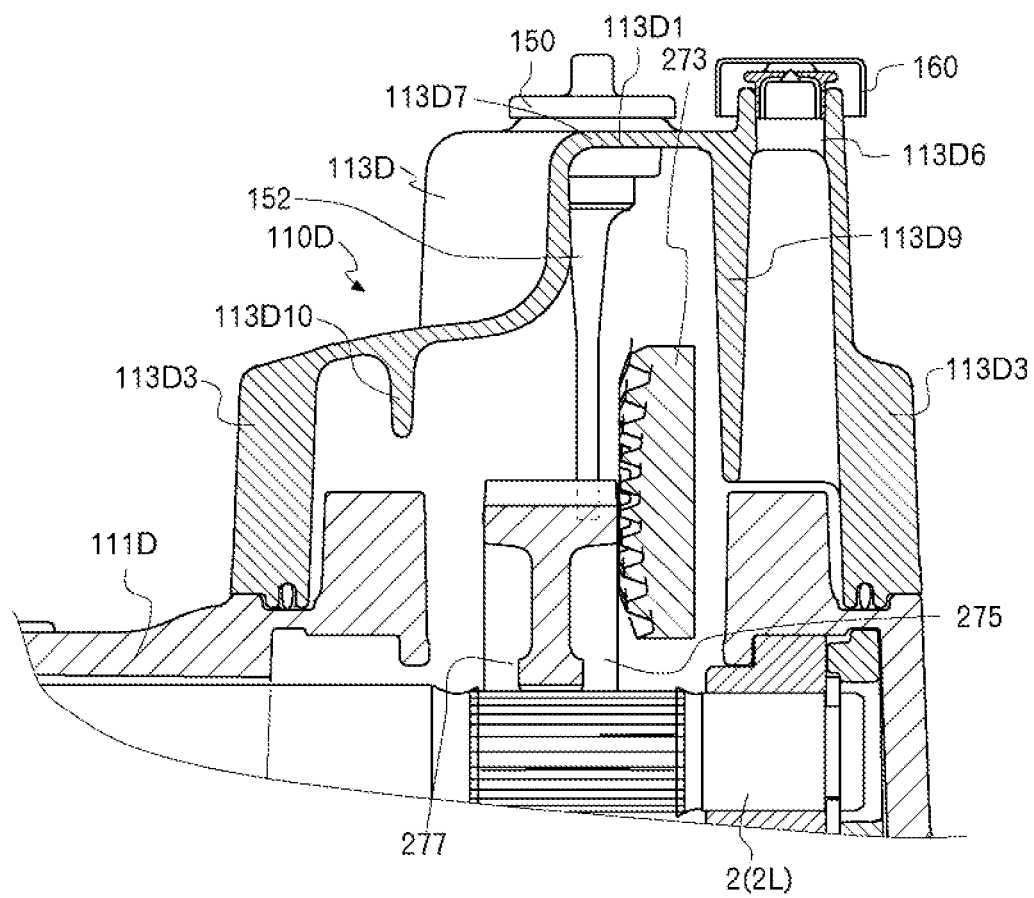
FIG. 50 is a partial bottom cross-sectional view of transaxle 1Ad taken along FIG. 50-FIG. 50 arrow shown in FIG. 47.
Figure 51:
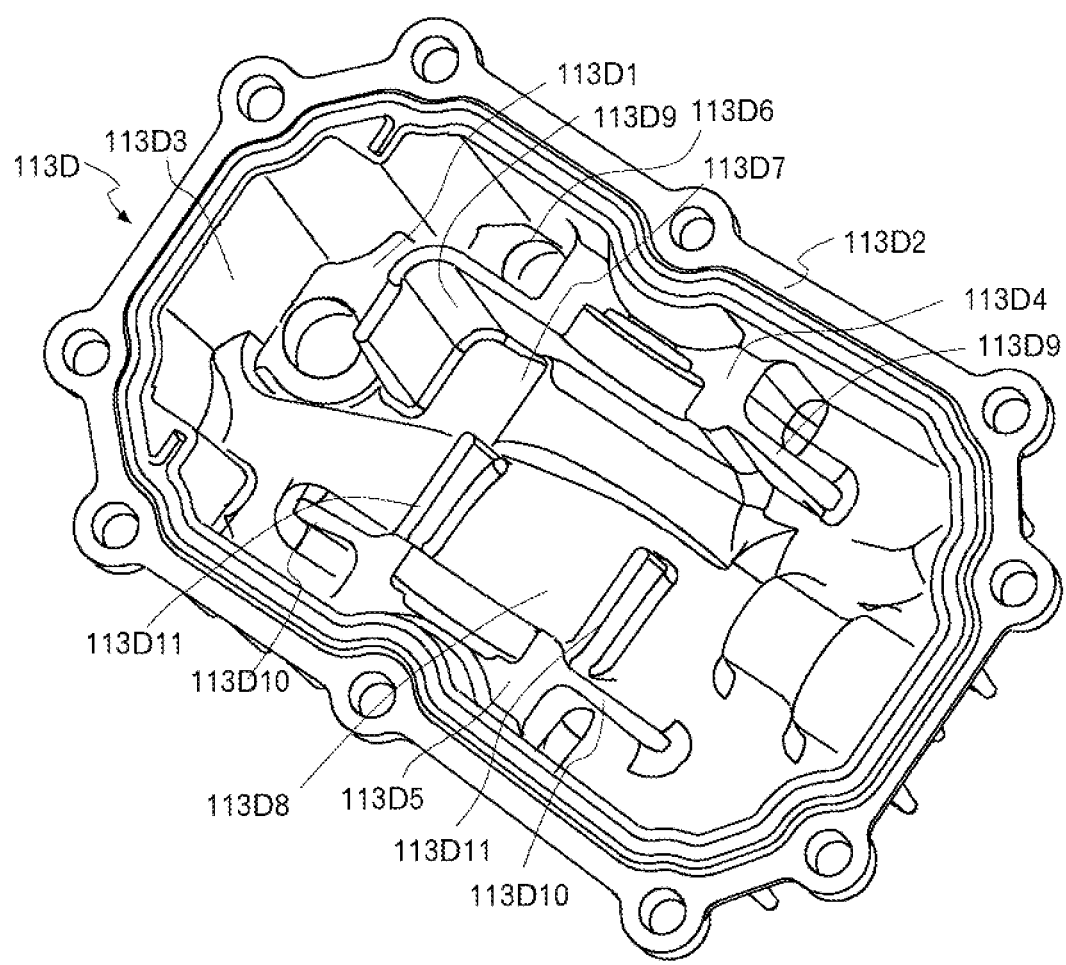
FIG. 51 is a bottom perspective view of gear top cover 113D.

As shown in FIG. 48, upper transaxle housing 111D is provided with a bearing recess 111D1 that supports bearings 276 and 276 by pairing with first bearing holding half portion 113D4 and second bearing holding half portion 113D5. Further, from a surface where bearing recess 111D1 is provided, left and right bearing cover portions 111D2 extending in a vertical direction are formed along left and right vertical portions of gear top cover 113D. Bearing cover portion 111D2 covers an axial end of gear shaft 272. Gear shaft 272 is a shaft member that supports bevel gear 273 and bush 274, and is rotatably supported by upper transaxle housing 111D and gear top cover 113D via the pair of bearings 276 and 276.

By arranging gear top cover 113D at a predetermined position and fastening with bolt or bolts 117 to upper transaxle housing 111 D, bearing 276 is clamped and held between bearing recess 111D1, and first bearing holding half portion 113D4 and second bearing holding half portion 113D5. That is, in transaxle 1Ad, bearing 276 and gear shaft 272 are pivotally supported without using a bearing cover, and the number of component parts is reduced as compared to transaxle 1A and the like.

Since transaxle 1Ad employs gear top cover 113D made of metal (aluminum in the present embodiment), a fluid surface level inside gear top cover 113D is not to be visually recognized from outside. Accordingly, transaxle 1Ad is provided with a fluid inspection rod 150. Fluid inspection rod 150 includes a base portion 151 and a fluid inspection portion 152, and is configured to be attachable to and detachable from gear top cover 113D. The base portion 151 is a part formed with a male screw on an outer periphery, and is configured to be screwable into a screw hole formed at a top portion of gear top cover 113C. Fluid inspection portion 152 is a part to be inserted to a predetermined depth in gear top cover 113D, and a liquid surface level of the hydraulic fluid can be checked by visually checking a wet condition of fluid inspection portion 152 due to the hydraulic fluid.

Further, in transaxle 1Ad, a breather 160 is provided at upper wall 113D1 of gear top cover 113D. Breather 160 is a lid-shaped body that allows air to flow in and out of gear top cover 113D. Breather 160 is provided to an air supply and exhaust hole 113D6 formed at upper wall 113D1 of gear top cover 113D.

As shown in FIG. 48, air supply and exhaust hole 113D6 is arranged at a position offset from a position where bevel gear 273 of reduction gear train 270 is arranged in bottom view, on upper wall 113D1 of gear top cover 113D. There is provided a first inner wall 113D9 extending downward from upper wall 113D1 of gear top cover 113D. First inner wall 113D9 is arranged so as to straddle over upper wall 113D1 and a side surface of first bearing holding half portion 113D4, and includes a plate-shaped portion. First inner wall 113D9 extends along the back surface of the rotation portion of bevel gear 273, and is arranged so as to separate a position where air supply and exhaust hole 113D6 is arranged and a position where bevel gear 273 is arranged. Further, a side end of first inner wall 113D9 is bent toward bevel gear 273 and arranged at a position facing a gear surface of bevel gear 273, and partially surrounds bevel gear 273. Such a configuration makes it possible to block fluid droplets scattered from the gear surface of bevel gear 273 by first inner wall 113D9, and to prevent fluid from leaking from air supply and exhaust hole 113D6 through breather 160.

First inner wall 113D9 extends along the back surface of the rotation portion of bevel gear 273, also from a side surface opposite to the side surface on air supply and exhaust hole 113D6 side of first bearing holding half portion 113D4. Such a configuration allows first inner wall 113D9 to also serve as a rib member that improves strength of gear top cover 113D.

Further, there is provided a second inner wall 113D10 extending downward from upper wall 113D1 of gear top cover 113D. Second inner wall 113D10 is arranged so as to straddle over upper wall 113D1 and a side surface of second bearing holding half portion 113D5, and includes a plate-shaped portion. Second inner wall 113D10 extends along a front surface of the rotation portion of bevel gear 273, and a side end of second inner wall 113D10 projects laterally from a rotation surface of bevel gear 273. Such a configuration allows second inner wall 113D10 to also serve as a rib member that improves strength of gear top cover 113D.

Further, there is provided a third inner wall 113D11 extending downward from upper wall 113D1 of gear top cover 113D. Third inner wall 113D11 is arranged so as to straddle over lower flat portion 113D8 of upper wall 113D1 and a side surface of second bearing holding half portion 113D5, and is arranged at a position facing a rotation surface of spur pinion 275. Such a configuration makes it possible to block fluid droplets scattered from spur pinion 275 by third inner wall 113D11 and lower flat portion 113D8, and to reliably prevent fluid from leaking from air supply and exhaust hole 113D6 to outside through breather 160. In addition, it is possible to prevent air mixed with fluid droplets from flowing back into upper transaxle housing 111D through breathing pipe 115.

It is further understood by those skilled in the art that the foregoing description is given of preferred embodiments of the disclosed apparatus and that various changes and modifications may be made in the invention without departing from the scope thereof defined by the following claims.

The invention claimed is:

1. A transaxle, comprising:
   a transaxle casing with a fluid sump;
   an upper casing member that is detachably joined to the transaxle casing at an upper portion of the transaxle casing;
   a hydrostatic transmission disposed in the transaxle casing;
   a reduction mechanism disposed in the transaxle casing; and
   at least one axle disposed in the transaxle casing;
   wherein the upper casing member accommodates a part of a rotation portion of the reduction mechanism,
   wherein an air sump is formed inside the upper casing member,
   wherein the upper casing member comprises a hole opened on an upper surface of the upper casing member facing the air sump, the hole arranged at a position separate from a point above the rotation portion,
   wherein the upper casing member comprises a breather attached at the hole that allows outside air to flow into the upper casing member and is configured to block a flow of fluid into and out of the upper casing member, and
   wherein a first inner wall integrated into the upper surface extends vertically downward from the upper surface of the upper casing member and is positioned between the part of the rotation portion disposed in the upper casing member and the hole,
   wherein the first inner wall has a first surface disposed inside the upper casing member, the first surface facing a first face of the rotation portion inside the upper casing member, and
   wherein the first inner wall has a second surface disposed inside the upper casing member, the second surface facing a second face of the rotation portion inside the upper casing member.

2. The transaxle according to claim 1, wherein the first inner wall has a portion arranged at a position facing a gear surface of the rotation portion of the reduction mechanism, the portion being arranged to surround the rotation portion.

3. The transaxle according to claim 1, further comprising:
a lower casing member joined detachably to the upper casing member;
wherein each of the upper casing member and the lower casing member includes a first and second bearing holding half portion for rotatably supporting a shaft that supports the rotation portion of the reduction mechanism.

4. The transaxle according to claim 3, wherein the first inner wall is connected to the first bearing holding half portion of the upper casing member and extends along a side surface of the rotation portion of the reduction mechanism.

5. The transaxle according to claim 4, further comprising:
a second inner wall extending downward from the upper surface of the upper casing member parallel to the first inner wall;
wherein the second inner wall is connected to the second bearing holding half portion of the upper casing member.

6. The transaxle according to claim 4, further comprising:
a third inner wall extending downward from the upper surface of the upper casing member, positioned between the first inner wall and second inner wall;
wherein the rotation portion of the reduction mechanism includes a large gear and a small gear having different diameters,
wherein the first inner wall is arranged along a side surface of the large gear, and
wherein the third inner wall and the upper surface surround a portion of the small gear positioned in an air sump.

7. A transaxle, comprising:
a transaxle casing with a fluid sump;
an upper casing member that is detachably joined to the transaxle casing at an upper portion of the transaxle casing, the upper casing member defined by an upper wall and a sidewall joined to the upper wall;
a hydrostatic transmission disposed in the transaxle casing;
a reduction mechanism disposed in the transaxle casing; and
at least one axle disposed in the transaxle casing;
wherein the upper casing member accommodates a part of a gear of the reduction mechanism,
wherein an air sump is formed inside the upper casing member,
wherein the upper casing member comprises a hole opened on the upper wall facing the air sump, the hole arranged at a position separate from a point above the gear,
wherein the upper casing member comprises a breather attached at the hole that allows outside air to flow into the upper casing member and is configured to block a flow of fluid into and out of the upper casing member,
wherein the upper casing member comprises a first inner wall disposed inside the upper casing member and extending downwards from the upper wall, the first inner wall comprising a first wall portion extending in a first direction and a second wall portion extending in a second direction, and
wherein both the first wall portion and the second wall portion are disposed between the part of the gear and the air sump.

8. The transaxle according to claim 7, further comprising:
a lower casing member joined detachably to the upper casing member;
wherein each of the upper casing member and the lower casing member includes a first and second bearing holding half portion for rotatably supporting a shaft that supports the rotation portion of the reduction mechanism.

9. The transaxle according to claim 8, wherein the first inner wall is connected to the first bearing holding half portion of the upper casing member and extends along a side surface of the rotation portion of the reduction mechanism.

10. The transaxle according to claim 9, further comprising:
a second inner wall extending downward from the upper wall parallel to the first inner wall;
wherein the second inner wall is connected to the second bearing holding half portion of the upper casing member.

11. A transaxle, comprising:
a transaxle casing with a fluid sump;
an upper casing member that is detachably joined to the transaxle casing at an upper portion of the transaxle casing, the upper casing member defined by an upper wall and a sidewall joined to the upper wall;
a hydrostatic transmission disposed in the transaxle casing;
a reduction mechanism disposed in the transaxle casing; and
at least one axle disposed in the transaxle casing;
wherein the upper casing member accommodates a part of a gear of the reduction mechanism,
wherein an air sump is formed inside the upper casing member,
wherein the upper casing member comprises a hole opened on the upper wall facing the air sump, the hole arranged at a position separate from a point above the gear,
wherein the upper casing member comprises a breather attached at the hole that allows outside air to flow into the upper casing member and is configured to block a flow of fluid into and out of the upper casing member, and
wherein the upper casing member comprises a first inner wall disposed inside the upper casing member and extending downwards from the upper wall, the first inner wall positioned to prevent fluid droplets scattered by the gear from entering the breather.

12. The transaxle according to claim 11, wherein the first inner wall has a portion arranged at a position facing a gear surface of the gear of the reduction mechanism, the portion being arranged to surround the gear.

13. The transaxle according to claim 11, further comprising:
a lower casing member joined detachably to the upper casing member;
wherein each of the upper casing member and the lower casing member includes a first and second bearing holding half portion for rotatably supporting a shaft that supports the rotation portion of the reduction mechanism.

14. The transaxle according to claim 13, wherein the first inner wall is connected to the first bearing holding half portion of the upper casing member and extends along a side surface of the rotation portion of the reduction mechanism.

15. The transaxle according to claim 11, further comprising:
a second inner wall extending downward from the upper wall parallel to the first inner wall;

wherein the second inner wall is connected to the second bearing holding half portion of the upper casing member.

\* \* \* \* \*